United States Patent [19]

Maeda et al.

[11] Patent Number: 5,606,420

[45] Date of Patent: Feb. 25, 1997

[54] CAMERA SYSTEM INCLUDING A CAMERA SECTION AND A REPRODUCTION SECTION SEPARATELY ATTACHABLE TO THE CAMERA SECTION

[75] Inventors: Yutaka Maeda, Kanagawa-Ken; Yasuhiro Kyoden, Sagamihara; Hirokazu Naruto, Higashiosaka; Yoshito Tanaka; Dai Shintani, both of Sakai; Katsuyuki Nanba, Osakasayama, all of Japan

[73] Assignee: Minolta Camera Kabushiki Kaisha, Osaka, Japan

[21] Appl. No.: 558,238

[22] Filed: Nov. 17, 1995

Related U.S. Application Data

[62] Division of Ser. No. 324,365, Oct. 14, 1994, Pat. No. 5,493,409, which is a continuation of Ser. No. 800,584, Nov. 27, 1991, abandoned.

[30] Foreign Application Priority Data

| Nov. 29, 1990 | [JP] | Japan | 2-334687 |
|---|---|---|---|
| Nov. 29, 1990 | [JP] | Japan | 2-334689 |
| Nov. 29, 1990 | [JP] | Japan | 2-334690 |
| Nov. 29, 1990 | [JP] | Japan | 2-334691 |
| Nov. 29, 1990 | [JP] | Japan | 2-334692 |
| Nov. 29, 1990 | [JP] | Japan | 2-334693 |
| Nov. 29, 1990 | [JP] | Japan | 2-334694 |
| Nov. 29, 1990 | [JP] | Japan | 2-338688 |

[51] Int. Cl.$^6$ ............ H04N 1/00; H04N 5/225; G03F 3/10; G03B 27/52; G03B 29/00
[52] U.S. Cl. ............ 358/296; 358/401; 358/527; 358/909.1; 355/21; 396/429
[58] Field of Search ............ 358/296, 400, 358/401, 444, 503, 527, 909.1; 354/3, 75, 76, 78; 355/18, 19, 21, 27

[56] References Cited

U.S. PATENT DOCUMENTS 4,262,301 4/1981 Erlichman .................. 358/527

4,666,320 5/1987 Kobayashi et al. .................. 400/241.1
4,794,404 12/1988 Shiraishi et al. .................. 346/76

(List continued on next page.)

FOREIGN PATENT DOCUMENTS

| 59-174085 | 10/1984 | Japan . |
| 61-189785 | 8/1986 | Japan . |
| 1-186069 | 1/1989 | Japan . |
| 64-868 | 1/1989 | Japan . |
| 1-204575 | 8/1989 | Japan . |
| 2-21482 | 2/1990 | Japan . |
| 2-26771 | 2/1990 | Japan . |

OTHER PUBLICATIONS

Publication entitled "Da VINCI Digital Printing Camera" of Kabushiki Kaisha King Jim.

*Primary Examiner*—Peter S. Wong
*Assistant Examiner*—Eric Frahm
*Attorney, Agent, or Firm*—Brinks Hofer Gilson & Lione

[57] ABSTRACT

A camera system has a camera section, a reproduction section and a printer section, the printer section being separably attachable to either the camera section or the reproduction section to form an integral body. The camera system has photoelectric conversion elements and picks up an image of an object to produce image data. The reproduction section processes the image data so as to reproduce the picked-up image on a display screen, and the printer section prints the picked-up image on printing paper based on the image data. The reproduction section may include an output device which transmits the processed image data to a television set having a display screen, and it may also be integrally provided with a monitor having a display screen. The camera system further includes a recording portion electrically connected with the camera section and which records the image data. The recording portion has a first recorder which records the image data in an internal memory built in one or each of the camera section, the reproduction section and the printer section, and a second recorder which records the image data in an external memory removably mountable on one or each of the camera section, the reproduction section and the printer section.

19 Claims, 34 Drawing Sheets

U.S. PATENT DOCUMENTS

| | | | |
|---|---|---|---|
| 4,827,347 | 5/1989 | Bell | 358/224 |
| 4,888,648 | 12/1989 | Takeuchi et al. | 358/335 |
| 4,890,120 | 12/1989 | Sasaki et al. | 346/76 |
| 4,939,541 | 7/1990 | Sugiura | 355/202 |
| 4,942,477 | 7/1990 | Nakamura | 358/401 |
| 5,034,804 | 7/1991 | Sasaki et al. | 358/41 |
| 5,089,897 | 2/1992 | Curley | 358/296 |
| 5,159,458 | 10/1992 | Murata et al. | 358/229 |
| 5,182,650 | 1/1993 | Inoue et al. | 358/296 |
| 5,220,343 | 6/1993 | Takanashi et al. | 346/1.1 |
| 5,220,352 | 6/1993 | Yamamoto et al. | 346/76 |
| 5,446,599 | 8/1995 | Lemelson | 358/909.1 X |
| 5,469,271 | 11/1995 | Hoshino et al. | 358/909.1 X |

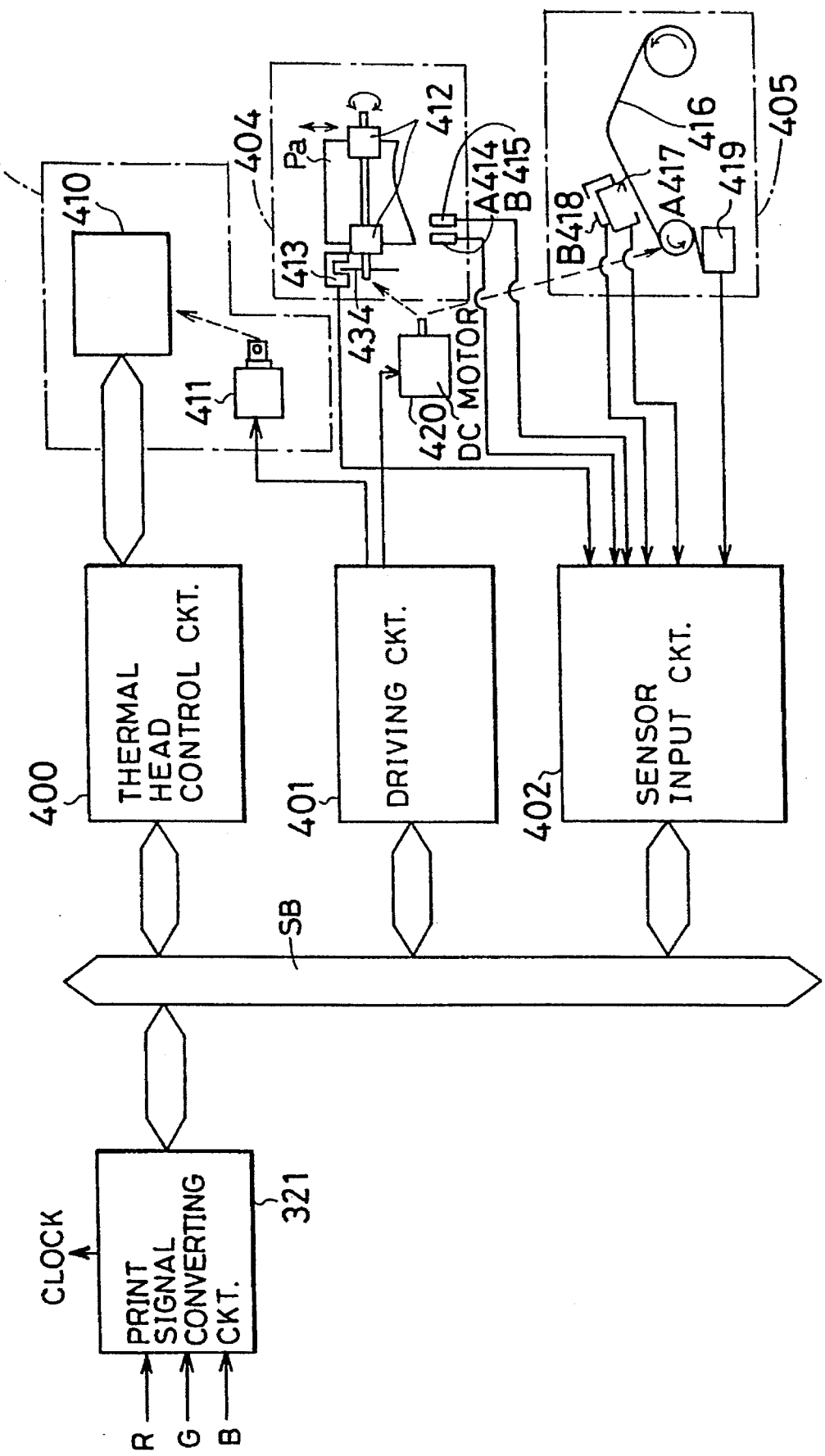

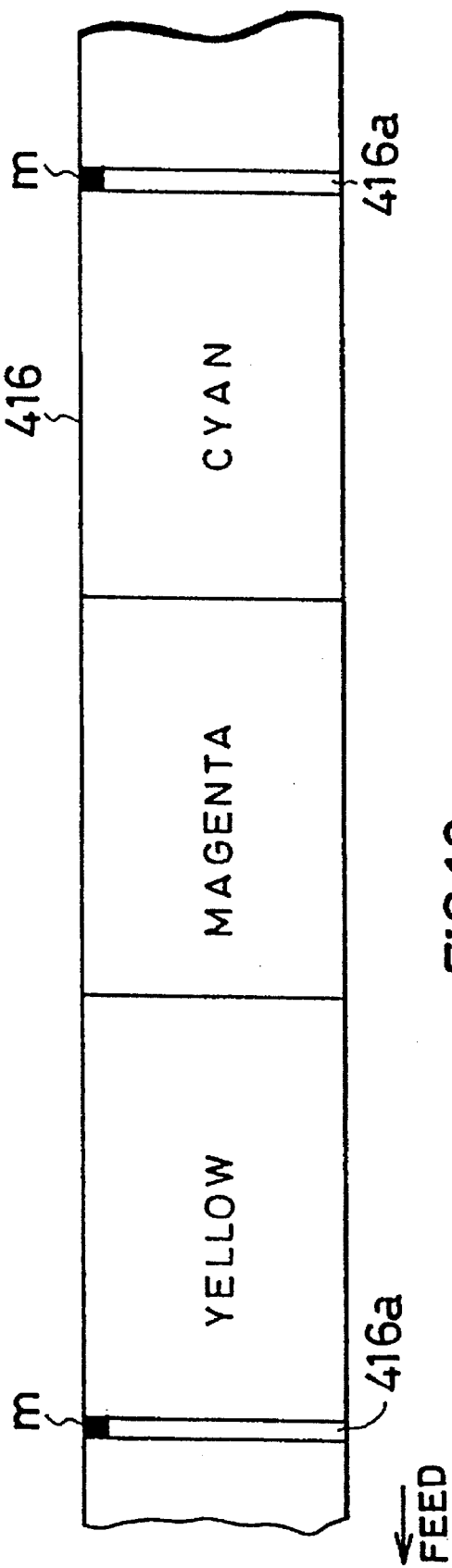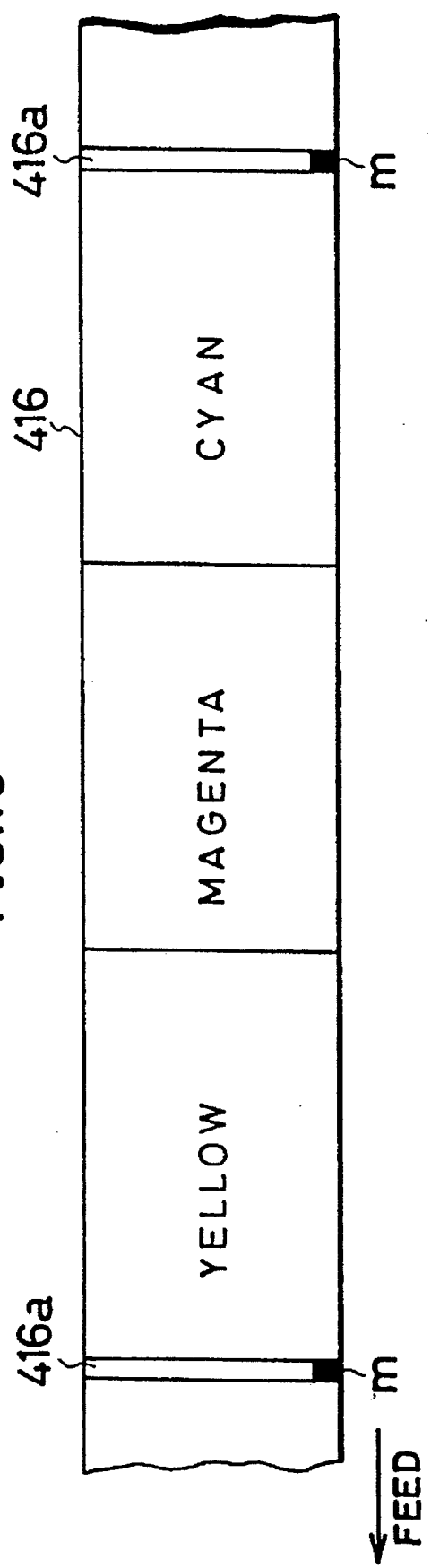

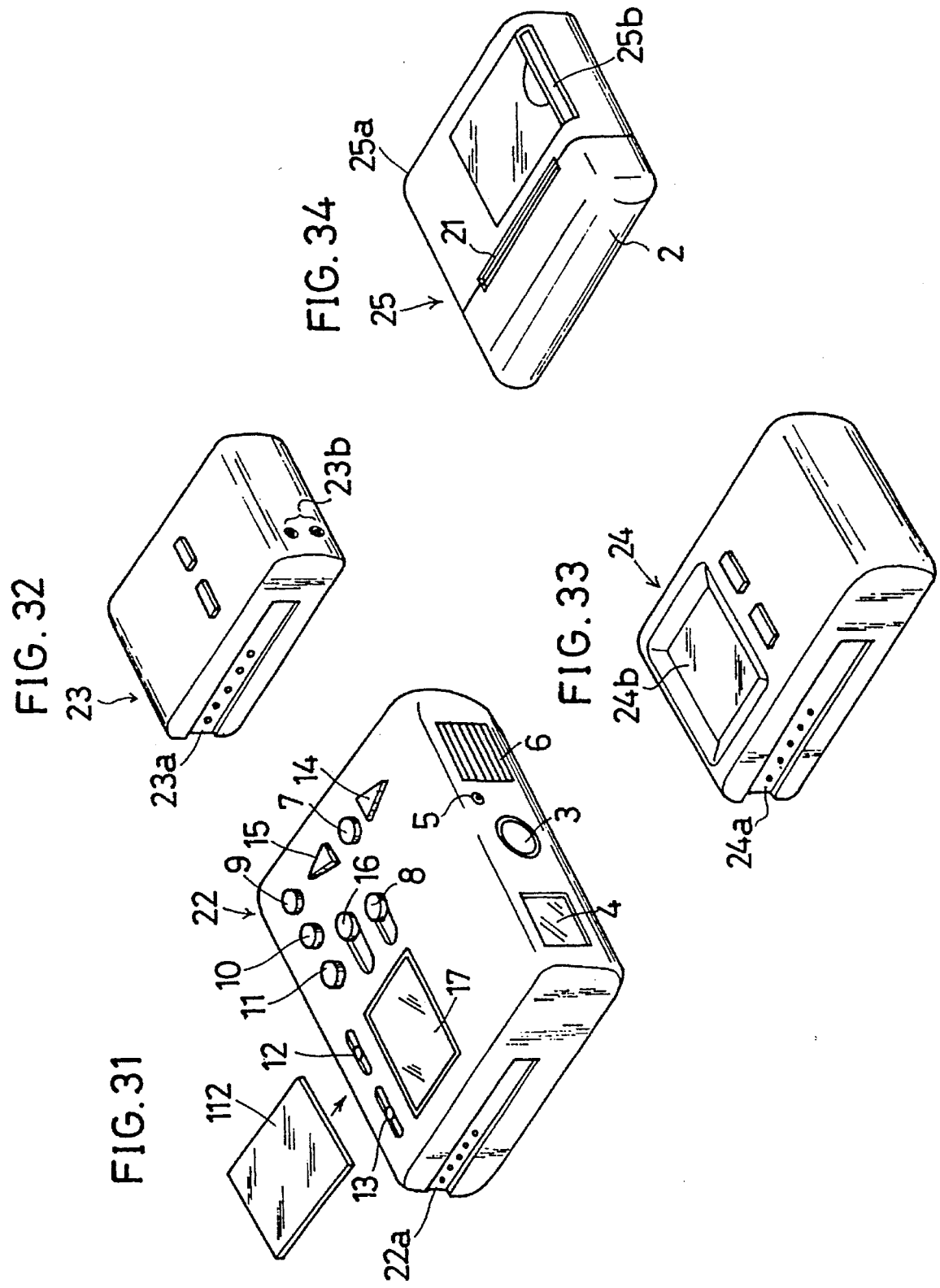

CAMERA SYSTEM INCLUDING A CAMERA SECTION AND A REPRODUCTION SECTION SEPARATELY ATTACHABLE TO THE CAMERA SECTION

This application is a division, of application Serial No. 08/324,365, U.S. Pat. No. 5,493,409 filed Oct. 14, 1994 which is a Continuation of application Ser. No. 07/800,584 filed Nov. 27, 1991, now abandoned.

BACKGROUND OF THE INVENTION AND RELATED ART STATEMENT

This invention relates to a still video camera, particularly to a still video camera capable of reproducing a photographed image at a photographing spot with the use of a printer or TV.

There has been conventionally known a still video camera which converts a light image into an electric signal with the use of a photoelectric conversion element and stores image information electrically. An image photographed by this still video camera can be readily reproduced any time after the photographing operation with the use of a TV reproduction device or a printer. In view of this, it has been recently designed to produce a multifunction still video camera with a TV reproduction device, a printer or like device provided therein so as to increase added value thereof and attain higher quality.

For example, Japanese Unexamined Patent Publication No. 61-189785 discloses a still video camera provided with a built-in printer and a roll of recording sheet therein and capable of printing a stored image on the recording sheet. Also, Japanese Unexamined Patent Publication No. 1-204575 discloses a still video camera including a reproduction/display unit removably attachable to a camera main body in which a stored image can be reproduced in the reproduction/display unit.

Further, Japanese Unexamined Patent Publication No. 2-26771 discloses a thermal printing device having two print modes of the sublimation type and the melt-out type, the print mode being changeable one over the other, in which a color image is printed in the selected print mode.

In the camera provided with a printer disclosed in JPP No. 61-189785 or commercially available, one type of print mode, for example, a thermal transfer mode, is adopted. However, this camera neither teaches a concept of changing a print mode from one to the other, nor has a construction for that purpose accordingly.

The thermal printing device disclosed in JPP No. 2-26771 is capable of printing mainly the color image of a computer, and is not directly pertinent to a camera. Accordingly, the device has no such a construction as to be incorporated into the camera.

Also, the above thermal printing device having two changeable print modes is only capable of selecting a recording sheet corresponding to an ink ribbon mounted thereto, or displaying an indication indicative of absence of recording sheet in the case where the corresponding recording sheet is not mounted therein. However, this device does not determine compatibility of the ink ribbon and the recording sheet.

The camera provided with a printer disclosed in JPP No. 61-189785 or commercially available prints the photographed image on the rolled recording sheet provided in the camera. However, this camera does not have a printer whose construction allows the photographed image to be printed on an external recording sheet.

It is convenient to provide a printer capable of printing the image also on the external recording sheet in a camera main body since various print modes can be used depending on the applications. However, in the printer capable of printing the image on the external recording sheet, in the case where the recording sheet is not placed properly relative to a printer head a printing position may be dislocated. Particularly, in case of color printing, respective color images may not be superimposed properly one over another.

Further, if a printer is capable of printing a stored image freely on plain paper of an unspecified size, it will increase readiness for confirmation and easy recording of photographed images, and recording sheet costs can be reduced, thereby further improving convenience of a printing function of a camera provided with a built-in printer. However, in the camera provided with a printer disclosed JPP No. 61-189785 or commercially available, the photographed image is recorded on the rolled recording sheet provided in the camera, and therefore the type and the size of recording sheet is subject to limitation. Further, in the case where a melting transfer print mode is adopted, the image can be printed on plain paper. However, in the existing camera provided with a built-in printer, the recording sheet in use is limited to a rolled sheet of a specified size, and accordingly the image cannot be printed freely on plain paper of an unspecified size.

Moreover, some of the cameras provided with a built-in printer include a storage capacity for storing image data for one frame and a printer for printing the stored image any time. Some include a memory capable of storing image data for a plurality of frames and a printer for printing the desired stored image(s) when it is necessary.

Japanese Unexamined Patent Publication No. 64-868 discloses a digital still camera including a semiconductor memory for storing a plurality of frames of photographed images.

Further, Japanese Unexamined Patent Publication No. 2-21482 discloses a still image transfer system in which a plurality of still images are read out of a first storage medium and outputted to TV as a multi-image on a picture screen, from which desired still images are selected, and the selected still images are transferred from the first storage medium to another one.

The camera provided with a built-in printer disclosed in JPP No. 61-189785 is capable of storing the image data only for one frame, and therefore cannot output a multi-image.

The digital still camera disclosed in JPP No. 64-868 includes the semiconductor memory for storing image data for more than one frame. However, this camera is not provided with a printer for printing the images stored in the memory.

Further, the above still image transfer system is designed to facilitate transfer of the stored images from one storage medium to the other, and does not relate to a camera provided with a built-in printer capable of printing the photographed image.

It has been considered to provide peripheral devices such as a printer unit, a TV reproduction unit, and a CRT display unit in a main body of a still video camera in order to produce a multifunction camera. However, this makes the camera larger and heavier, which in turn reduces operability of the camera during the photographing operation. Also, there are a variety of reproduction devices for reproducing the stored images. However, it is uneconomical to provide such devices which are not normally in use. Accordingly, in a still video camera, it is more practical to form an image forming function, TV reproduction function, display function, and printing function respectively into units which can be generally and widely used, and combine some of these units according to needs to be systemized into a camera.

The still video camera disclosed in JPP No. 61-189785 is a camera provided integrally with a printer, and does not teach a concept of forming a systematic camera from units. Also, in JPP No. 1-204575, the display function is formed into the display unit removably attachable to the camera main body. However, this document neither teaches formation of the printing function into a unit, nor indicates a concept of systemizing the still video camera.

In a still video camera, a photographed image is converted into an electric signal and stored in a storage medium electrically or magnetically, obviating the need for providing a film take-up device as in a silver-salt camera. Therefore, an interior of the camera can be designed more freely. In a still video camera disclosed in Japanese Unexamined Patent Publication No. 1-186069, an external recording medium mounting portion is provided between an image forming section in which an optical system of the camera is arranged, and a release section in which operation buttons and the like of the camera are arranged. It is thereby designed to make the camera smaller-sized and utilize the space in the camera main body effectively.

In the case where a printer of the thermal transfer type or heat sensitive type is incorporated into the still video camera, the image forming section is adversely affected by the heat generated from a printer head at the time of printing. Accordingly, it is preferable to provide the image forming section including a photoelectric conversion element as far away from the printer as possible.

However, in the still video camera with the built-in printer disclosed in JPP No. 61-189785, the printer section is provided below the image forming section. This suggests the likelihood that the image forming section is adversely affected by the heat generated from the printer section, and thereby the photographed image is deteriorated.

Further, in the camera disclosed in JPP No. 1-186069, the image forming section and the release section are spaced away from each other by providing the external recording medium mounting portion therebetween. However, this arrangement is designed only to utilize the space in the camera main body effectively. This document does not disclose any arrangement in order to solve the aforementioned drawback in the case where the printer is provided internally in the camera main body.

It is an object of the present invention to provide still video camera which has overcome the foregoing drawbacks.

SUMMARY OF THE INVENTION

Accordingly, a camera of the present invention comprises means for photographing an object, printing means for printing a photographed image of the object, said printing means having a plurality of selectable printing modes, image data provision means for processing the photographed image to a plurality of sorts of image data corresponding to the plurality of selectable printing modes respectively, and supplying the image data to said printing means, selection means for selecting a desired printing mode of said printing means, and controller means responsive to said selection means for controlling said image data provision means so as to provide the sort of image data suitable for the selected printing mode to said printing means.

Also, a camera of the present invention comprises means for photographing an object, printing means for printing a photographed image of the object, said printing means having a plurality of selectable printing modes, paper feeder means for feeding print paper to said printing means, selection means for selecting a desired printing mode of said printing means, and controller means responsive to said selection means for controlling said paper feeder means so as to feed the print paper under a feeding condition suitable to the selected printing mode.

Further, a camera of the present invention comprises means for photographing an object, printing means for printing a photographed image of the object, said printing means having a first portion for carrying an ink ribbon and a second portion for carrying print paper, and having a plurality of printing modes, first detector means for detecting whether an ink ribbon is carried or not, second detector means for detecting whether print paper is carried or not, and determining means for determining a printing mode based on the detection result of said first and second detector means.

Furthermore, a camera of the present invention comprises means for photographing an object, printing means for printing a photographed image of the object, said printing means having a first portion for carrying an ink ribbon and a second portion for carrying print paper, and having a plurality of printing modes, first detector means for detecting what kind of ink ribbon is carried by the first portion, second detector means for detecting what kind of print paper is carried by the second portion, and determining means for determining a printing mode based on the detection result of said first and second detector means.

Moreover, a camera of the present invention comprises means for photographing an object, printing means for printing photographed image of the object, said printing means having a first portion for carrying an ink ribbon and a second portion for carrying print paper, and having a plurality of printing modes, first detector means for detecting what kind of ink ribbon is carried by the first portion, second detector means for detecting what kind of print paper is carried by the second portion, discriminating means for discriminating what combination of ink ribbon and print paper is carried by said printing means based on the detection result of said first and second detector means, and controller means responsive to said discriminating means for controlling said printing means. A camera system according to another aspect of the present invention has a camera section which includes photoelectric conversion elements and which picks up an image of an object to produce image data, a reproduction section which processes the image data so as to reproduce the picked-up image on a display screen, and a printer section which prints the picked-up image on printing paper based on the image data, the printer section being separably attachable to either of the camera section and the reproduction section to form an integral body.

In accordance with one preferred embodiment, the reproduction section can include an output device which transmits the processed image data to a television set having a display screen. The reproduction section may also be integrally provided with a monitor having a display screen.

Also in accordance with a presently preferred embodiment, the camera system further includes a recording portion which is electrically connected with the camera section and records the image data. The recording portion includes a first recorder which records the image data in an internal memory built in one or each of the camera section, the reproduction section, and the printer section; and a second recorder which records the image data in an external memory removably mountable on one or each of the camera section, the reproduction section, and the printer section.

A camera system according to yet another aspect of the present invention has a camera section which includes an image pick-up portion which has photoelectric conversion elements and picks up an image of an object to produce image data, and a recording portion which is electrically connected with the image pick-up portion and records the image data; and a reproduction section which includes a first reproducer which processes image data recorded by the recording portion so as to reproduce the picked-up image in the form of a video image, and a second reproducer which reproduces the picked-up image on a printing paper based on the image data recorded by the recording portion, wherein the reproduction section is separably attachable to the camera section.

A camera system according to still a further aspect of the present invention has a camera section which includes an image pick-up portion having photoelectric conversion elements and picks up an image of an object to produce image data, and a reproduction section which includes a first reproducer which processes the image data so as to reproduce the picked-up image in the form of a video image, and a second reproducer which reproduces the picked-up image on a printing paper based on the image data, wherein the reproduction section is separably attachable to the camera section.

The above and other objects, features and advantages of the present invention will become more apparent upon a reading of the following detailed description and drawings.

BRIEF DESCRIPTION OF THE DRAWINGS

FIG. 5 is a block diagram showing a printer section;

FIG. 9 is a diagram showing a configuration of an ink ribbon of the sublimation type;

FIG. 10 is a diagram showing a configuration of an ink ribbon of the melt-out type;

FIG. 31 is a perspective view showing a camera unit;

FIG. 32 is a perspective view showing a TV reproduction unit;

FIG. 33 is a perspective view showing a display unit;

FIG. 34 is a perspective view showing a printer unit;

DETAILED DESCRIPTION OF PREFERRED EMBODIMENTS OF THE INVENTION

Figure 3A:
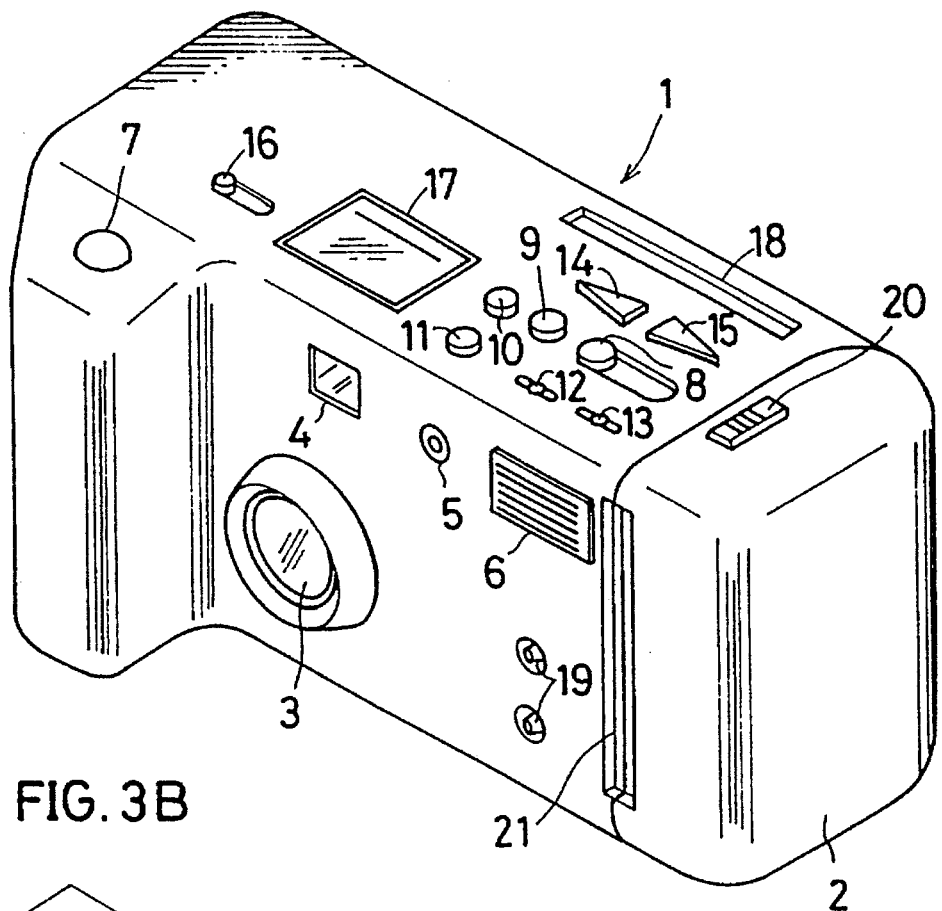
FIG. 3A is a perspective view showing the camera of the invention.

FIG. 3A is a perspective view showing a still video camera provided with a built-in printer of the present invention.

In FIG. 3A, indicated at 1 is a camera main body, and at 2 a printer case removably attachable to the camera main body 1 and having a construction necessary for a printing operation to be described hereinafter incorporated therein.

On a front portion of the camera main body 1 are provided taking lens 3, a viewfinder 4, an autofocus projector (hereinafter referred to as an AF projector) 5, a light emission window of an electronic flash 6, and a release/print start button 7. The AF projector 5 is adapted for projecting the light on an object so as to automatically detect an object distance.

On an upper face of the camera main body 1 are provided various kinds of operable members as follows. An operation mode changeover switch 8 is adapted for changing one operation mode to another among the following four modes. "OFF" mode, "RECORD" mode, "REPRODUCTION" mode and "PRINT" mode. A protect switch 9 is adapted for preventing already stored images from being inadvertently erased by an operator. A multi-image output switch 10 is adapted for outputting a plurality of stored images as one multi-image. A flash mode changeover switch 11 is adapted for changing one flash mode to another among the following three modes, "non-flash (OFF) mode," "automatic flash (AUTO) mode," "forcible flash (ON) mode." A date setting switch 12 is adapted for allowing a state where a photographing date can be set. A photographing mode changeover switch 13 is adapting for changing a photographing mode from one photographing mode to another among the following three modes. "SINGLE" mode. "SELF-TIMER" mode and "CONTINUOUS" mode each time it is turned on. "SINGLE" mode is a photographing mode in which a single frame of photograph is obtained each time the release start button 7 is pressed. "SELF-TIMER" mode is a photographing mode in which the photographing operation is executed with the use of a self-timer. "CONTINUOUS" mode is a photographing mode in which a plurality of frames of photographs are continuously obtained at a predetermined speed while the release start button 7 is pressed. A forward access button 14 is adapted for advancing (UP) stored images one by one each time it is turned on. A reverse access button 15 is adapted for reversing (DOWN) the stored images one by one each time it is turned on. A macro/binary photographing mode changeover switch 16 is slidable in a lateral direction of the camera and adapted for changing from a macrophotographing mode to a binary photographing mode, and vice versa by being slid. An indicator 17 comprises, for example, a liquid crystal display (LCD), and is adapted for displaying a date. a frame number in a photographing or printing operation, and other set modes thereon. A memory card inlet 18 is formed in the shape of a slit, and adapted for inserting an external storage medium (hereinafter referred to as a memory card) to the camera main body 1 therethrough. Television (TV) output terminals 19 are provided in specified positions on a front surface of the camera main body 1. A printer case detaching button 20 is operated so as to detach the printer case 2. A recording sheet inlet 21 is adapted for introducing therethrough a precut recording sheet into a printer provided in the printer case 2.

Figure 3B:
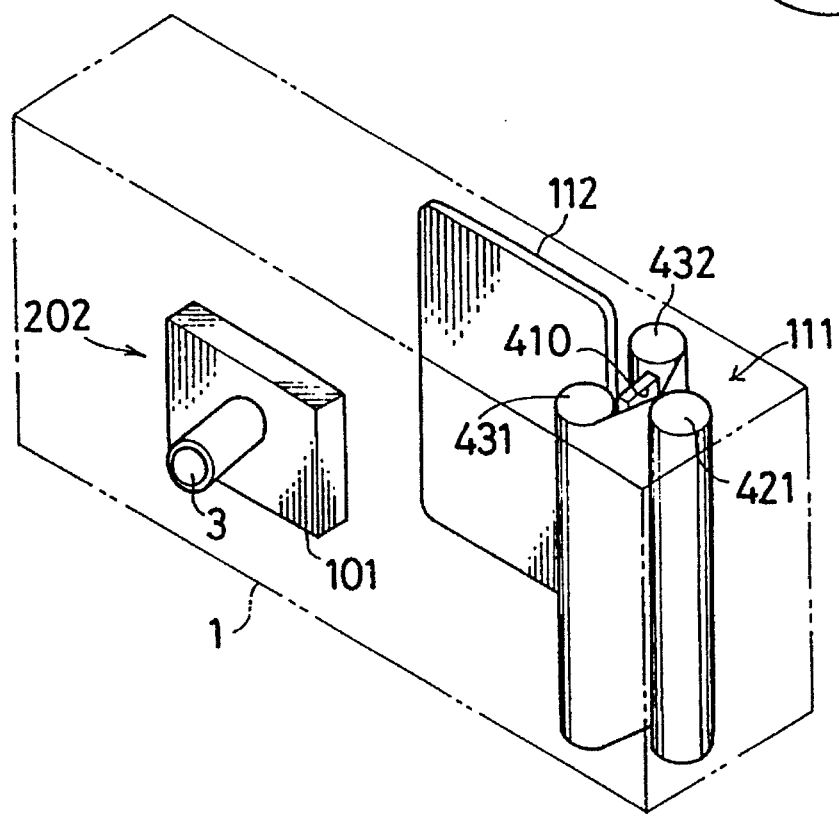
FIG. 3B is a diagram showing an arrangement of a memory card mounting portion, an image forming section, and a printer section of the camera.

FIG. 3B shows an arrangement of a memory card mounting portion, a printer section 111, an image forming section 202 provided in the camera main body 1. The memory card mounting portion provided substantially between the printer section 111 and the image forming section 202. With this arrangement, the space within the camera main body can be effectively utilized. In addition, it can be prevented that the heat generated by the printer section 111 adversely affects the image forming section 202.

Figure 1:
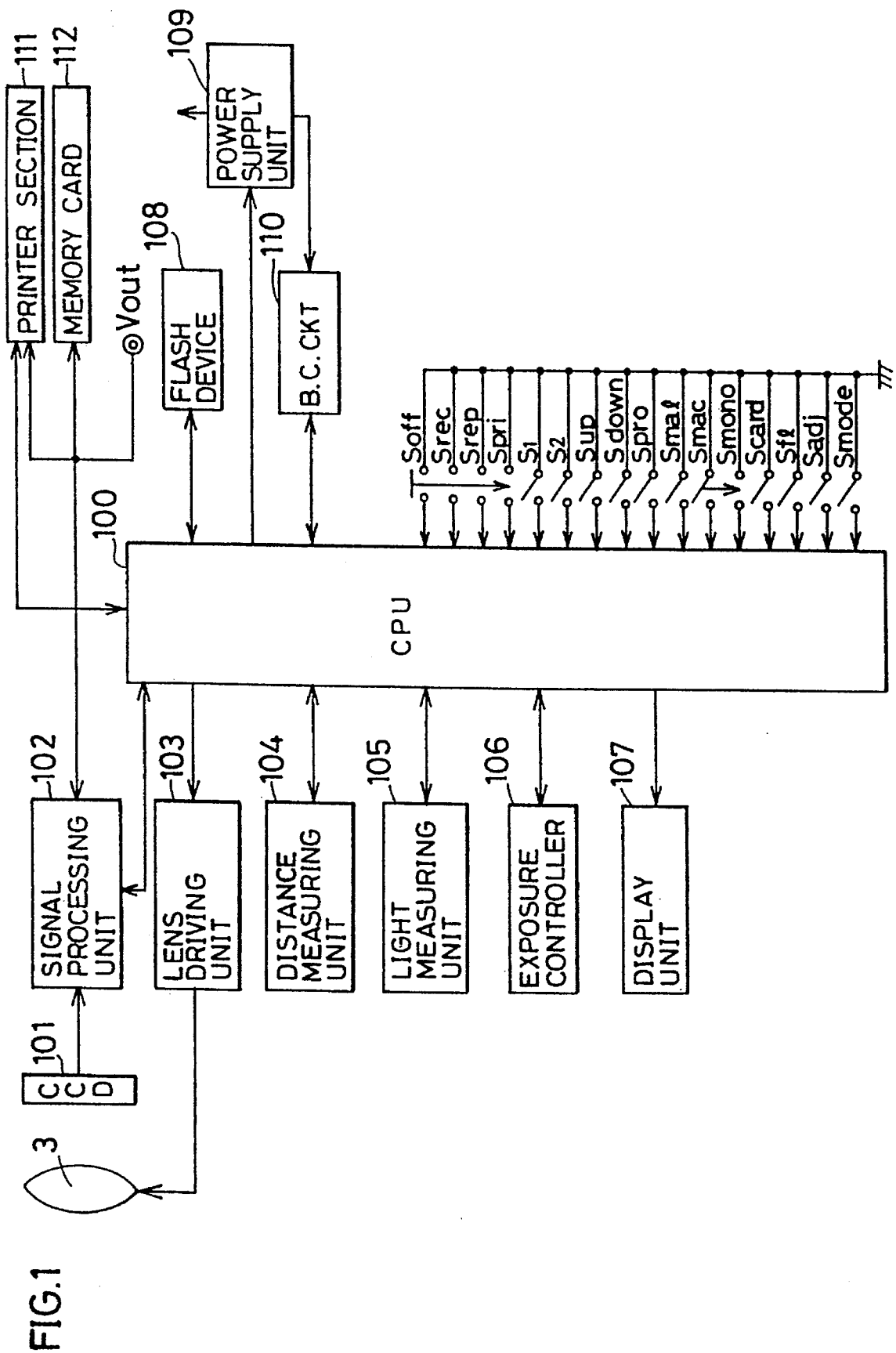
FIG. 1 is a block diagram showing a still video camera provided with a built-in printer embodying the invention.

FIG. 1 is a block diagram showing an overall construction of the camera.

A system control let (hereinafter referred to as CPU) 100 is adapted for controlling overall operations of the camera, including the printing operation. An object image formed through the taking lens 3 is picked up by a solid photoelectric conversion element (hereinafter referred to as CCD) 101 to be converted into an image signal. The image signal is sent from the CCD 101 to a signal processing unit 102 to be processed therein. The signal processing unit 102 will be described more in detail below. A lens driving unit 103 is adapted for controllably moving the taking lens 3 so as to attain an in-focus condition based on a measured object distance. A distance measuring unit 104 is adapted for measuring a distance to an object by using, for example, a phase difference detecting method. Based on the measured distance is calculated a driven amount of the taking lens 3 by the lens driving unit 103. A light measuring unit 105 is adapted for measuring luminance of the light illuminating the object and sending data representative of the measured luminance of the object to the CPU 100. An exposure controller 106 is adapted for executing an exposure control of the camera upon receipt of an exposure time (shutter speed) Tv and an aperture value Av from the CPU 100, both of which are obtained based on the measured object distance and the measured luminance of the object. A display unit 107 comprises the indicator 17 and a device for driving the indicator 17. An electronic flash device 108 is controlled in accordance with a booster control signal and a flash control signal for charging from the CPU 100, and emits flash light through the light emission window. A power supply unit 109 is adapted for supplying a high voltage of a predetermined level to the CCD 101, and a lower voltage of a predetermined level to other individual circuit elements. The power supply unit 109 will be described more in detail below. A battery checking circuit (hereinafter referred to as a BC circuit) 110 is connected to a main battery EB provided in the power supply unit 109, and adapted for checking the amount of power source in the main battery EB. The result of the battery checking is outputted to the CPU 100. The printer section 111 is controllably driven by the CPU 100, and adapted for printing an image on a recording sheet upon receipt of the image signal from the signal processing unit 102. The printer section 111 will be described more in detail below. A memory card 112 is a storage medium comprising, for example, a static random access memory (SRAM) and capable of storing a plurality of images. The memory card 112 is removably attachable to the camera main body 1. Indicated at Vout is a terminal corresponding to the TV output terminal 19.

Next, there will be described switches Soff to Smode.

Soff: A switch Soff is turned on when the operation mode changeover switch 8 is in the "OFF" mode position, to prohibit any camera operation.

Srec: A switch Srec is turned on when the operation mode changeover switch 8 is in the "RECORD" mode position, to enable a photographing operation.

Srep: A switch Srep is turned on when the operation mode changeover switch 8 is in the "REPRODUCTION" mode position, to enable a reproduction operation.

Spri: A switch Spri is turned on when the operation mode changeover switch 8 is in the "PRINT" mode position, to enable a printing operation of the stored images.

S1: A switch S1 is turned on when a release/print start button 7 is pressed halfway, to prepare for the photographing operation.

S2: A switch S2 is turned on when a release/print start button 7 is pressed all the way, to execute an exposure operation in the "RECORD" mode.

It should be noted that the switch S1 and the switch S2 are turned on to prepare for the printing operation and execute the printing operation in the "PRINT" mode respectively.

Sup: A switch Sup is turned on each time the forward access button 14 is pressed, to sequentially reproduce the stored images in a forward order.

Sdown: A switch Sdown is turned on each time the reverse access button 15 is pressed, to sequentially reproduce the stored images in a reverse order.

Spro: A switch Spro is actuated each time the protect switch 9 is pressed. The switch Spro is turned on to protect the stored images while being turned off to release protection of the stored images.

Smal: A switch Smal, corresponding to the multi-image output switch 10, is turned on to enable a multi-image output.

Smac: A switch Smac is a macrophotographing switch which is turned on when the macro/binary photographing mode changeover switch 16 is depressed, to enable macrophotography by inserting and placing an unillustrated macro lens on an optical axis.

Smono: A switch Smono is a binary photographing switch which is turned on when the macro/binary photographing mode changeover switch 16 is slid while being depressed, to enable character photographing or the like.

Scard: A switch Scard is turned on when the memory card is mounted to the camera main body 1.

Sfl: A switch Sfl is turned on when the flash mode changeover switch 11 is pressed, to cyclically change from one flash mode to another among "OFF" mode, "AUTO" mode, and "FORCIBLE ON" mode.

Sadj: A switch Sadj is a switch corresponding to the date setting switch 12.

Smode: A switch Smode is turned on each time the photographing mode changeover switch 13 is pressed, to cyclically change from one photographing mode to another among "SINGLE" mode, "SELF-TIMER" mode, and "CONTINUOUS" mode.

Figure 2A:
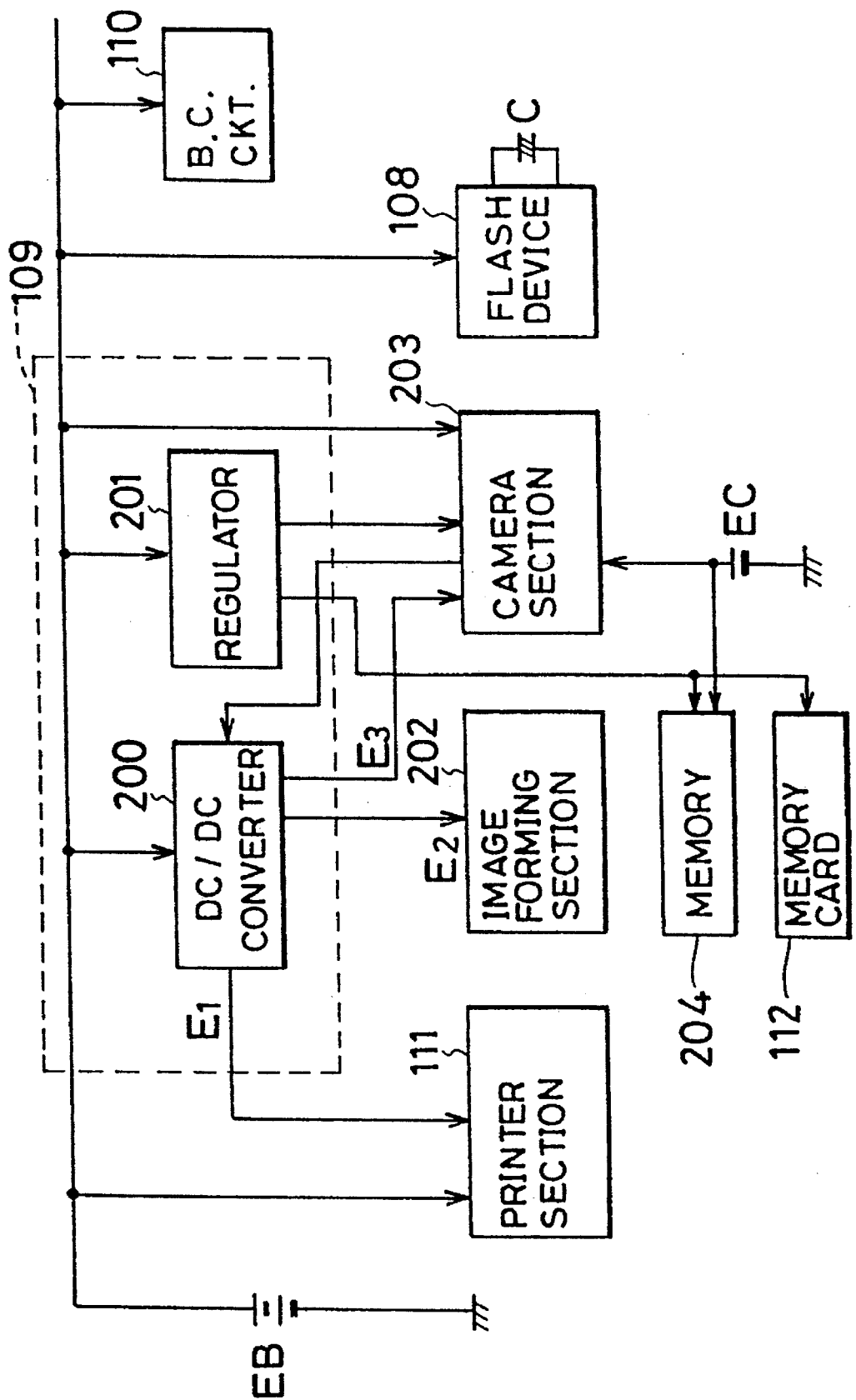
FIG. 2A is a diagram showing power supply relationship of a power supply unit of the camera.
Figure 2B:
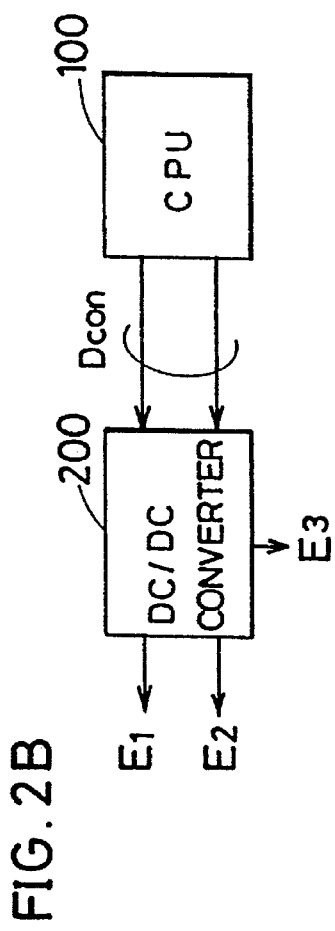
FIG. 2B is a diagram showing control lines between a CPU and a DC/DC converter.
Figure 2C:
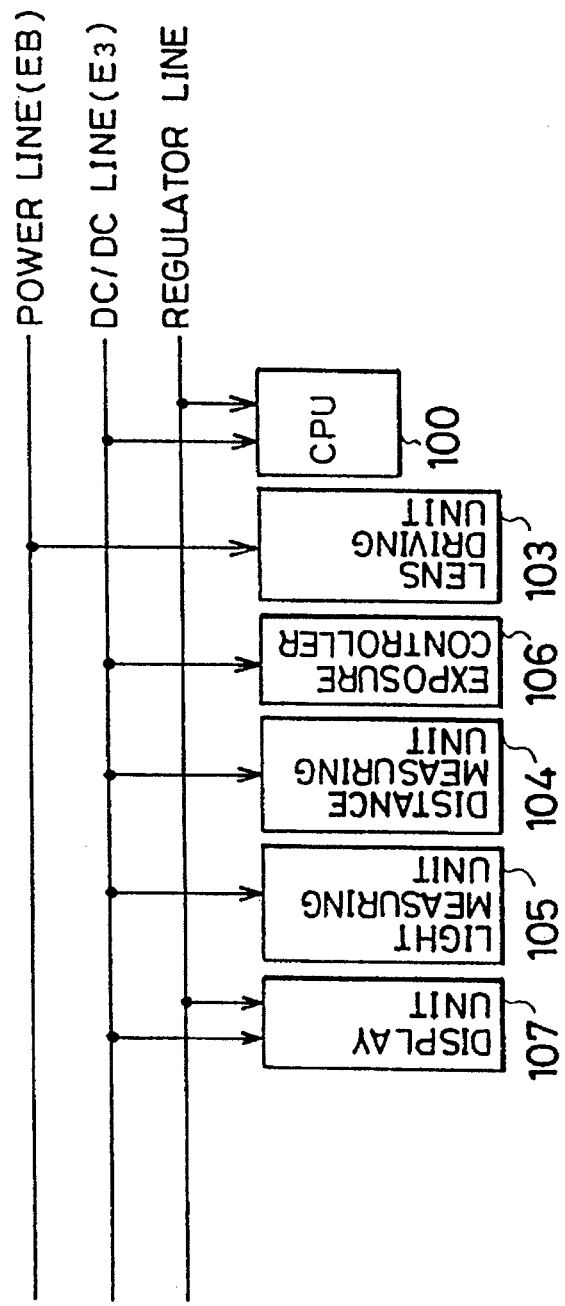
FIG. 2C is a diagram showing supply relationship of the power supplied to a camera section.

FIG. 2A, 2B, and 2C respectively show power supply relationship between the individual elements in the camera provided with a built-in printer. FIG. 2A is a diagram showing a construction of the power supply unit 109 and power supply relationship thereof with other elements. FIG. 2B is a diagram showing control lines between the CPU 100 and a direct current/direct current (DC/DC) converter 200. FIG. 2C is a diagram showing power supply relationship in a camera section 203.

In FIGS. 2A, 2B, indicated at EB is the main battery, and at EC is a back-up battery for backing up the camera section 203, a memory 204 provided in the camera main body 1, and the memory card 112. The memory 204 corresponds to memories 311, 312 shown in FIG. 4B. The DC/DC converter 200 is adapted for producing various voltages and supplying the same to the printer section 111, an image forming section 202, and the camera section 203 in accordance with a control signal Dcon from the CPU 100. The DC/DC converter 200 produces and supplies a high voltage E1, e.g., 24 V, to the printer section 111 so as to drive a printer head provided therein. The DC/DC converter 200 produces and supplies a voltage E2, e.g., 15 V, to the image forming section 202 so as to drive the CCD 101 provided therein. The DC/DC converter 200 produces and supplies a voltage E3 to the camera section 203 so as to drive the taking lens 3 or the like. The control signal Dcon consists of two bits, and is sent from the CPU 100 to the DC/DC converter 200 through two control lines provided therebetween as shown in FIG. 2B.

Table-1 below shows respective commands represented by the control signal Dcon. When the control signal Dcon is "00," it renders the DC/DC converter 200 inoperative, and thereby a drive voltage is not supplied to any of the printer section 111, image forming section 202, and camera section 203. When the control signal Dcon is "01," it renders the DC/DC converter 200 to produce the voltage E3 and supply the same only to the camera section 203. When the control signal Dcon is "10," it renders the DC/DC converter 200 to produce the voltages E2, E3 and supply the same to the image forming section 202, and the camera section 203 respectively. When the control signal Dcon is "11," it renders the DC/DC converter 200 to produce the voltages E1, E3 and supply the same to the printer section 111, the camera portion 203.

TABLE 1

| Dcon | PRINTER SEC. | IMAGE FORMING SEC. | CAMERA SEC. |
|---|---|---|---|
| 00 | X | X | X |
| 01 | X | X | O |
| 10 | X | O | O |
| 11 | O | X | O |

X: OFF, O: ON

Referring back to FIG. 2A, indicated at 201 is a power regulator for regulating the power supplied from the main electric battery EB to a voltage of, e.g., 5 V and supplying the regulated voltage to the CPU 100, indicator 107 or the like provided in the camera section 203 so as to drive it. In addition, the power regulator 201 supplies the regulated voltage to the memory 204 and the memory card 112 provided in the camera main body 1. The power is supplied to the flash device 108 directly from the main battery EB. The supplied power is used for charging a main capacitor C or other purposes.

As will be seen from FIG. 2C, the power is supplied from the power regulator 201 to a liquid crystal portion of the indicator 107 and the CPU 100, both of which can be driven at a low voltage and consume relatively small power. The power is supplied from the DC/DC converter 200 to a portion of the CPU 100, the distance measuring unit 104, the light measuring unit 105, the exposure controller 106, and portion of the indicator 107, any of which has a relatively large power consumption. The power is supplied from the main battery EB to the lens driving unit 103 having a large power consumption.

Figure 4A:
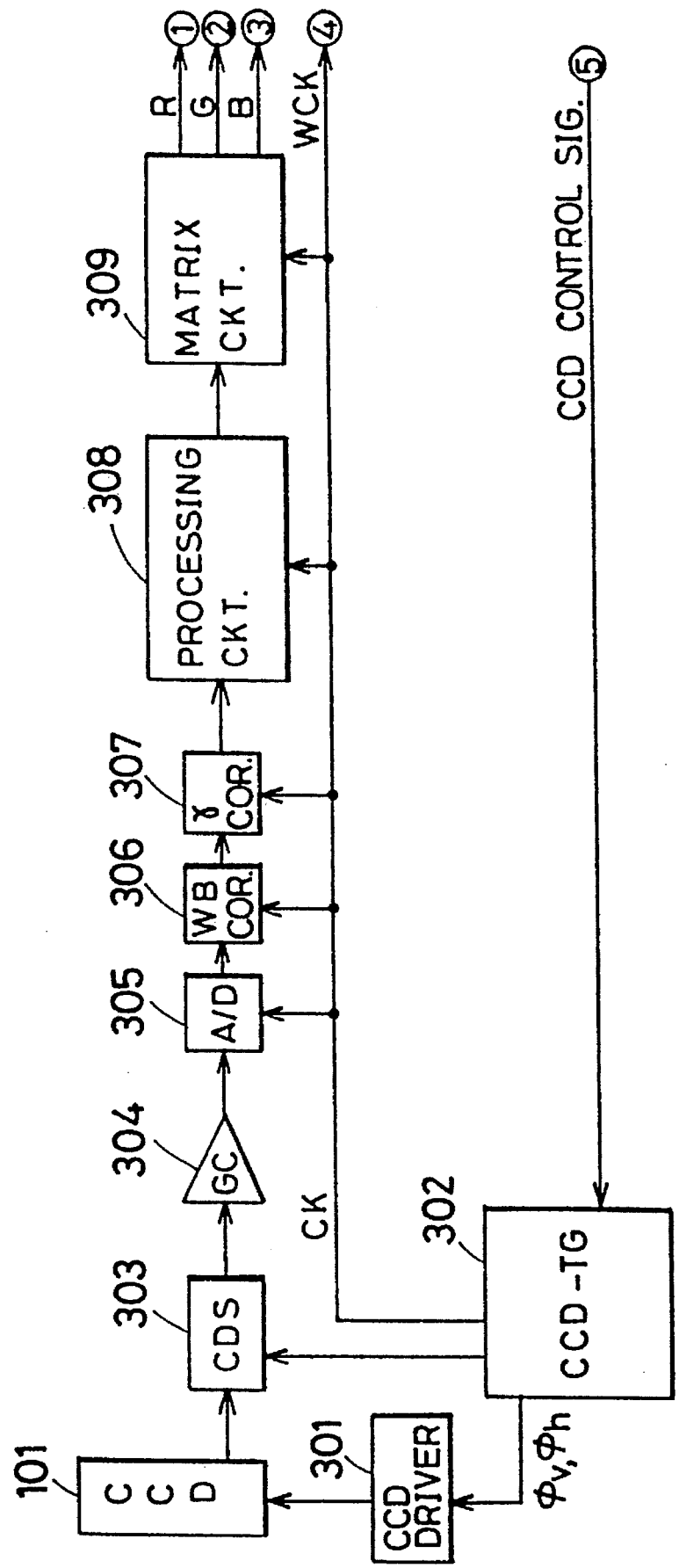
FIGS. 4A, 4B, and 4C are detailed block diagrams combinedly showing a signal processing unit.
Figure 4B:
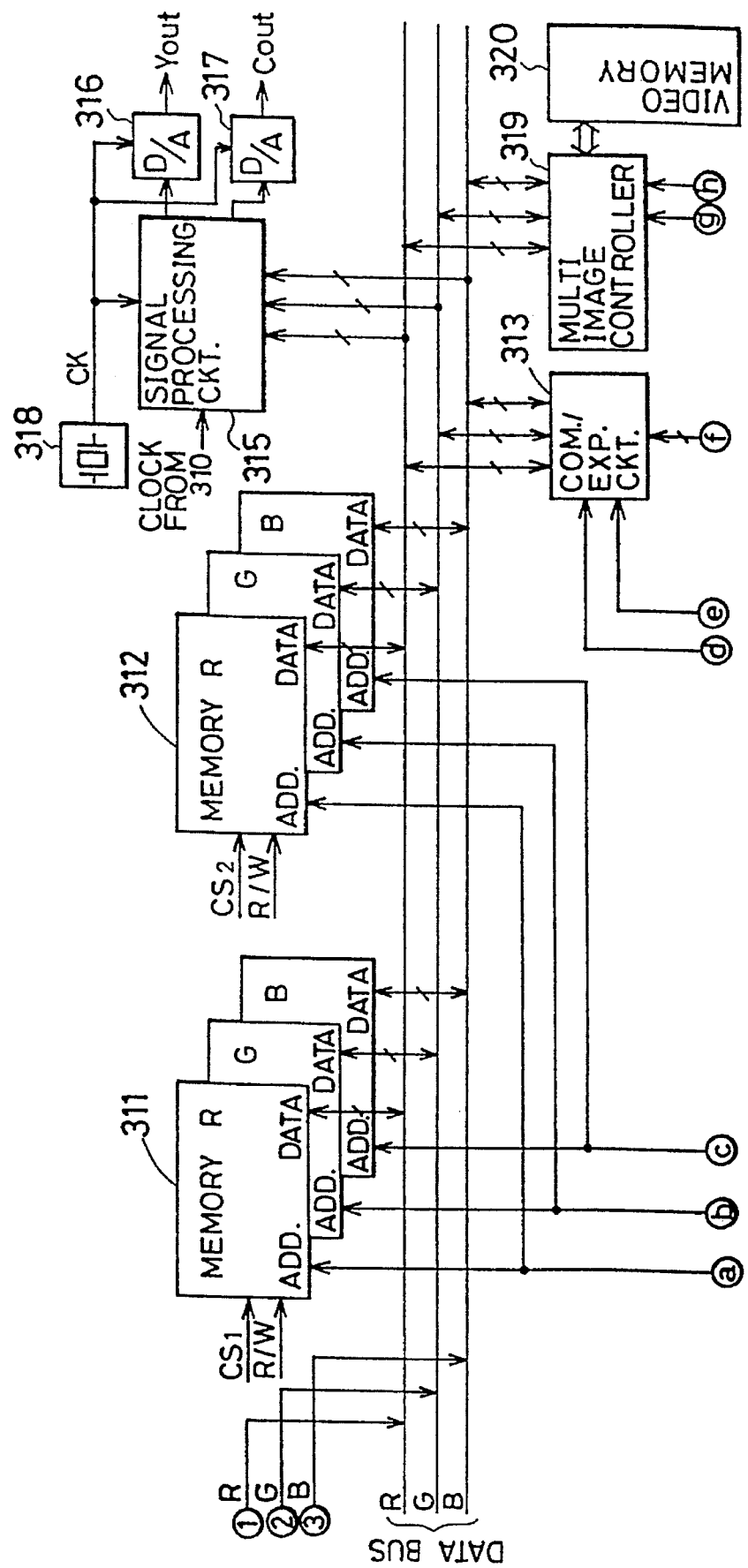
Figure 4C:
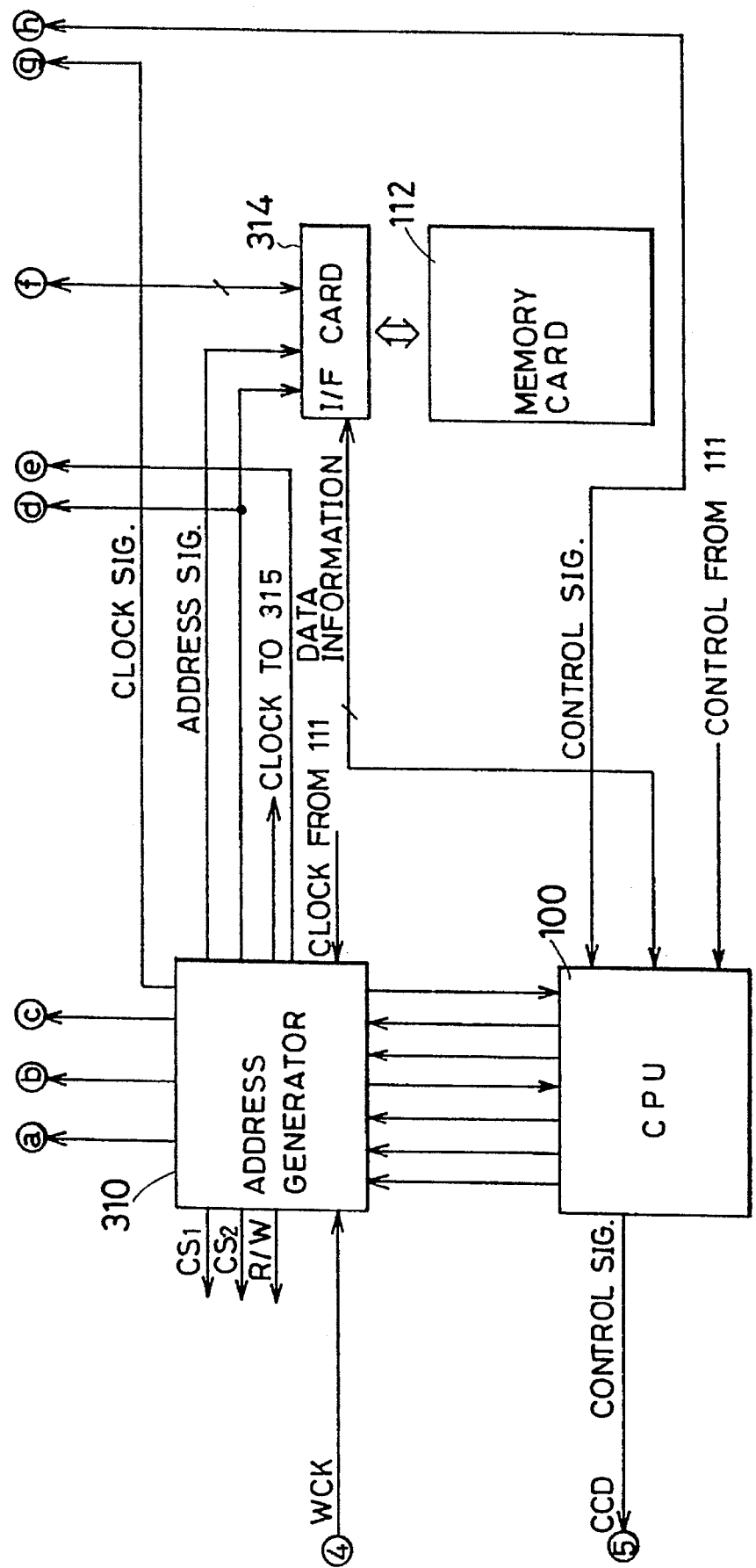

FIGS. 4A, 4B are block diagrams combinedly showing the signal processing unit 102 in detail.

In FIG. 4A, the CCD 101 is a color photoelectric conversion element having striped filters of red (R), green (G), and blue (B) and is driven by a CCD driver 301. A CCD-TG 302 is a timing generator for supplying a control signal and a control pulse to individual circuits in the signal processing unit 102 in accordance with a control signal from the CPU 100. The CCD-TG 302 sends clocks $\phi v$, $\phi h$ to the CCD driver 302 to cause it to drive the CCD 101 to send an image signal to a CDS 303 to be described below. The CCD driver 301 controls the start of charging and reading out of the stored charges of the CCD 101. In this way, the CCD controls the amount of stored charges. Further, the CCD-TG 302 sends a timing pulse to the CDS 303 and clock pulses CK to other circuits. The CDS 303 is adapted for executing sampling so as to apply double correlation to the image signal from the CCD 101. A gain controller (GC) 304 is adapted for adjusting the gain of the image signal. The image signal having the gain thereof adjusted is sent to an analog/digital (A/D) converter 305 to be converted from an analog signal to a digital signal. A white balance correction circuit 306 is adapted for performing WB correction to the digital image signal in accordance with color temperature or color balance data received from an unillustrated WB sensor through the use of a predetermined conversion table. A γ correction circuit 307 is adapted for performing γ correction further to the image signal sent from the WB correction circuit 306 through the use of a predetermined conversion table so as to correct gradation of the image signal. A processing circuit 308 and a matrix circuit 309 are respectively adapted for generating respective color image signals of R, G, and B (hereinafter referred to as a R-signal, a G-signal, and a B-signal respectively) from the image signal.

In FIG. 4B, memories 311, 312 are adapted for storing the R-, G-, and B-signals from the matrix circuit 309, and have storage capacity of at least one frame of image respectively. An address generator 310 is adapted for generating and outputting control signals required for an image writing-in or reading-out operation, such as a chip select signal and a read-out address, in cases such as when the image signal from the CCD 101 is to be written in the memories 311, 312, the image signal is to be read out of the memories 311, 312, and the image signal is to be written in or read out of the memory card 112.

A signal compression/expansion circuit 313 is adapted for determining whether the image signal is to be written in or read out of the memory card 112, and, based on the determination, compressing the respective signals when the image signal is to be written in the memory card 112 and expanding the compressed signals read from the memory card 112 to the original image signal when the image signal is read out of the memory card 112. The image signal is converted into low band luminance signal Y and a color difference signal when written in the memory card 112. The image signal is sent between the memory card 112 and the CPU 100, address generator 301, and signal compression/ expansion circuit 313 through an interface (hereinafter referred to as card I/F) 314. A signal processing circuit 315 for TV output is adapted for applying a processing to an image signal sent thereto in accordance with a reproduction write clock so as to be outputted to the TV. A processed video signal is stored in an unillustrated video memory provided in the TV output signal processing circuit 315. The TV output signal processing circuit 315 generates a low band luminance signal Y and a color difference signal C from the respective R-, G-, and B-signals. Digital/analog (D/A) converters 316, 317 are adapted for respectively converting the digital low band luminance signal Y and color difference signal C read out of the video memory in the TV output signal processing circuit 315 into an analog low band luminance signal Yout and an analog color difference signal Cout, and outputting the same to an unillustrated TV through a TV output terminal 19. An oscillator 318 is adapted for generating a read-out clock for reproduction, and generating and sending output clock signals to the D/A converters 316, 317. A controller 319 for multi-image reproduction is adapted for generating a multi-image to be reproduced. The reproduced multi-image is temporarily stored in a multi-image memory 320.

Next, there will be described an operation of the aforesaid block in a photographing/recording operation, a recording operation to the memory card, a TV reproduction operation, a printing operation, and a multi-image processing respectively.

(1) Photographing/Recording Operation

When the release/print start button 7 is pressed with the operation mode changeover switch 8 being in a "RECORD" mode, the CPU 100 sends a CCD control signal to the CCD-TG 302 so as to control an exposure time of the CCD 101. More specifically, the CPU 100 drives the light measuring unit 105 to measure the luminance of the light, calculates an aperture value Av and an exposure time Tv based on the measured light, and controls a diaphragm in accordance with an aperture value Av. The CPU 100 further sends the CCD control signal to the CCD-TG 302 according to the exposure time TV. In a camera which effects an exposure operation continuously twice by swinging the CCD 101 by a half pitch of the element of the CCD in order to obtain higher resolution as disclosed in Japanese Unexamined Patent Publication No. 59-174085, the CPU 100 controls the exposure time of the respective exposure operations.

During the exposure operation, the CPU 100 sends a memory select signal to the address generator 310 so as to select a memory in which image signals are to be written. Upon receipt of the memory select signal, the address generator 310 sends chip select signals CS1, CS2 to the memories 311, 312. Further, the CPU 100 causes the address generator 310 to send read/write (R/W) signals respectively to the memories 311, 312, whereby enabling the image signal from the CCD 101 to be written in the memories 311, 312. Thereafter, it is started to read the image signals out of the CCD 101 upon completion of the exposure operation. The read out image signals are sequentially written in the selected memory in accordance with a write address generated based on a write start signal and a write clock WCK. Upon completion of writing of the image signals, the address generator 310 sends a write end signal to the CPU 100, which in turn causes the image signal writing operation into the selected memory to stop.

In the case where the image signals stored in the memory card 112 are to be written in any one of the memories 311, 312, the CPU 100 causes the address generator 310 to send the chip select signal CS1 or CS2 to the memory 311, or 312, thereby selecting either of the memory 311 or 312 in which the image signals are to be written. Thus, the image signals from the memory card 112 are written in the selected memory. Upon completion of writing of the image signals, the CPU 100 receives the write end signal from the address generator 310, whereby causing to stop the image signal writing operation into the selected memory.

Further, if any instruction is manually given after the image signal writing operation, the CPU 100 enables the written image signals to be outputted to an output end according to the instruction to be described below.

(2) Recording Operation in the Memory Card

The image signals written in the memories 311, 312 in a manner as described above can be transferred to the memory card 112 and stored therein if necessary. When confirming that the memory card 112 is selected as an output end of the image signals, the CPU 100 executes the following operations. Data administration/retrieval information, such as the number of frames in use, is read out of the memory card 112. Based on the read out information, a write start address in the memory card 112 is determined. The image signals are read out either of the memory 311 or 312 in accordance with an output start signal, and sent to the signal compression/ expansion circuit 313.

After converting the image signals sent thereto into low band luminance signals Y and color difference signals C, the signal compression/expansion circuit 313 applies compression processing to the respective converted signals by adopting, for example, an adaptive discrete cosine transform (ADCT) method. The compressed low band luminance signals and color difference signals are written in the memory card 112 through the card I/F 314 in accordance with write addresses information from the address generator 310. Upon completion of the writing operation in the memory card 112, the address generator 310 sends an output end signal to the CPU 100. Each time the CPU 100 receives the output end signal, the data administration/retrieval information is renewed.

(3) TV Reproduction

When the release/print start button 7 is pressed with the operation mode changeover switch 8 being in a "REPRODUCTION" mode, the CPU 100 selects the TV output signal processing circuit 315 as an output end of the image signals. Then, the image signals stored in the memory 311 or 312, or the memory card 112 are read therefrom, and written in the unillustrated video memory provided in the TV output signal processing circuit 315 in the form of R-, G-, B-signals in accordance with a reproduction write clock from the address generator 310. The TV output signal processing circuit 315 converts the R-, G-, B-signals written in the video memory into a low band luminance signal Y and a color difference signal C. In addition, the TV output signal processing circuit 315 adds a burst signal, horizontal and vertical synchronizing signals, and other signals onto the respective low band luminance signal Y and color difference signal C so as to produce a standard television signal such as an NTSC video signal. The produced video signal is written in the video memory in the TV output signal processing circuit 315 again. After all the video signals are written in the video memory, the video signals in the video memory are repeatedly read out at a predetermined interval in accordance with a reproduction clock from the generator 318, and then converted into analog video signals by the D/A converters 316, 317. The converted analog video signals are outputted to the unillustrated TV through the TV output terminal 19. As a consequence, the photographed image is displayed on TV as a still image.

(4) Printing Operation

The printing operation of the stored image signals are executed in the printer section 111 shown in FIG. 5.

When the release/print start button 7 is pressed with the operation mode changeover switch 8 being in a "PRINT" mode, the CPU 100 executes the following operations. The image signals stored in the memory 311 or 312, or the memory card 112 are read therefrom in accordance with the read-out clock from the address generator 310, and sent to a data converting circuit 321 for a printer. At this time, the CPU 100 confirms a state of the printer section 111 according to control data inputted thereto by way of a system bus SB, and controls the printer section 111 based on the confirmed state. Thereafter, data represented by the image signals is converted in the print signal converting circuit 321 in accordance with a desired print system to be described below, and then introduced to a thermal head 410 to be printed out. A print signal is representative of data to be printed. The printing operation will be described more in detail later.

(5) Multi-Image Processing

The CPU 100 is also programmed to execute multi-image processing, so that the image signals stored in the memory 311 or 312, or the memory card 112 can be reproduced on TV or printed out as a multi-image.

When the image signals are to be reproduced on TV as a multi-image, the multi-image reproduction controller 319 sets the number of frames of images in a picture plane displaying the multi-image at first. The image signals to be displayed as a multi-image are sequentially selected out of the memory 311 or 312, or the memory card 112 in the order of display positions and written in corresponding storage area in the multi-image memory 320. In this case, sampling or filtering are performed to the selected image signals according to the size of the display so as to be desirably written in the predetermined storage area.

When all the image signals of the set number to be displayed on the picture plane (hereinafter referred to as multi-image signals) of the set number are written in the multi-image memory 320, the CPU 100 selects a reproduction circuit, i.e., TV connected to the TV output terminal 19, as an output end of the multi-image signals. Then, the multi-image signals are read out of the multi-image memory 320 in accordance with a read-out clock from the multi-image reproduction controller 319 and written in the video memory in the TV output signal processing circuit 315 in the form of R-, G-, and B-signals. After being written in the video memory, the multi-image signals are converted from the R-, G-, and B-signals into the low band luminance signals Y and the color difference signals C in accordance with the reproduction write clock, and then into the NTSC video signals as described above. The NTSC video signals are written in the video memory in the TV output signal processing circuit 315 again. When all the NTSC video signals are written in the video memory, the NTSC video signals are read out repeatedly at a predetermined interval in accordance with the reproduction clocks from the oscillator 318, and converted from the digital video signals into analog video signals by the D/A converters 316, 317 to be outputted to the unillustrated TV. Thus, the multi-images are displayed on TV as a still image.

On the other hand, when the multi-image is to be printed out, the multi-image signals are sent to the print signal converting circuit 321 shown in FIG. 5, in which data represented sented by the multi-image signals is converted. Consequently, the converted data is introduced to the thermal head 410 to be printed out.

FIG. 5 is a block diagram showing a construction of the printer section 111.

In FIG. 5, indicated at 400 is a thermal head control circuit 400 for controlling an operation of a thermal head block 403. The thermal head block 403 comprises a thermal head 410 for printing one line or several lines at one time and a thermal head pressing solenoid 411. The thermal head pressing solenoid 411 is adapted for switching a position of the thermal head 410 between a printing position where the thermal head 410 is pressed against a platen roller 421 to be described below and a standby position.

A solenoid/motor driving circuit 401 is adapted for controllably driving the thermal head pressing solenoid 411 and a DC servo motor 420. The DC servo motor 420 is adapted for drivingly rotating the platen roller 421 disposed opposingly to the thermal head 410 and grip rollers 425 provided at opposite sides of the platen roller 421, see FIG. 6.

A sheet feed block 404 is adapted for feeding a recording sheet, and comprises a pair of nip rollers 412, a rotation sensor 413, and recording sheet sensors A 414, B 415. The pair of nip rollers 412 are provided rotatably bearing in contact with the grip rollers 425. The rotation sensor 413 is adapted for detecting rotation of the nip rollers 412. The recording sheet sensors A 414, B 415 are adapted for discriminating a recording sheet of one type against that of another type.

An ink ribbon feed block 405 is adapted for taking up an ink ribbon, and comprises an ink ribbon 416, leading end sensors A 417, B 418 respectively for detecting leading end of respective ribbon segments of the ink ribbon 416 to be described more in detail below, and an ink ribbon sensor 419 for detecting whether the ink ribbon is set. The rotational force of the nip rollers 412 are transmitted to a shaft of a take-up reel for taking up the ink ribbon 416 through an unillustrated clutch or gear, whereby the ink ribbon 416 is taken up in synchronism with rotation of the nip rollers 412.

A sensor signal input circuit 402 is a circuit to which are inputted sensor signals sent from the rotation sensor 413 and the recording sheet sensors A 414. B 415 provided in the sheet feed block 404, and the leading end sensors A 417. B 418, and the ink ribbon sensor 419 provided in the ink ribbon feed block 405, and other sensors.

Next, there will be described an interior mechanism of the printer section 111.

Figure 6:
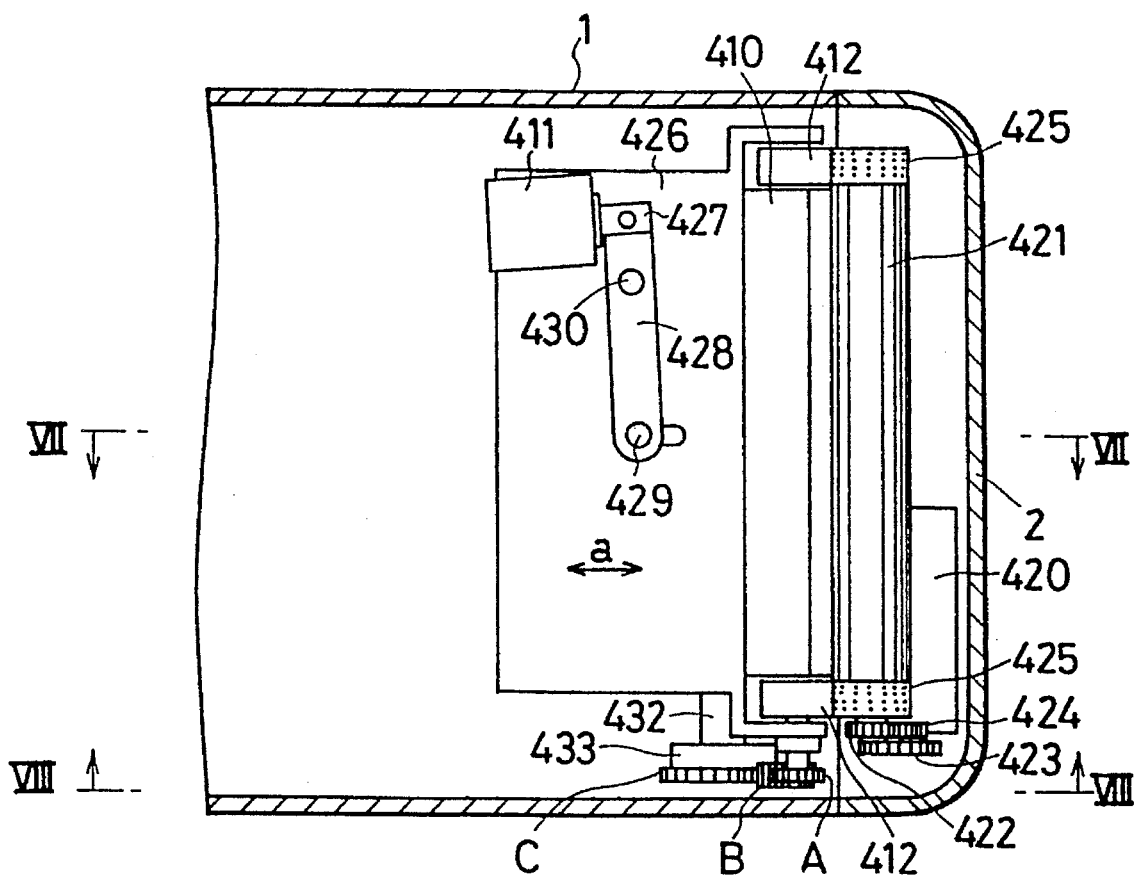
FIG. 6 is a front view in section of the printer section.
Figure 7:
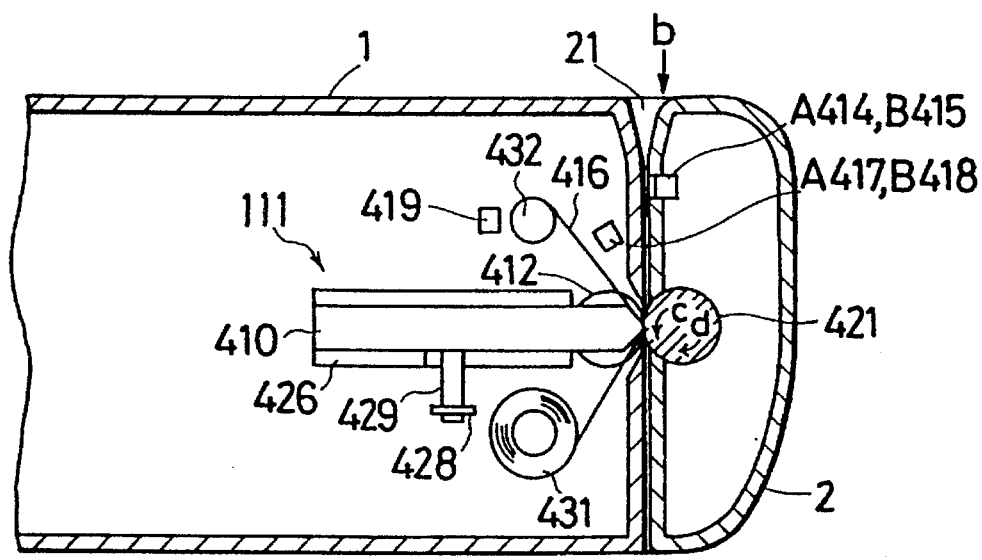
FIG. 7 is a sectional view taken along the line VII—VII in FIG. 6.
Figure 8:
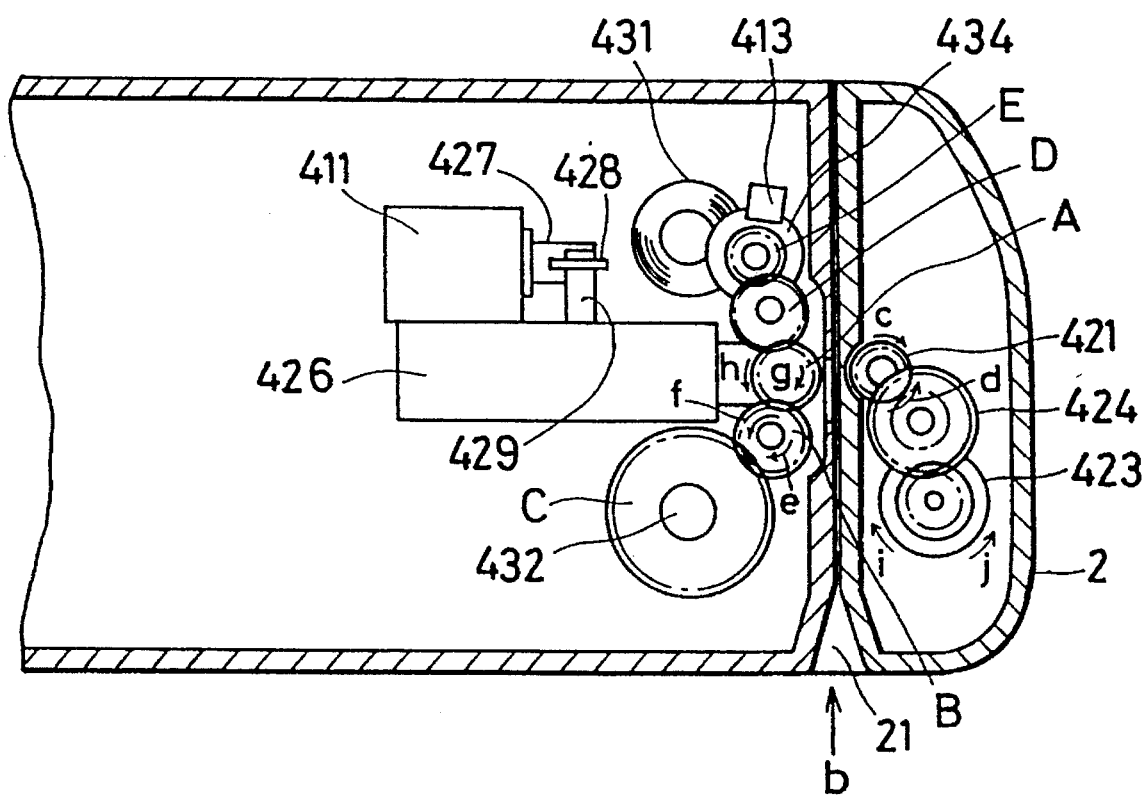
FIG. 8 is a sectional view taken along the line VII—VII in FIG. 6.

FIG. 6 is a view in a vertical section showing the printer section 111. FIG. 7 is a sectional view taken along the line VII—VII in FIG. 6, FIG. 8 is a sectional view taken along the line VIII—VIIIin FIG. 6.

In FIG. 6, the platen roller 421 and the DC servo motor 420 for driving the platen roller 421 are provided in the printer case 2. The platen roller 421 is arranged in such a position as to oppose to the thermal head 410 when the printer case 2 is attached to a camera main body 1. To an upper and a lower end portions of the platen roller 421 are fixed grip rollers 425 having many small protuberances formed on outer surfaces thereof. The grip rollers 425 are designed to rotate integrally with the platen roller 421. Further, a gear 422 is attached to the platen roller 421 under the lower-positioned grip roller 425 in the plane of FIG. 6. The gear 422 is coupled to a gear 423 of the DC servo motor 420 through a gear 424. The platen roller 421 is drivingly rotated by the DC servo motor 420 through the gears 422 to 424.

Other mechanisms necessary for the printing operation are provided in a case of the camera main body 1.

The thermal head 410 is held slidably in directions indicated by arrows a in a container 426 in such a manner as to oppose to the platen roller 421. Further, the thermal head pressing solenoid 411 is fixed to the container 426. The solenoid 411 is coupled to the thermal head 410 in the container 426 through a plunger 427 thereof, a lever 428. and a shaft 429. The thermal head 410 is made slidable in the direction indicated by the arrows a by pivoting the lever 428 about a supporting point 430 thereof with the use of the thermal head pressing solenoid 411 and an unillustrated helical spring connected to the lever 428. Thereby, the thermal head 410 is made movable between the pressing position and the standby position relative to the platen roller 421. More specifically, upon energization of the solenoid 411, the thermal head 410 is held in the pressing position. On the contrary, upon deenergization of the solenoid 411, the thermal head 410 is held in the standby position. Further, the container 426 has bearing structures formed at a right upper end and a right lower end thereof. The nip rollers 412 are rotatably mounted to the respective bearing structures with interposing the thermal head 410. The nip rollers 412 bear in pressing contact with respective grip rollers 425. Accordingly, the recording sheet can be accurately fed by the rotational forces of the grip rollers 425 and the nip rollers 412.

The ink ribbon 416 is set stretchingly between a feed roller 431 and a take-up roller 432 with passing between the thermal head 410 and the platen roller 421 halfway as shown in FIG. 7. It is discriminated by the ink ribbon sensor 419 whether the ink ribbon is set or not.

Referring back to FIG. 6, a gear C is attached through a slide clutch 433 to a bottom portion of the take-up roller 432 on which the ink ribbon 416 is mounted. The gear C is further coupled to a gear A attached to the lower-positioned nip roller 412 through a gear B. The slide clutch 433 always causes the take-up roller 432 to rotate at a suitable speed irrespective of the speed at which the nip rollers 412 rotate, thereby taking up the ink ribbon 416 in a stable manner. The gear B is in mesh with the gear C when rotating in a direction indicated by an arrow f while being out of mesh with the gear C when rotating in a direction indicated by an arrow e in FIG. 8. The rotational force of the nip rollers 412 is transmitted to the shaft of the take-up roller 432 only when the nip rollers 412 rotate in a direction indicated by an arrow g. More specifically, the printing operation is not executed when a recording sheet is fed in a direction indicated by an arrow b with the nip rollers 412 so as to set the recording sheet in a predetermined position. Thus, in this case, the rotational force of the nip rollers 412 is not transmitted to the shaft of the take-up roller 432 lest the ink ribbon should be taken up by the take-up roller 432. On the other hand, the printing operation is executed when the recording sheet is fed in a direction opposite of the b-direction with the nip rollers 412. Thus, in this case, the rotational force of the nip rollers 412 is transmitted to the shaft of the take-up roller 432.

The gear A is coupled to a gear E attached to a slit plate 434 through a gear D. Accordingly, the slit plate 434 rotates together with the nip rollers 412. Rotation of the slit plate 434, i.e., rotation of the nip rollers 412, is detected by the rotation sensor 413, which outputs a sensor signal representative of the detected rotation. Based on the sensor signal from the rotation sensor 413, the thermal head 410 prints the image on the recording sheets according to the speed at which the recording sheet is fed, and the ink ribbon 416 is controllably taken up appropriately.

The ink ribbon 416 in use has a width equal to that of the thermal head 410. FIG. 9 shows an example of an ink ribbon of the sublimation type. FIG. 10 shows an example of an ink ribbon of the melt-out type.

Both the sublimation type ink ribbon and the melt-out type ink ribbon have colored portions of three colors, namely, yellow, magenta, and cyan, arranged recurrently in this order from the take-up roller 432, each colored portion having a predetermined length. One yellow portion, one magenta portion, and one cyan portion constitute a ribbon segment. Between a cyan portion and a yellow portion is provided a transparent portion 416a indicative of a leading end of a ribbon segment. Further, to the transparent portion 416a is affixed a black marker m, which indicates the type of the ink ribbon. For instance, in the sublimation type ink ribbon, the marker m is provided at a right end portion of the transparent portion 416a with respect to a direction in which the ink ribbon is taken up, see FIG. 9. In the melt-out type ink ribbon, the marker m is provided at a left end portion of the transparent portion 416a with respect to the ink ribbon take-up direction, see FIG. 10. Markers m provided at the left end portions of the transparent portions 416a with respect to the ink ribbon take-up direction are detected by the leading end sensor A 417. On the other hand, markers m provided at the right end portions of the transparent portions 416a with respect to the ink ribbon take-up direction are detected by the leading end sensor B 418. In accordance with sensor signals sent from the leading end sensors A 417, B 418, the type of the ink ribbon 416 in use is discriminated, and the leading end of the ribbon segment fed to a predetermined position in the printing operation. More specifically, in the case where the marker m is detected by the leading end sensor A 417, the ink ribbon in use is discriminated to be of the melt-out type. On the contrary, in the case where the marker m is detected by the leading end sensor B 418, the ink, ribbon in use is discriminated to be of the sublimation type.

It should be noted that the positions of the markers m are not limited to opposite end portions of the transparent portion 416a. The marker m may be provided in a position deviated from a center line of the ink ribbon 416 to the left or to the right. Further, a corresponding relationship between the position of the marker m and the type of the ink ribbon 416 is not limited to the foregoing one, but a desired corresponding relationship of these can be determined.

Figure 11:
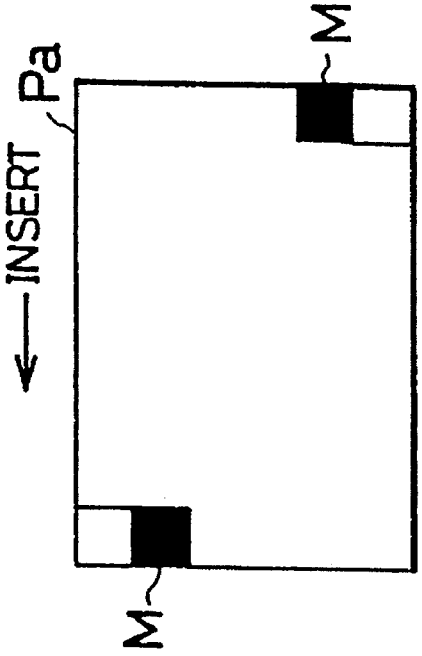
FIG. 11 is a diagram showing a recording sheet of the sublimation type with markers affixed to specified positions thereon.
Figure 12:
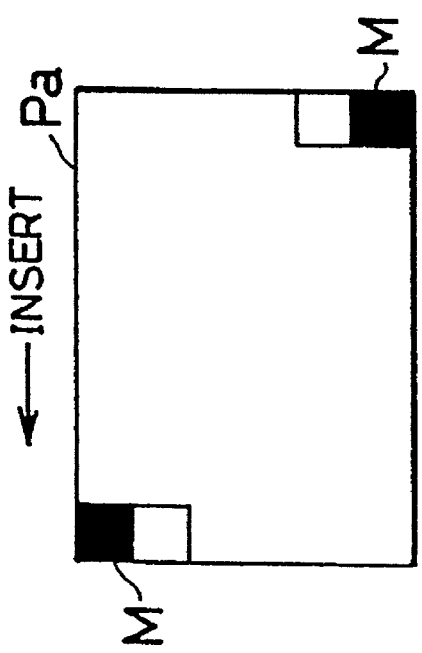
FIG. 12 is a diagram showing a recording sheet of the thermal type with markers affixed to specified positions thereon.

To a recording sheet is affixed a marker M in the form of a square indicative of the type of the recording sheet. FIG. 11 shows an example of a recording sheet of the sublimation type. FIG. 12 shows an example of a recording sheet of the thermal type. The marker M is affixed to a specified position of a rear surface of a recording sheet Pa. In the sublimation type recording sheet, two markers M are provided at opposite ends of a diagonal line extending from a left upper end to a right lower end of the recording sheet Pa. In the thermal type recording paper sheet two markers M are provided at positions inward of opposite ends of a diagonal line by one marker with respect to a direction perpendicular to an recording sheet inserting direction. In this embodiment, a marker M is not affixed to a recording sheet for the melt-out type ink ribbon. The recording sheet Pa may be a label paper sheet to a rear surface of which a layer of adhesive is applied.

The markers M provided at the opposite ends of the diagonal line on the rear surface of the recording sheet are detected by the recording sheet sensor A 414. On the other hand, the markers M provided at positions inward of opposite ends of a diagonal line by one marker with respect to the direction perpendicular to the recording sheet inserting direction are detected by the recording sheet sensor B 415. The type of the recording sheet Pa is discriminated in accordance with the sensor signal sent from the recording sheet sensor A 414 or B 415.

It should be noted that the positions of the markers M are not limited to those specified above. The markers M may be provided in desired positions on the rear sur face o f the recording sheet Pa. Further, a corresponding relationship between the positions of the marker M and the type of the recording sheet Pa is not limited to the foregoing one, but a desired corresponding relationship of these can be determined.

Figure 14:
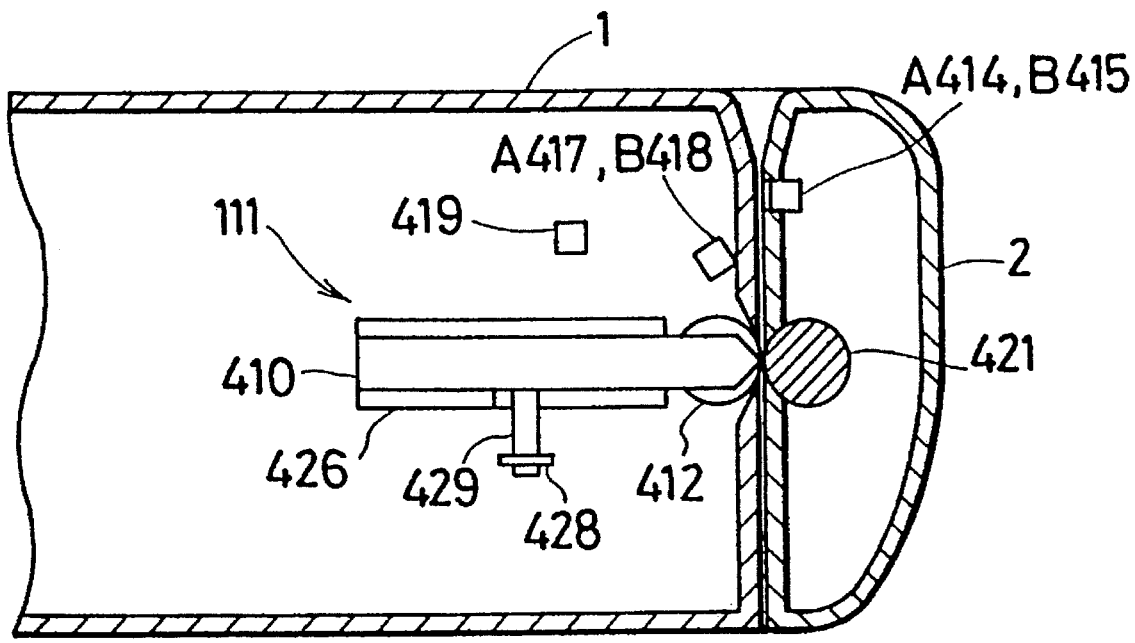
FIG. 14 is a plan view in section showing a construction of the printer section used for printing an image on a precut recording sheet.

FIG. 14, similar to FIG. 7, is a diagram in section showing an interior mechanism of the printer section 111 where a monochromatic printing is executed on a precut recording sheet.

Figure 16:
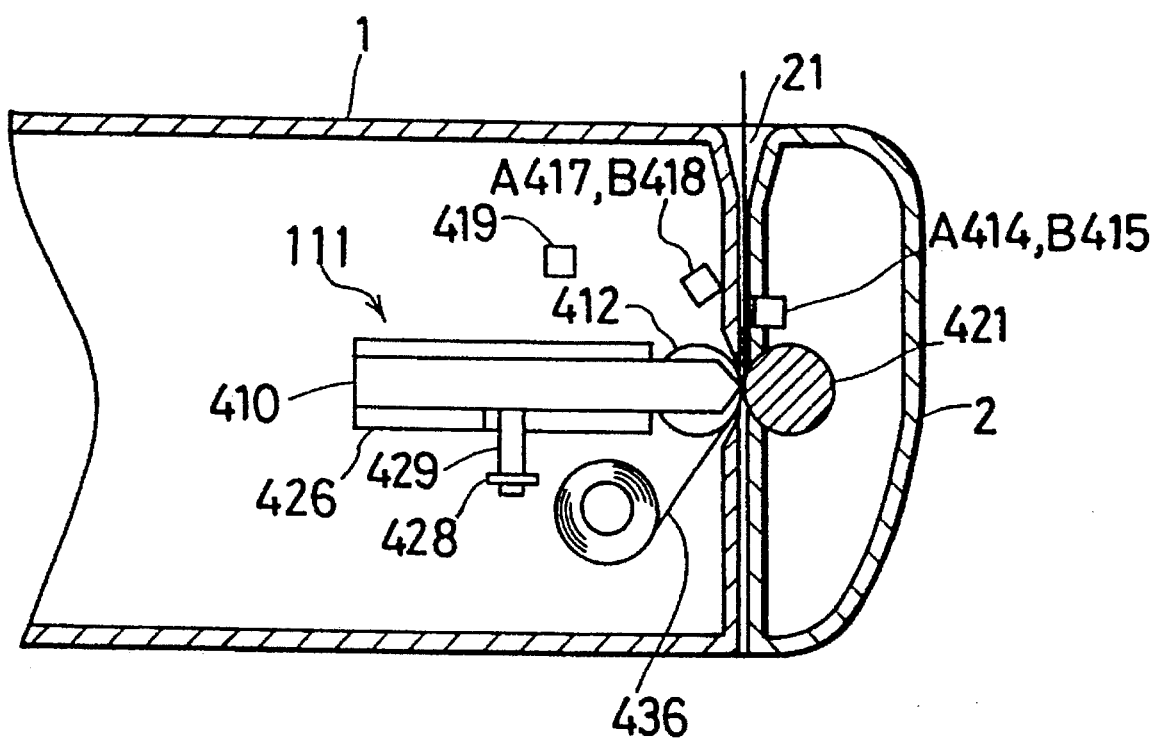
FIG. 16 is a plan view in section showing a construction of the printer section used for printing an image on a roll of thermal recording sheet.

The ink ribbon 416 is removed from the construction for the color printing as shown in FIG. 7 to enable the printer section 111 to execute the monochromatic printing. More specifically, in the monochromatic printing, an image can be printed just by pressing the thermal head 410 directly against the thermal recording sheet. Accordingly, the printer 111 can serve as a monochromatic printer only if the ink ribbon 416 is removed therefrom. In the monochromatic printing, a roll of thermal sheet can be used in addition to precut ones. In this case, the roll 436 of thermal sheet may be mounted to the printer 111 instead of the ink ribbon 416 as shown in FIG. 16, whereby the monochromatic printing becomes executable on the roll of recording sheet.

Figure 15:
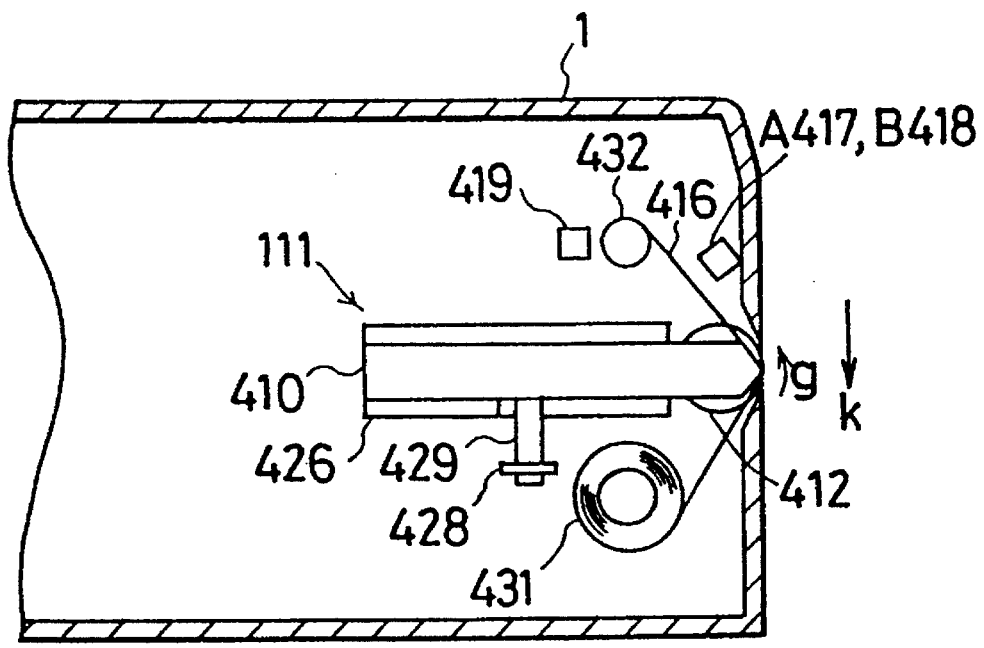
FIG. 15 is a plan view in section showing a construction of the printer section for use in a hand scanning mode.

FIG. 15, similar to FIG. 7, is a diagram in section showing an interior mechanism of the printer section 111 when a hand scan printing is executed.

Figure 13:
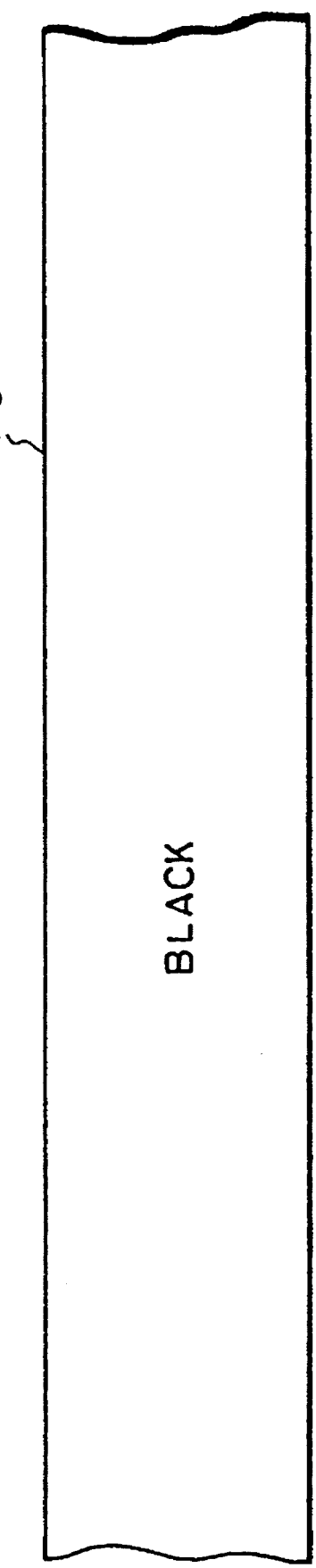
FIG. 13 is a diagram showing an ink ribbon of the hand scanning type.

The printer case 2 carrying the DC servo motor 420 is removed from the camera main body 1 to enable the printer section 111 to execute the hand scan printing. There is no need for driving source, i.e., the DC servo motor 420, so as to drive the nip rollers 412 in the hand scan printing. Further, since the image is printed in a monochromatic way in the hand scan printing, a melt-out type ink ribbon 416a shown in FIG. 13 which is completely black is used. Since an entire surface of the melt-out type ink ribbon 416a is black, the leading end sensors A 417, B 418 respectively send the sensor signals all the time, whereby the, ink ribbon in use is discriminated to be the melt-out type ink ribbon 416a having a completely black surface.

Next, a printing operation of the printer section 111 will be described for the following three cases: 1) Color printing on a precut recording sheet. 2) Monochromatic printing on a precut recording sheet. 3) Printing by means of hand scanning.

(1) Color printing on a precut recording sheet

In FIG. 8, when the recording sheet Pa is inserted through the recording sheet inlet 21 in a direction indicated by an arrow b, i.e., from a front face of the camera main body 1 to a rear face thereof, insertion of the recording sheet Pa and the type thereof are discriminated by the recording sheet sensors A 414 and B 415. The DC servo motor 420 is drivingly rotated in a direction indicated by an arrow i upon receiving the sensor signals from the recording sheet sensors A 414 and B 415. Thereby, the grip rollers 425 are caused to rotate in a direction indicated by an arrow c. The inserted recording sheet Pa is held between the nip rollers 412 and the grip rollers 425, and then further fed in the b-direction. At this stage, the thermal head pressing solenoid 411 is in a deenergized state, and accordingly the thermal head 410 is held in the standby position away from the platen roller 421. In the case where the grip rollers 425 are rotated in the c-direction, the nip rollers 412 are rotated in a direction indicated by an arrow h. The rotational force of the nip rollers 412 is transmitted through the gear A to the gear B, which in turn rotates in a direction indicated by an arrow e. However, the gear B is not in mesh with the gear C when rotating in the e-direction. Accordingly, the take-up roller 432 is not rotated, and therefore the ink ribbon 416 is not to be taken up.

When it is detected that the recording sheet Pa is fed to a predetermined position based on the sensor signal from the rotation sensor 413, the DC servo motor 420 is stopped. Thereafter, thermal head pressing solenoid 420 is energized, platen roller 421 with the ink ribbon 416 and the recording sheet Pa therebetween. Thereafter, the DC servo motor is driven in a direction indicated by an arrow j, and thereby the platen roller 421 is rotated in a direction indicated by an arrow d. Simultaneously, the thermal head 410 prints the image on the recording sheet Pa in synchronism with the speed at which the recording sheet Pa is fed, whereby an yellow image data is printed one line after another. During the printing operation, the rotational force of the nip rollers 412 is transmitted to the gear B, which is in turn rotated in the f-direction. Thereby, the gear B is coupled to the gear C. Consequently, the take-up roller 432 is rotated to take up the ink ribbon 416.

Upon completion of printing of the yellow image, the thermal head pressing solenoid 411 is deenergized, whereby the thermal head 410 is slid to the standby position away from the platen roller 421. Thereafter, the DC servo motor 420 is again driven in the i-direction to feed the recording sheet Pa in the b-direction up to the predetermined position. Thereupon, a magenta image data is printed on the recording sheet in a manner similar to the above. A cyan image data is printed after the magenta image data in the similar manner. In this way, the yellow, magenta, and cyan image data are printed on the recording sheet Pa one after another. Upon completion of printing of the cyan image data, the thermal head pressing solenoid 411 is deenergized, and the thermal head 410 is slid to the standby position. Thereafter, the DC servo motor is driven in the j-direction, thereby the recording sheet Pa having the color image printed thereon is fed back toward the inlet 21 and consequently discharged.

(2) Monochromatic printing on precut recording sheet

Monochromatic printing on a precut recording sheet is executed similarly to the color printing on the precut recording sheet. When the image is printed in black once, the recording sheet Pa is discharged through the recording sheet inlet 21.

(3) Printing by means of hand scanning

Printing by means of hand scanning is executed as follows. Firstly, the printer case 2 is detached from the camera main body 1. The thermal head 410 is pressed against a recording sheet Pa. The printing can be executed by moving the camera main body 1 in a direction indicated by an arrow k in FIG. 15 with an unillustrated print switch for hand scanning turned on. When the camera main body 1 is moved in the k-direction, the nip rollers 412 are rotated in the g-direction. The rotation of the nip rollers 412 is detected by the rotation sensor 413. In accordance with the sensor signal sent from the rotation sensor 413, a print timing and a printing speed of the thermal head 410 are controlled. Lines of the image data are printed on the recording sheet Pa in synchronism with the rotation speed of the nip rollers 412, i.e., the sheet feeding speed.

Figure 17:
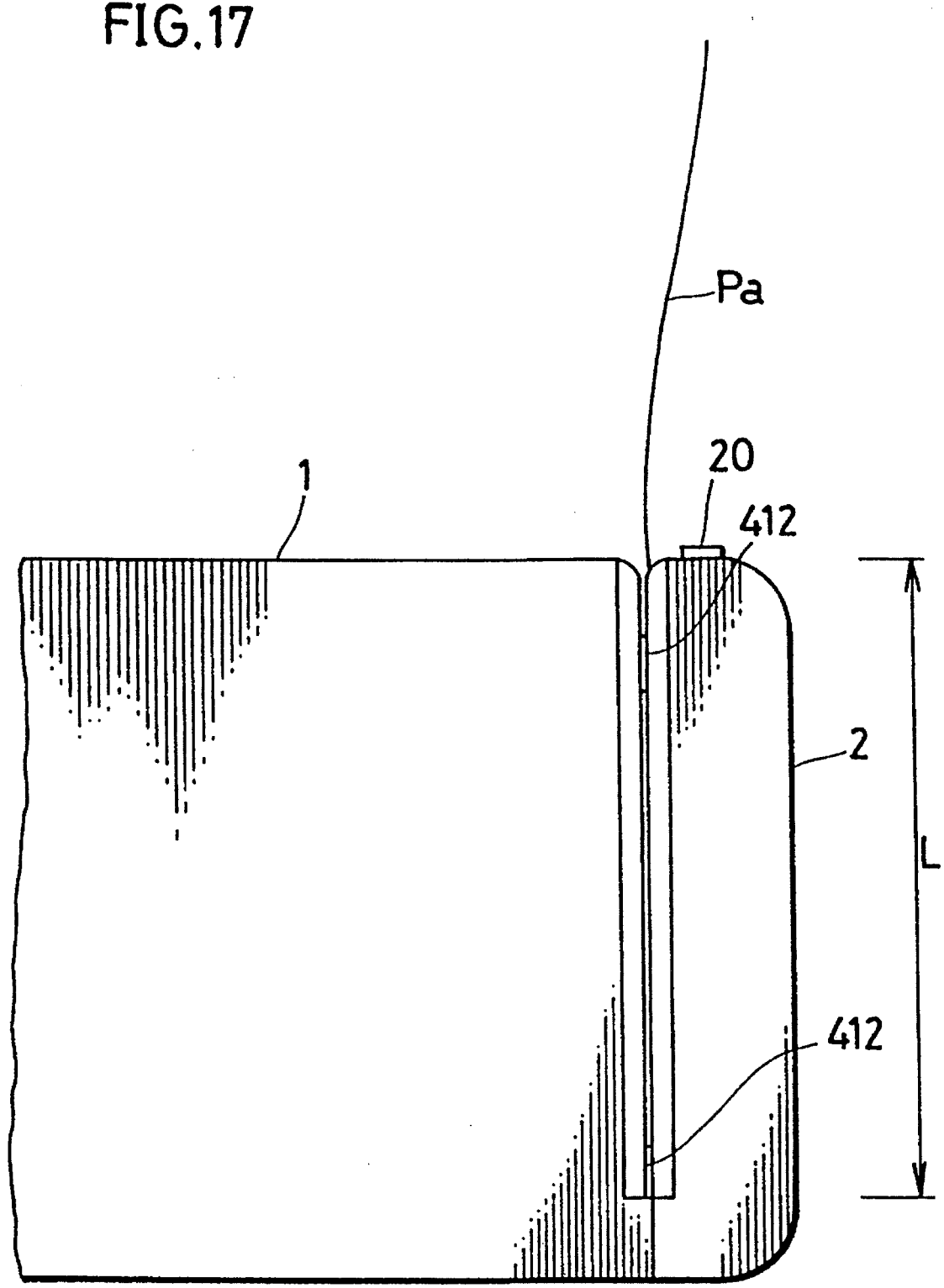
FIG. 17 is a diagram showing a modified recording sheet inlet according to the invention.

In the case where the melt-out type ink ribbon is used, a plain precut paper sheet can be used as a recording sheet Pa. In this case, for instance, a recording sheet inlet in the form of a slit extending in a vertical direction in the plane of FIG. 17, opening sideways and upward, and having a depth of L can be provided between the camera main body and the printer case 2 for inserting the recording sheet Pa therethrough as shown in FIG. 17. Provision of the above inlet enables a photographed image to be printed freely on not only a special recording sheet of a specified size, but also an end portion of a plain recording paper sheet of a desired size. This facilitates confirmation and recording of the photographed image. Further, costs on the recording sheets Pa can be reduced. It should be noted that the position of the slit-like recording sheet inlet is not limited to the foregoing one. The inlet may be provided at any desired end portion of the camera main body 1.

Figure 18:
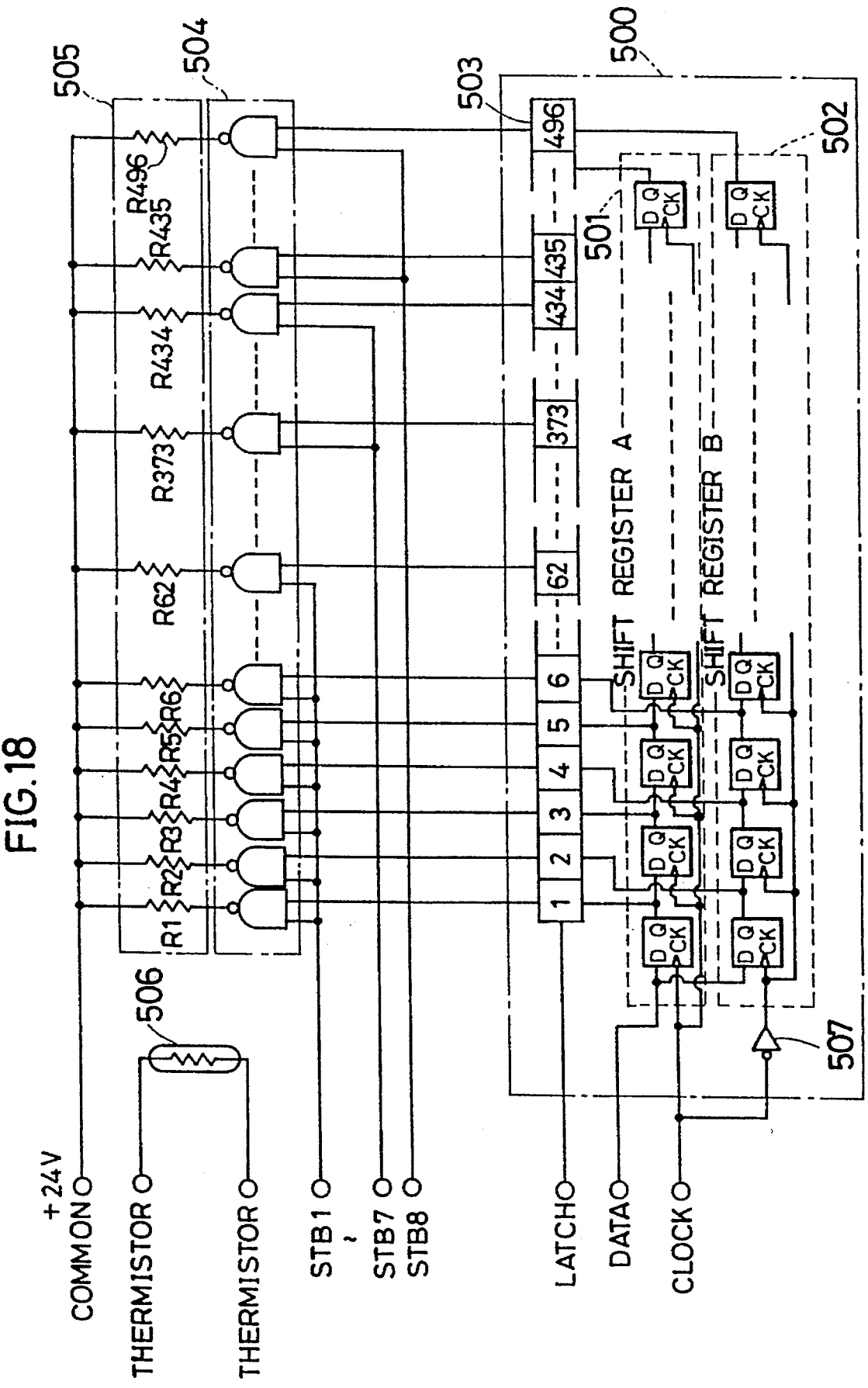
FIG. 18 is a circuit diagram of a thermal head.

FIG. 18 is a circuit diagram of the thermal head 410.

The thermal head 410 comprises an output control unit 500, a head driver 504, a heater unit 505, and a thermistor 506. The output control unit 500 is adapted for controlling a serial output of print signals. The head driver 504 is adapted for controlling a print timing of the thermal head 410. The heater 505 comprises heating resistors R1 to R496 corresponding to respective print dots. The thermistor 506 is adapted for detecting a heating temperature of the thermal head 410.

The output control unit 500 includes shift registers 501, 502, each of which is constituted of 248 D-flip-flops (hereinafter referred to as DFF) connected serially, and a latch circuit 503 for latching each of 496 print signals. The print signals are serially inputted to D-input ports provided in leading DFFs of the respective shift registers 501, 502. The print signals are sequentially outputted through Q-output ports of the respective DFFs of the shift register 501 to odd-numbered latch sections in the latch circuit 503 and the D-input ports of the next DFFs. On the contrary, the print signals are sequentially outputted through Q-output ports of the respective DFFs of the shift register 502 to even-numbered latch sections in the latch circuit 503 and the D-input ports of the next DFFs. Further, CLOCK signals are inputted to CK-input ports provided in the DFFs of the shift register 501. On the contrary, inverted CLOCK signals inverted by an inverter 507 are inputted to CK-input ports provided in the DFFs of the shift register 502.

To the respective leading DFFs of the shift registers 501, 502 are serially inputted the 496 print signals. Odd-numbered print signals are sequentially outputted from the respective DFFs of the shift register 501 to the corresponding latch sections in the latch circuit 503 upon the rise of the CLOCK signal. Even-numbered print signals are sequentially outputted form the respective DFFs of the shift register 502 to the corresponding latch sections in the latch circuit 503 upon the rise of the inverted CLOCK signal. At the moment when all the print signals are outputted to the latch circuit 503, a latch signal is sent to the latch circuit 503, whereby print signals of one line is latched.

Figure 19:
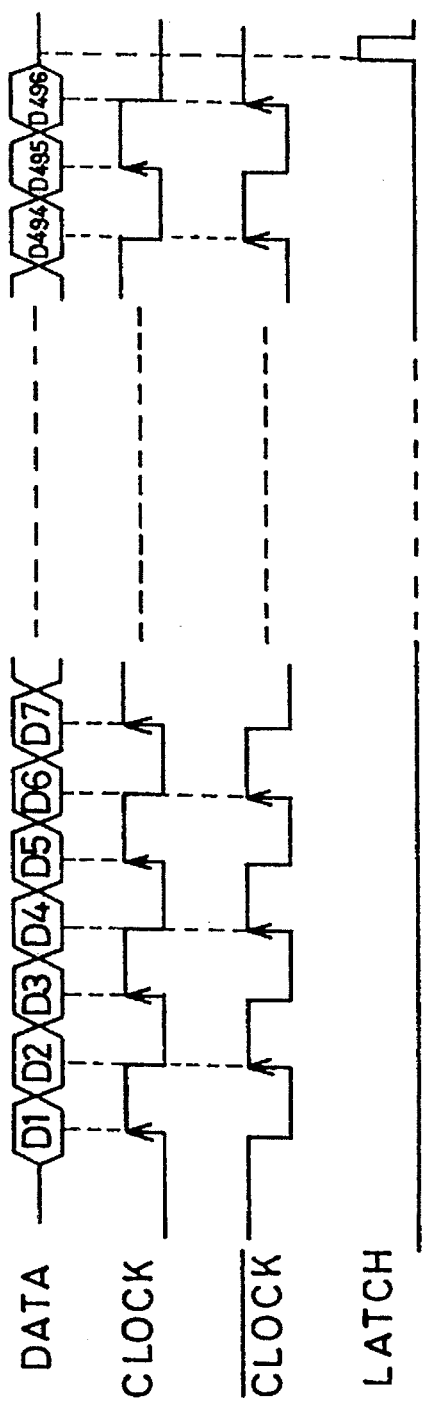
FIG. 19 is a timing chart showing input timings of print signals in a melting transfer or a hand scanning mode.
Figure 20:
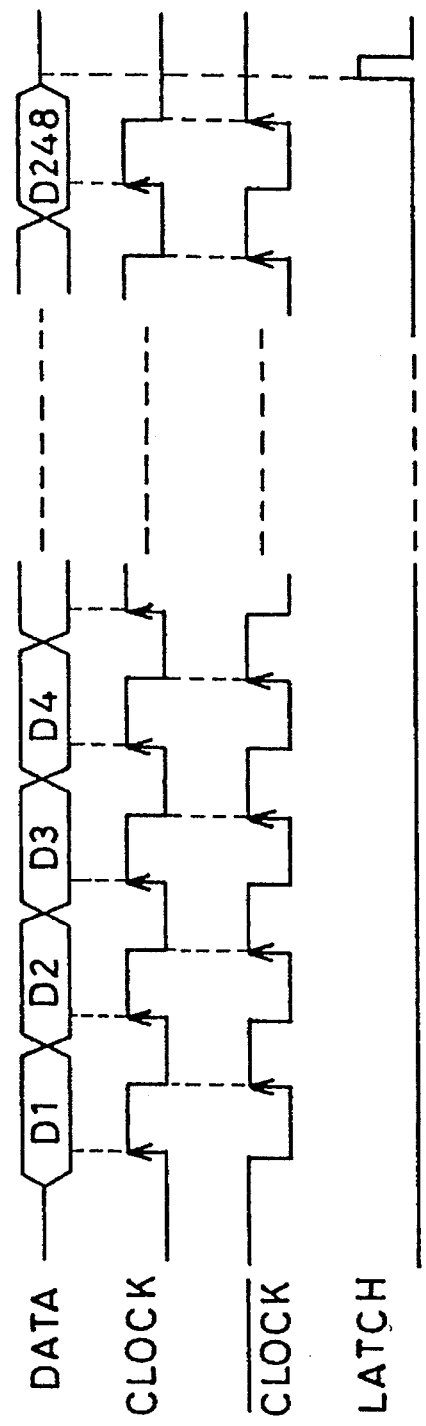
FIG. 20 is a timing chart showing input timings of print signals in a sublimation or a thermo-sensitive mode.

FIGS. 19 and 20 are time charts respectively showing an operation of the output control unit 500. FIG. 19 shows an operation of the output control unit 500 in a case that a printing operation is executed using the melt-out type ink ribbon and recording sheets (melting transfer mode), or by means of hand scanning (hand scanning mode). FIG. 20 shows an operation of the output control unit 500 in a case that the printing operation is executed using the sublimation type ink ribbon and recording sheets (sublimation transfer mode), thermal type recording sheets (thermo-sensitive mode).

In the melting transfer or the hand scanning mode, an area gradation method is executed with the use of 4 dot-data (2 dots×2 dots). Accordingly, one line of the print data consists of 496 print signals, which are outputted to the latch circuit 503 in synchronism with the CLOCK signals and the inverted CLOCK signals. On the other hand, in the sublimation or the thermo-sensitive mode, an intensity modulation method is executed by modulating the printing energy with treating 4 dot-data (2 dots×2 dots) as one unit. Accordingly, in one line of the print data, the nth print signal and the (n+1)th print signal (where n is an odd integer between 1 and 456) become identical to each other. In other words, the DFFs of the shift register 502 outputs the print signals identical to those outputted from the DFFs of the shift register 501 located right above in FIG. 18. In the time chart, 248 print signals are outputted to the latch circuit 503 in synchronism with the CLOCK signal as shown in FIG. 20.

Table-2 below shows the number of pixels, a dot density, and an image size in each of the sublimation transfer mode and the melting transfer mode.

TABLE 2

|  | Sublimation Mode | Melt-Out Mode |
| --- | --- | --- |
| Number of Pixels | 494 × 768 | 494 × 768 |
| Dot Density | 8 dot/mm | 16 dot/mm |
| Image Size | 62.8 × 97.6 mm | 62.8 × 97.6 mm |

The difference between the sublimation transfer mode and the melting transfer mode is that the dot density in the sublimation transfer mode is half the dot density in the melting transfer mode, which is based on the difference in the aforementioned gradation method. The number of pixels and the image size are respectively same in the sublimation transfer mode and the melting transfer mode. The number of pixels is about 370.000, and the image size is of a credit card size.

Contrary to the fact that the thermal head 410 comprises 496 heating resistors, it will be seen from Table-2 that the print data of the photographed image for one line consists of 494 print signals, lacking two print signals. When the print signals are inputted to the latch circuit in the output control unit 500, the two lacking print signals are representative of data not to be printed, e.g. "00".

Referring back to FIG. 18, the head driver 504 includes 496 NAND circuits, to which the print signals are inputted from the latch sections in the latch circuit 503. The 496 NAND circuits are divided into 8 blocks, each block having 62 NAND circuits. The 1st to 62nd NAND circuits constitute a first block, the 63rd to 124th NAND circuits constitute a second block, ..., and the 435th to 496th NAND circuits constitute an eighth block. A control signal STB1 is sent to the respective NAND circuits in the first block, a control signal STB2 is sent to the respective NAND circuits in the second block, ..., and a control signal STB8 is sent to the respective NAND circuits in the eighth block. Output ends of the respective NAND circuits are connected to one ends of the corresponding heating resistors Ri (where i is an integer between 1 and 496). The other ends of the heating resistors Ri are always connected to a common terminal to which a drive voltage, for example 24 V, is applied.

In the above construction, when the high control signal STB1 is inputted to the respective NAND circuits, of the first block, the NAND circuits execute their arithmetic processing using the control signal STB1 and the print signals and determine the level of output terminals thereof. In the case where the low level control signal STB1 is inputted to the NAND circuits, the level of the output terminals of all the NAND circuits becomes high. On the other hand, in the case where the high level control signal STB1 is inputted to the NAND circuits, the level of the output terminals of the NAND circuits to which the high level print signals are sent becomes low. Accordingly, only the heating resistors Ri connected to the output terminals of the NAND circuits in the low level are heated, so that the dots corresponding to the heated resistors Ri are printed on the recording sheet Pa. Similarly, when the control signals STB2 to STB8 are inputted to their corresponding NAND circuits, the respective NAND circuits of the second to the eighth blocks operate likewise. In this way, the image data are printed by the block.

Figure 21:
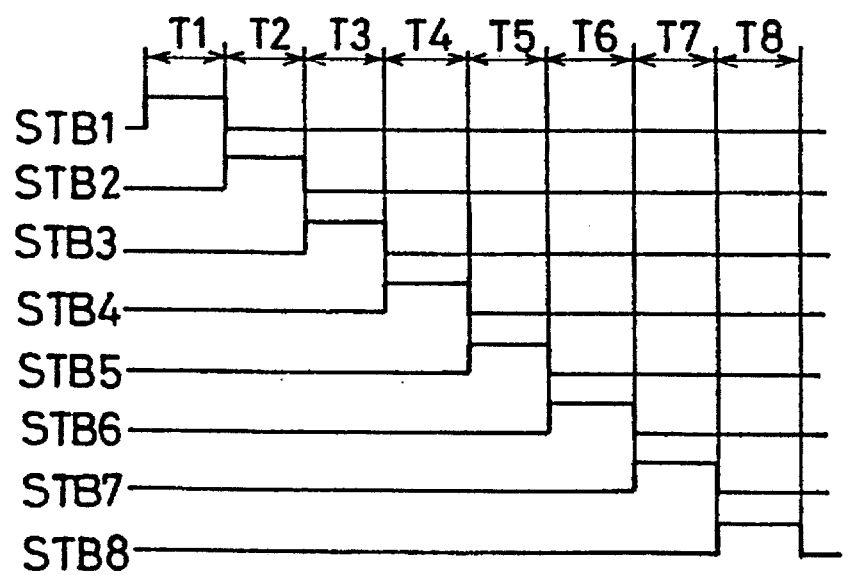
FIG. 21 is a timing chart showing a time-divided driving of the thermal head.
Figure 22A:
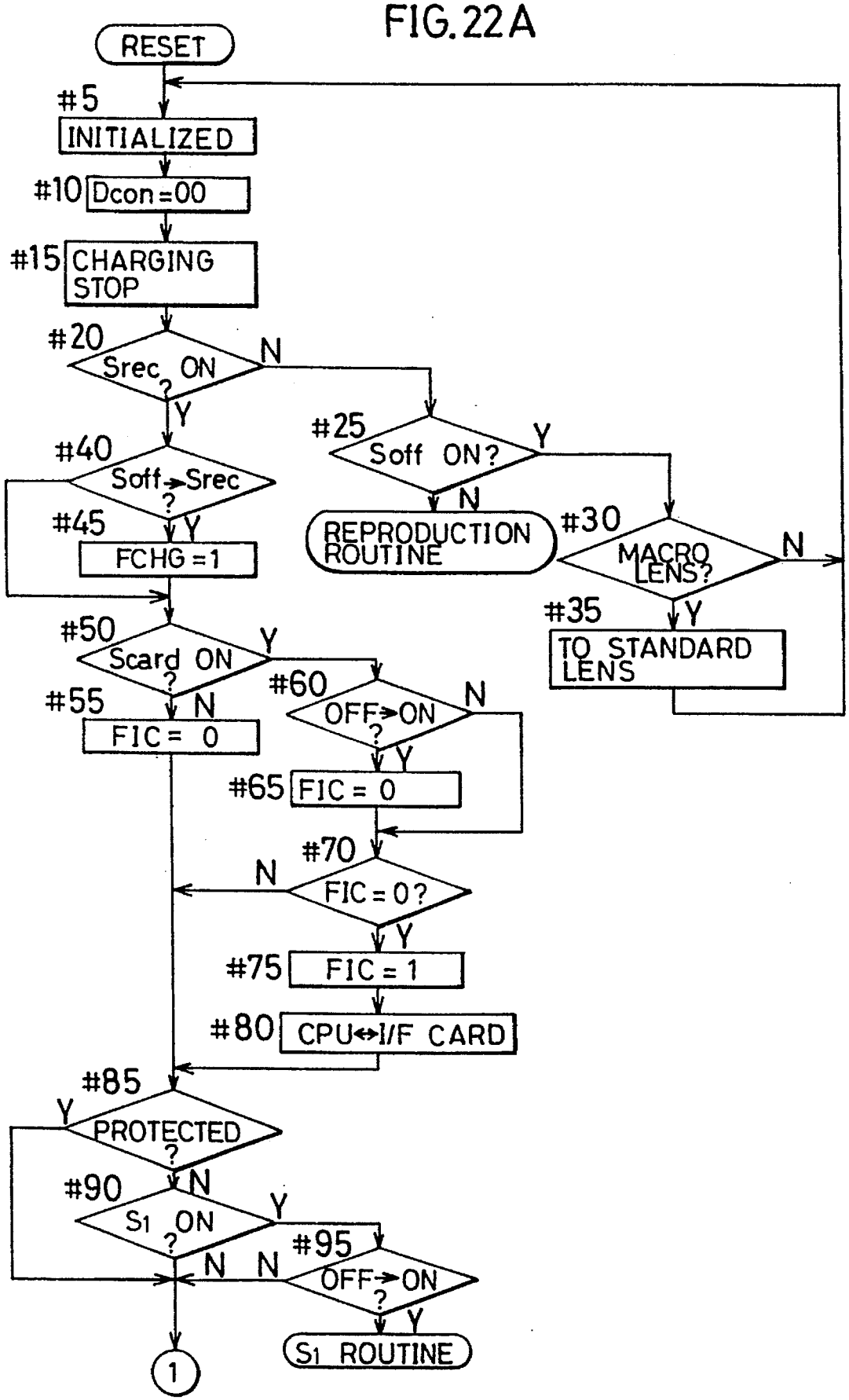
FIGS. 22A and 22B are flow charts combinedly showing a main routine of the camera.
Figure 22B:
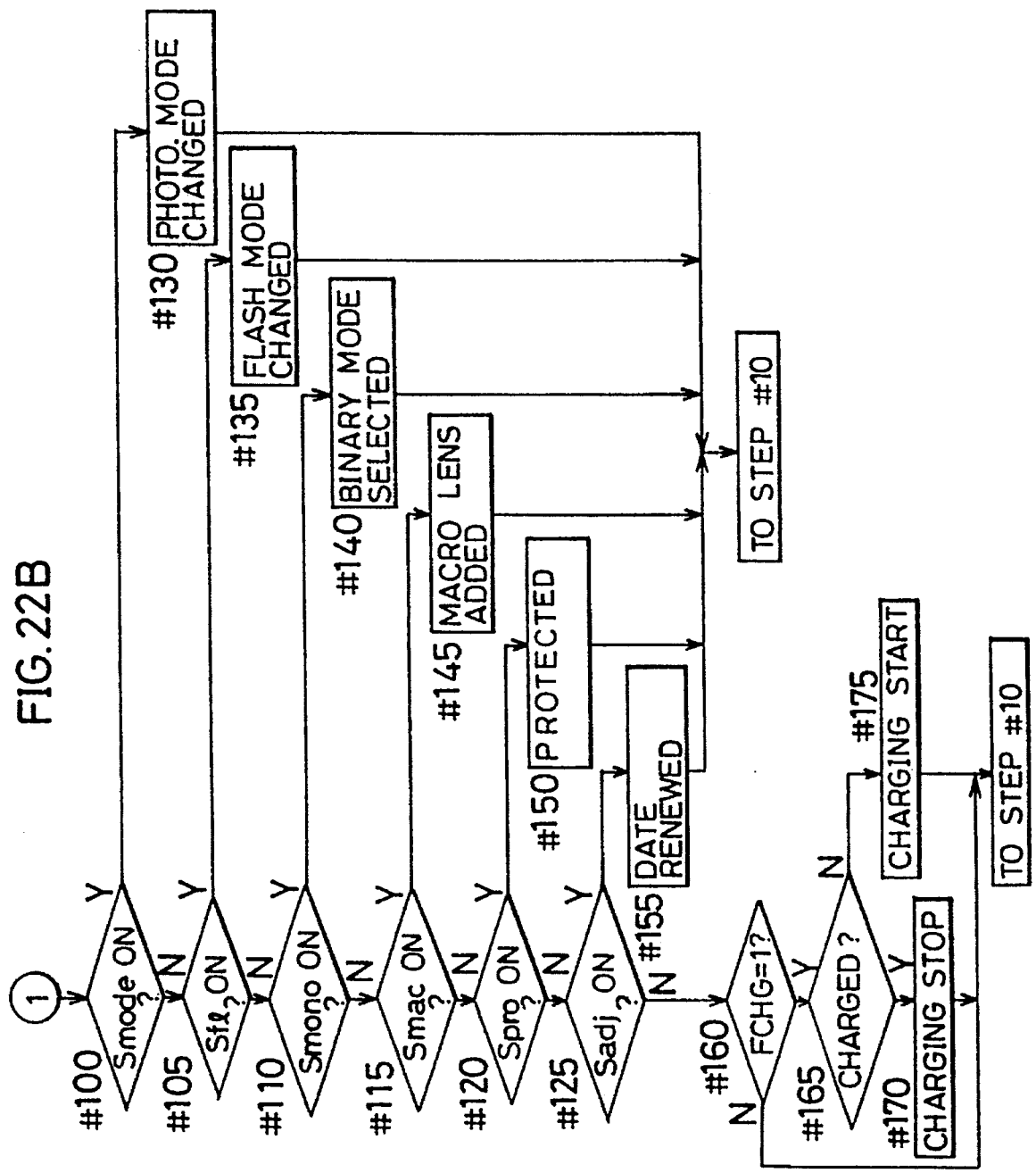

FIG. 21 shows a timing chart of the control signals STB1 to STB8. The control signal STB1 to STB8 are sent to the NAND circuits of the respective blocks with time-divided, i.e., by using successive time intervals for the different control signals. The data represented by 62 print signals is printed at one time. In this case, heating periods of the respective heating resistors Ri of the heater unit 505 are controlled according to pulse durations T1 to T8 of the control signals STB1 to STB8. The pulse durations T1 to T8 determine the printing energy. The amount of printing energy is proportional to the heating temperature of the thermal head 410. In view of this, the temperature of the thermal head 410 is monitored by the thermistor 506, whereby the aforementioned pulse durations are controlled according to a temperature change of the thermal head 410 to maintain the printing energy at an appropriate level. More specifically, the pulse durations T1 to T8 of the control signals STB1 to STB8 are shortened upon a temperature rise while being lengthened upon a temperature drop.

Gradation is not controlled according to the amount of the printing energy in the melting transfer or the hand scanning mode, whereas it is so controlled in the sublimation or the thermo-sensitive mode.

In an n-step shade gradation control in the sublimation or the thermo-sensitive mode, the data corresponding to each dot is converted into a gradation level. The data can be completely printed by printing the data the number of times according to the gradation level using the control signal having a predetermined pulse duration. More specifically, the data for one line is converted into the data for n sublines based on the gradation level of the respective dots. For instance, the dot corresponding the data having a k-gradation level is so converted that the data for the first to the kth sub-lines are to be printed while those for the (k+1)th to nth sub-lines are not to be printed. In the same line, the data is printed using the control signals STB1 to STB8 having a pulse duration corresponding to the printing energy for one gradation level. Accordingly, the printing operation is repeated n times in the same line. However, the dot corresponding to the respective data are printed the number of times according to the gradation levels of the data. For example, the dots corresponding to the data having the k-gradation level is printed k times. Therefore, the data can be printed according to its gradation level.

Next, there will be described an operation of the camera with reference to flow charts shown in FIGS. 22A to 26E. Firstly, a main routine will be described with reference to FIGS. 22A, 22B.

When the main battery EB is mounted on the camera main body 1, contents of various flags, registers, etc. are initialized in Step #5, and thereafter the main routine of the camera is executed.

Firstly, the CPU 100 sends the control signal Dcon in the form of "00" the DC/DC converter 200, whereby the DC/DC converter 200 stops its operation in Step #10. Subsequently, if the main capacitor C of the flash device 108 is being charged, the charging is stopped in Step #15. It is then discriminated whether the switch Srec is in the ON state in Step #20. If the switch Srec is in the OFF state, i.e., the operation mode is other than the "RECORD" mode (NO in Step #20). It is further discriminated whether the switch Soff is in the ON state in Step #25. If the switch Soff is in the OFF state, i.e., the camera is in an operative state. (NO in Step #25), the main routine proceeds to a "REPRODUCTION ROUTINE" to be described below. On the other hand, when the switch Soff is in the ON state (YES in Step #25), the type of the taking lens 3 in use is discriminated in Step #30. If the standard taking lens is set (NO in the Step #30), the main routine returns to Step #5. On the other hand, when the macro lens is set as one of the taking lens 3 (YES in Step #30). the macro lens is removed out of the optical axis, whereby the taking lens 3 becomes the standard one. Then, the main routine returns to Step #5 in which the camera is brought into an inoperative state.

If, on the other hand, the switch Srec is in the ON state in Step #20, i.e., the operation mode is the "RECORD" mode, the main routine proceeds to Step #40 in which it is discriminated whether the state of the switch Srec has been just changed to ON from OFF. If the state of the switch Srec has been just changed to ON from OFF (YES in Step #40). a flag FCHG is set to "1" (Step #45) so as to cause the capacitor C to be charged with electric energy. Then, the main routine proceeds to Step #50. On the other hand, if the switch Srec has been kept in the ON state (NO in Step #40), the main routine skips to Step #50. Subsequently, it is discriminated whether the switch Scard is in the ON state in Step #50. If the switch Scard is in the OFF state. i.e,, the memory card 112 is not mounted yet (NO in Step #50), a flag FIC is reset to "0" in Step #55 and the main routine proceeds to Step #85. The flag FIC indicates whether or not the memory card 112 is mounted on the camera main body 1. If the flag FIC is reset to "0," it means that the memory card 112 is not mounted. On the contrary, if the flag FIC is set to "1," it means that the memory card 112 is mounted.

If the switch Scard is in the ON state (YES in Step #50), the main routine proceeds to Step #60 in which it is discriminated whether the state of the switch Scard has just changed to ON from OFF. If the state of the switch Scard has just changed to ON from OFF (YES in Step #60), the flag FIC is reset to "0." On the other hand, if the switch Scard has been kept in ON (NO in Step #60), the main routine skips to Step #70 in which the state of the flag FIC is discriminated. If the flag FIC is set to "1" (NO in Step #70), the main routine proceeds to Step #85. On the contrary, if the flag FIC is set to "0" (YES in Step #70), the main routine proceeds to Step #75 in which the flag FIC is reset to "1." Then, in Step #80, administrative information or,the like for stored data is read out of the memory card 112 into the CPU 100, and the main routine proceeds to Step #85. Subsequently, in Step #85, it is discriminated whether all the image data stored in the memory card 112 are protected. If not all the image data are protected (NO in Step #85), the photographing operation is enabled and it is discriminated whether the switch S1 is in the ON state in Step #90. If the switch S1 is in the OFF state (NO in Step #90), the main routine proceeds to Step #100. On the contrary, if the switch S1 is in the ON state (YES in Step #90), it is further discriminated whether the state of the switch S1 has been just changed to ON from OFF in Step #95. If the state of the switch S1 has been just changed to ON from OFF (YES in Step #95), the main routine proceeds to a "S1 ROUTINE" to be described below so as to be ready for the photographing operation. If the switch S1 has been kept in the ON state (NO in Step #95), the main routine proceeds to Step #100. If all the image data are protected (YES in Step #85), the main routine proceeds to Step #100.

In Steps #100 to #125, it is discriminated whether the switches Smode, Sfl, Smono, Smac, Spro, and Sadj are in the ON state respectively. If any of these switches are in the ON state, the mode is changed to another mode selected by this switch or the value is set to another value specified by this switch. More specifically, if the switch, Smode is in the ON state (YES in Step #100), the current photographing mode is changed to the selected photographing mode in Step #130. If the switch Sfl is in the ON state (YES in Step #105), the current flash mode is changed to the selected flash mode in Step #135. If the switch Smono is in the ON state (YES in Step #110), the binary photographing mode is selected in Step #140. If the switch Smac is in the ON state (YES in Step #115), the macro photographing mode is selected, whereby the macro lens is placed on the optical axis in addition to the taking lens 3 in Step #145. If the switch Spro is in the ON state (YES in Step #120), the stored images are protected in Step #150. If the switch Sadj is in the ON state (YES in Step #125), the date is renewed. The main routine returns to Step #10 from Steps #130, #135, #140, #145, #150, and #155.

If, on the other hand, all the switches are in the OFF state in Steps #100 to #125, the main routine proceeds to Step #160 in which it is discriminated whether the flag FCHG is set to "1." If the flag FCHG is set to "0" (NO in Step #160), it means that the flash mode is in the "OFF" mode. Accordingly, the main routine immediately returns to Step #10. If the flag FCHG is set to "1" (YES in Step #160), it is further discriminated whether charging of the main capacitor C has been completed in Step #165. If the charging has been completed (YES in Step #165), the main routine returns to Step #10. On the contrary, if the charging has not been completed yet (NO in Step #165), the main routine proceeds to step 175 in which the charging of the main capacitor C is started, and then the main routine returns to Step #10.

Figure 23A:
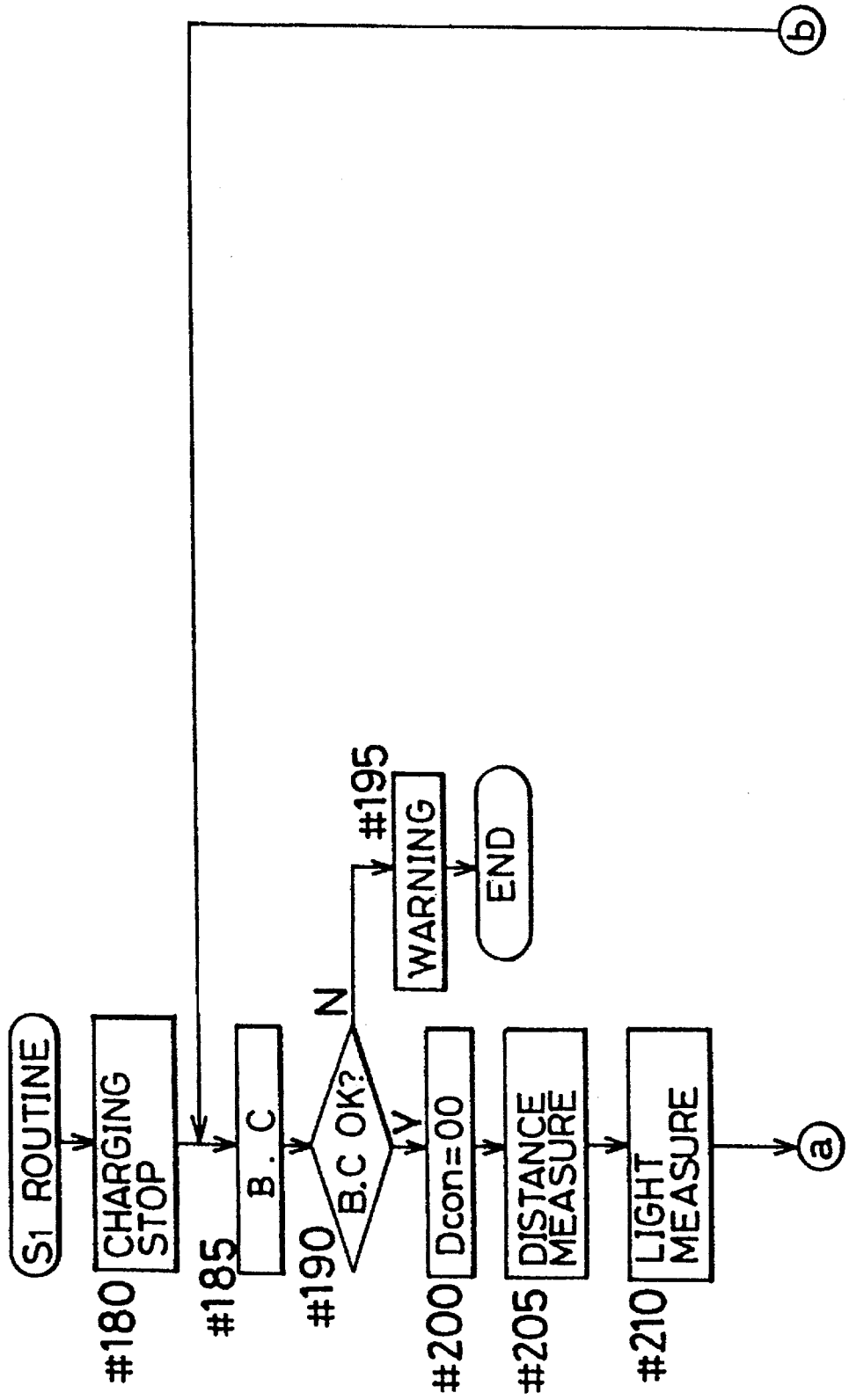
FIG. 23A and 23B are flow charts combinedly showing a "S1 ROUTINE"
Figure 23B:
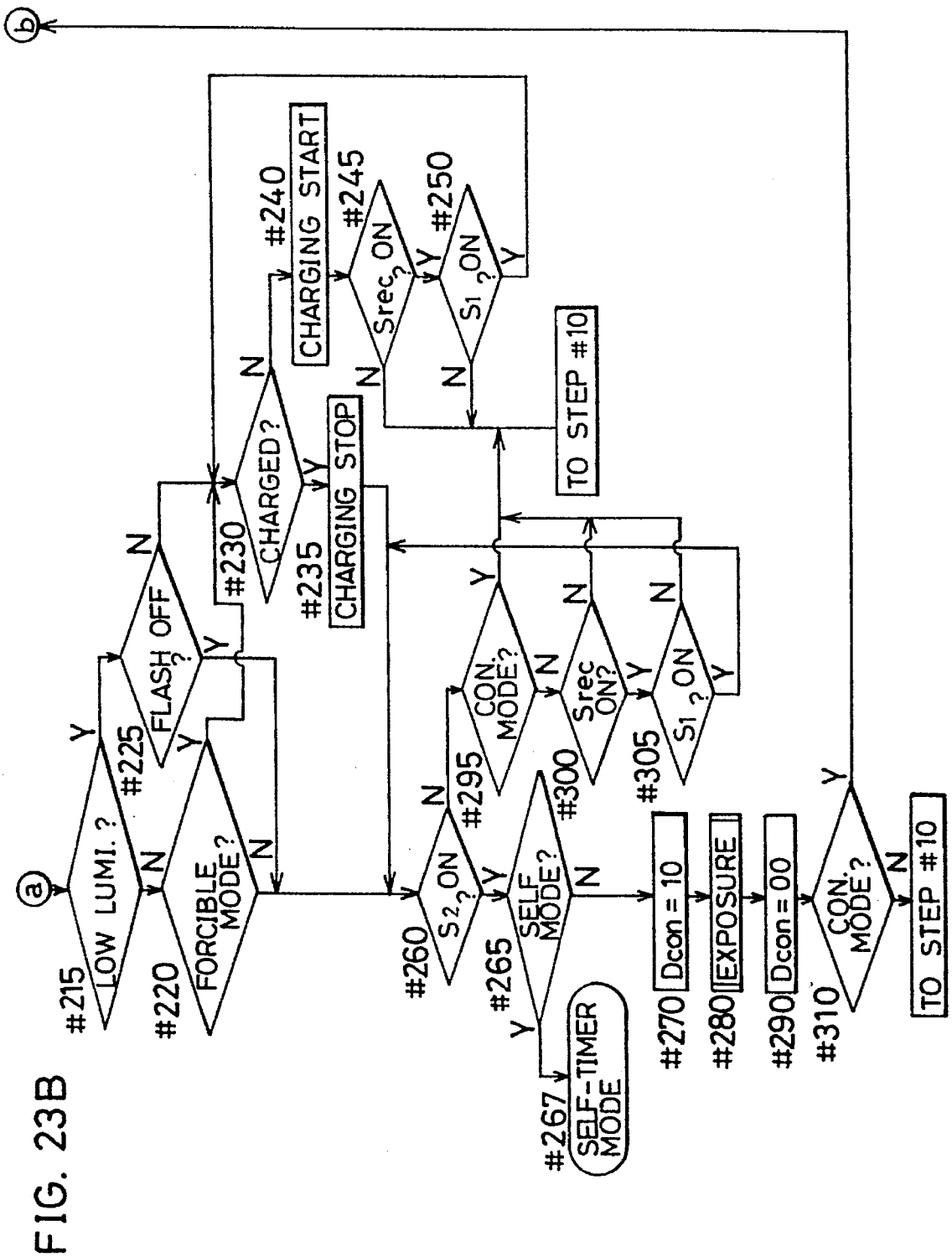

Next, there will be described the "S1 ROUTINE" with reference to FIG. 23A and 23B.

When the switch S1 is turned on, the charging is stopped if the main capacitor C is being charged in Step #180. Then, in Step #185, the battery check is executed. Subsequently, it is checked whether the main battery EB has sufficient energy source in Step #190. If the main battery EB has insufficient energy source (NO in Step #190), a warning is displayed on the indicator 17 in Step #195, and then the photographing operation is stopped. If, on the other hand, the main battery EB has sufficient energy source (YES in Step #190), the CPU 100 sends the control signal Dcon in the form of "00" to the DC/DC converter 200 so as to cause the DC/DC converter 200 to stop its operation (Step #200). In Step #205, the distance to the object is measured in the distance measuring unit 104. Subsequently, the luminance of the object is measured in the light measuring unit 105 in Step #210. In Step #215, it is discriminated whether the luminance of the object is low based on the measured object luminance. If the luminance of the object is low (YES in Step #215), the routine proceeds to Step #225 in which it is further discriminated whether the flash mode is set to the "OFF" mode. If the flash mode is set to the "OFF" mode, the routine proceeds to Step #260. If, on the other hand, the flash mode is set to the "AUTO" mode, or "FORCIBLE ON" mode (NO in Step #225), it is discriminated whether the main capacitor C has been charged with sufficient electric energy in Step #230 so as to confirm that flashes of light can be emitted to illuminate the object. If the main capacitor C has not been charged with sufficient electric energy (NO in Step #230), the charging of the main capacitor C is started in Step #240. Then, in Steps #245 and #250. It is discriminated whether the switches Srec and S1 are in the ON state respectively. If either of the switch Srec or S1 is in the OFF state, preparatory operation for the photographing operation is stopped, and the routine returns to Step #10 of the main routine. On the contrary, if both switches Srec and S1 is in the ON state, the routine returns to Step #230. The routine recycles Steps #240 to #250 (a charging loop) until the main capacitor C is charged with sufficient electric energy. Then, the routine proceeds to Step #235 in which the charging of the main capacitor C is stopped. Here, it will be noted that the charging of the main capacitor C is not required to be stopped in the case where the routine proceeds to Step #235 without going through Steps #240 to #250, and therefore the routine proceeds directly to Step #260.

If the luminance of the object is not low (NO in Step #215), it is discriminated in Step #220 whether the flash mode is set to the "FORCIBLE ON" mode. If the flash mode is not set to the "FORCIBLE ON" mode (NO in Step #220), the routine proceeds to Step #260. If the flash mode is set to the "FORCIBLE ON" mode (YES in Step #220), the routine proceeds to Step #230 in which the aforementioned charging operation is executed (Steps #230. 240 to 250).

In Step #260, it is discriminated whether the switch S2 is in the ON state. If the switch S2 is in the ON state (YES in Step #260), it is further discriminated whether the photographing mode is set to the "SELF-TIMER" mode in Step #265. If the photographing mode is set to the "SELF-TIMER" mode (YES in Step #265), a known control for the "SELF-TIMER" mode is performed in Step #267. If the photographing mode is not set to the "SELF-TIMER" mode (NO in Step #265), the CPU 100 sends the control signal Dcon in the form of "10" to the DC/DC converter 200 in Step #270, whereby the DC/DC converter 200 supplies power to the image forming section 202 and the camera section 203 to activate them. Subsequently, the routine proceeds to Step #280 in which an exposure control is executed.

Figure 24:
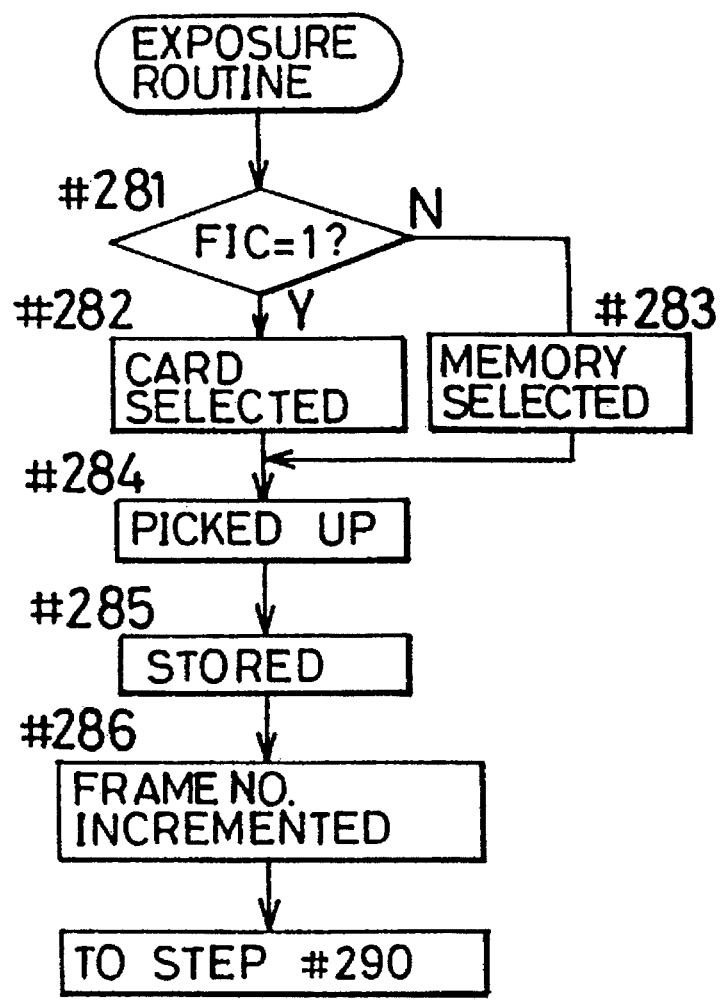
FIG. 24 is a flow chart showing an "EXPOSURE ROUTINE"

The exposure control is executed in accordance with a "EXPOSURE ROUTINE" shown in FIG. 24. It is first discriminated whether the flag FIC is set to "1" in Step #281. If the flag FIC is set to "1" (YES in Step #281), the memory card 112 is selected as storage medium in Step #282. If, on the other hand, the flag FIC is set to "0" (NO in Step #281), the built-in memories 311, 312 are selected as storage medium. The routine proceeds from Steps #282, #283 to Step #284 in which the object image is picked up by the CCD 101 to be converted into an image signal. The image signal is sent to the signal processing unit 102 where the aforementioned predetermined processings are applied to the image signal, and then stored in the selected storage medium in Step #285. Consequently, a frame number displayed on the indicator 17 is renewed, i.e., incremented by one in Step #286.

Referring back to FIG. 23B, upon completion of the exposure control, the routine proceeds to Step #290 in which the CPU 100 sends the control signal in the form of "00" to the DC/DC converter 200, causing the DC/DC converter 200 to stop its operation. Subsequently, it is discriminated whether the photographing mode is set to the "CONTINUOUS" mode in Step #301. If the photographing mode is not set to the "CONTINUOUS" mode (NO in Step #310), the routine returns to Step #10 of the main routine. On the other hand, if the photographing mode is set to the "CONTINUOUS" mode (YES in Step #310), the routine returns to Step #185 so as to be ready for the next photographing operation.

If the switch S2 is in the OFF state in Step #260, the routine proceeds to Step #295 in which it is discriminated whether the photographing mode is set to the "CONTINUOUS" mode. If the photographing mode is set to the "CONTINUOUS" mode (YES in Step #295), the routine returns to Step #10 of the main routine. If, on the other hand, the photographing mode is not set to the "CONTINUOUS" mode (NO in Step #295), it is discriminated whether the switches Srec and S1 are in the ON state respectively in Steps #300 and 305. If either of the switch Srec or S1 is in the OFF state (NO in Step #300 or 305), the preparatory operation for the photographing operation is stopped and the routine returns to Step #10. If both the switches Srec and S1 are in the ON state (YES in Steps #300 and 305), the routine returns to Step #260.

Figure 25A:
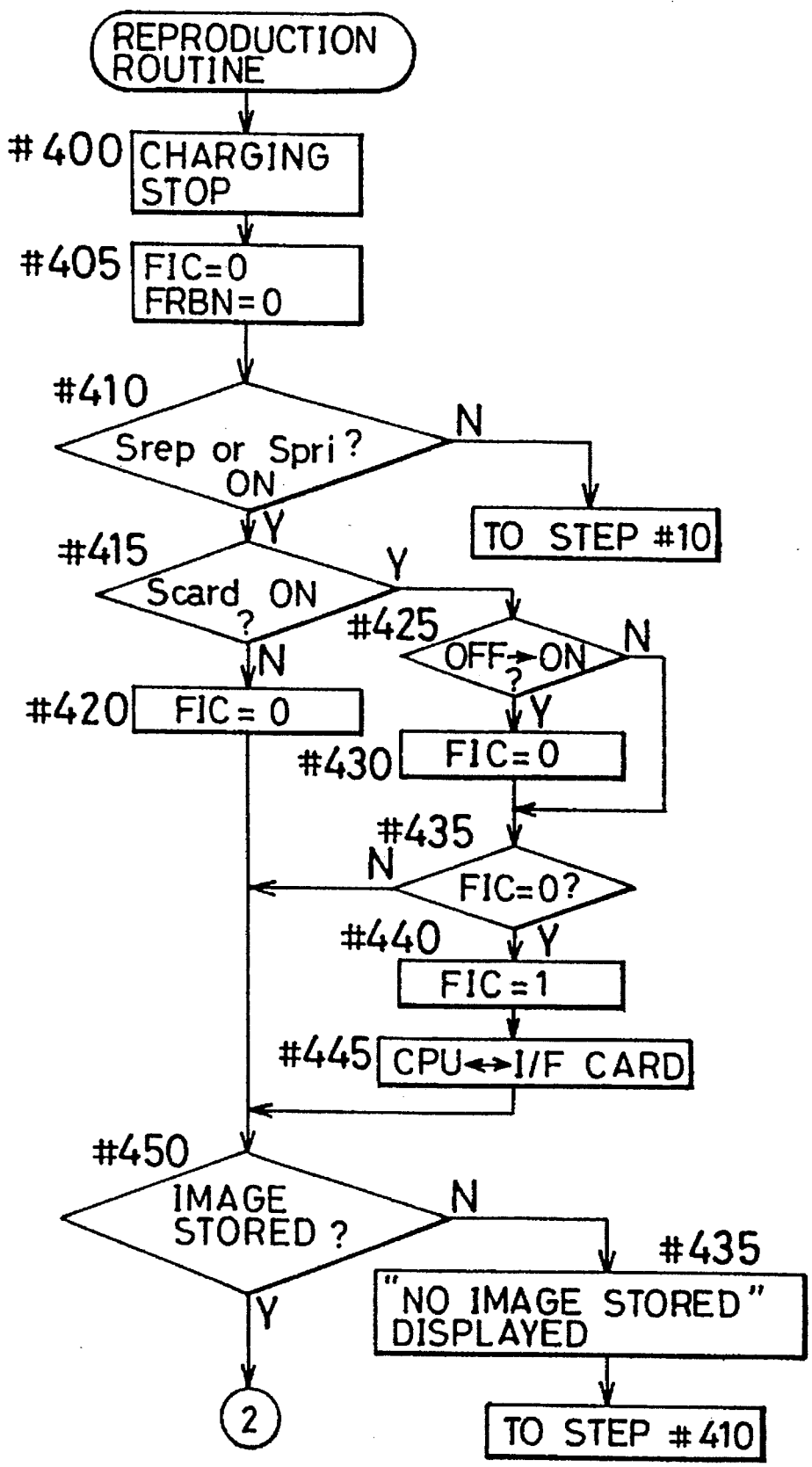
FIG. 25A and 25B are flow charts combinedly showing a "REPRODUCTION ROUTINE"
Figure 25B:
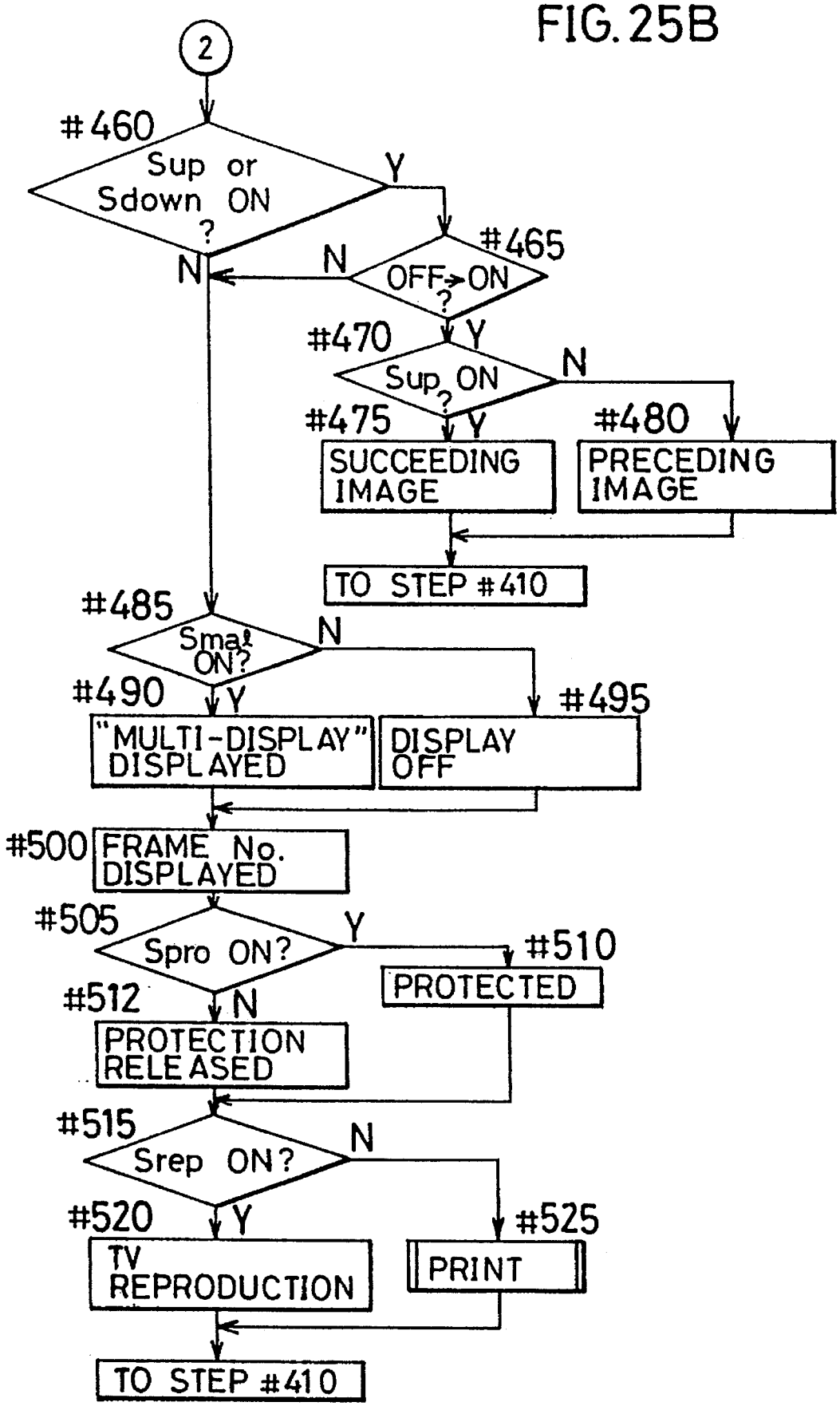

Next, there will be described "REPRODUCTION ROUTINE" with reference to FIG. 25A and 25B.

Upon setting operation mode to the "REPRODUCTION" mode, the charging is stopped in Step #400 in the case where the main capacitor C is being charged. Then, the routine proceeds to Step #405 in which flags FIC, FRBN are both set to "0." The flag FRBN indicates whether the ink ribbon 416 is set properly for a next printing operation with the leading end of a next ribbon segment being set in a specified position. If the flag FRBN is set to "1," it means that the next ribbon segment is set in the specified position for the next printing operation. If, on the contrary, the flag FRBN is set to "0," it means that the ink ribbon 416 should be fed until the next ribbon segment is set in the specified position in order to execute the next printing operation.

Thereafter, the routine proceeds to Step #410 in which it is discriminated whether the switch Step or Spri is in the ON state. If neither of these switches is in the ON state. i.e., the reproduction and printing operation are prohibited, the routine returns to Step #10 of the main routine. If at least either of the switch Step or Spri is in the ON state (YES in 410), it is further discriminated whether the switch Scard is in the ON state in Step #415. If the switch Scard is in the OFF state (NO in Step #415), i.e., the memory card 112 is not mounted to the camera main body 1, the flag FIC is reset to "0" in Step #420, and the routine proceeds to 450. On the other hand, if the switch Scard is in the ON state (YES in Step #415), it is further discriminated whether the state of the switch Scard has been just changed to ON from OFF in Step #425. If the state of the switch Scard has been just changed to ON from OFF (YES in Step #425), the flag FIC is reset to "0" in Step #430. If, on the other hand, the state of the switch Scard has been kept in the ON state (NO in Step #425), the routine skips to Step #435. In Step #435, the state of the flag FIC is discriminated. If the flag FIC is set to "1" (NO in Step #435), the routine proceeds to Step #450. If the flag FIC is set to "0" (YES in Step #435), the flag FIC is set to "1" in Step #440. Subsequently, the administrative data or the like for the data stored in the memory card 112 is transferred therefrom to the CPU 100 in Step #445, and then the routine proceeds to Step #450. In Step #450, it is discriminated whether there is any image data stored in the memories. If there is no image data stored in the memories (NO in Step #450), an indication "NO IMAGE STORED" is displayed on the indicator 17 in Step #455, and the routine returns to Step #410.

On the other hand, if there is any image data stored in the memories (YES in Step #450), it is discriminated whether the switch Sup or Sdown is in the ON state in Step #460. If both switches Sup and Sdown are in the OFF state (NO in Step #460), the routine proceeds to Step #485. On the other hand, if either of the switch Sup or Sdown is in the ON state (YES in Step #460), it is discriminated whether the state of the switch has just changed from OFF to ON in Step #465. Unless the switch Sup or Sdown has been kept in the ON state (NO in Step #465), the routine proceeds to Step #485. If the state of switch Sup or Sdown has just changed from OFF to ON (YES in Step #465), it is discriminated which of the switch Sup or Sdown is in the ON state in Step #470. If the switch Sup is in the ON state (YES in Step #470), the succeeding image data is accessed in Step #475 and the routine returns to Step #410. If the switch Sdown is in the ON state (NO in Step #470), the preceding image data is accessed in Step #480 and the routine returns to Step #410.

In Step #485, it is discriminated whether the switch Smal is in the ON state. If the switch Smal is in the ON state (YES in 485), an indication "MULTI-DISPLAY" is displayed on the indicator 17 in Step #490. On the other hand, if the switch Smal is in the OFF state (NO in Step #485), the indication "MULTI-DISPLAY" is not displayed on the indicator 17 in Step #495. In Step #500, the current frame number is displayed on the indicator 17. Subsequently, it is discriminated whether the switch Spro is in the ON state in Step #505. If the switch Spro is in the ON state (YES in Step #505), the stored images are protected in Step #510. If the switch Spro is in the OFF state (NO in Step #505), protection of the stored images is released in Step #512. Subsequently, it is discriminated whether the switch Srep is in the ON state in Step #515. If the switch Step is in the ON state (YES in Step #515), the stored images are processed for TV reproduction in Step #520. On the other hand, if the switch Srep is in the OFF state (NO in Step #515), the stored images are printed out in Step #525. Consequently, the routine returns to Step #410.

Figure 26A:
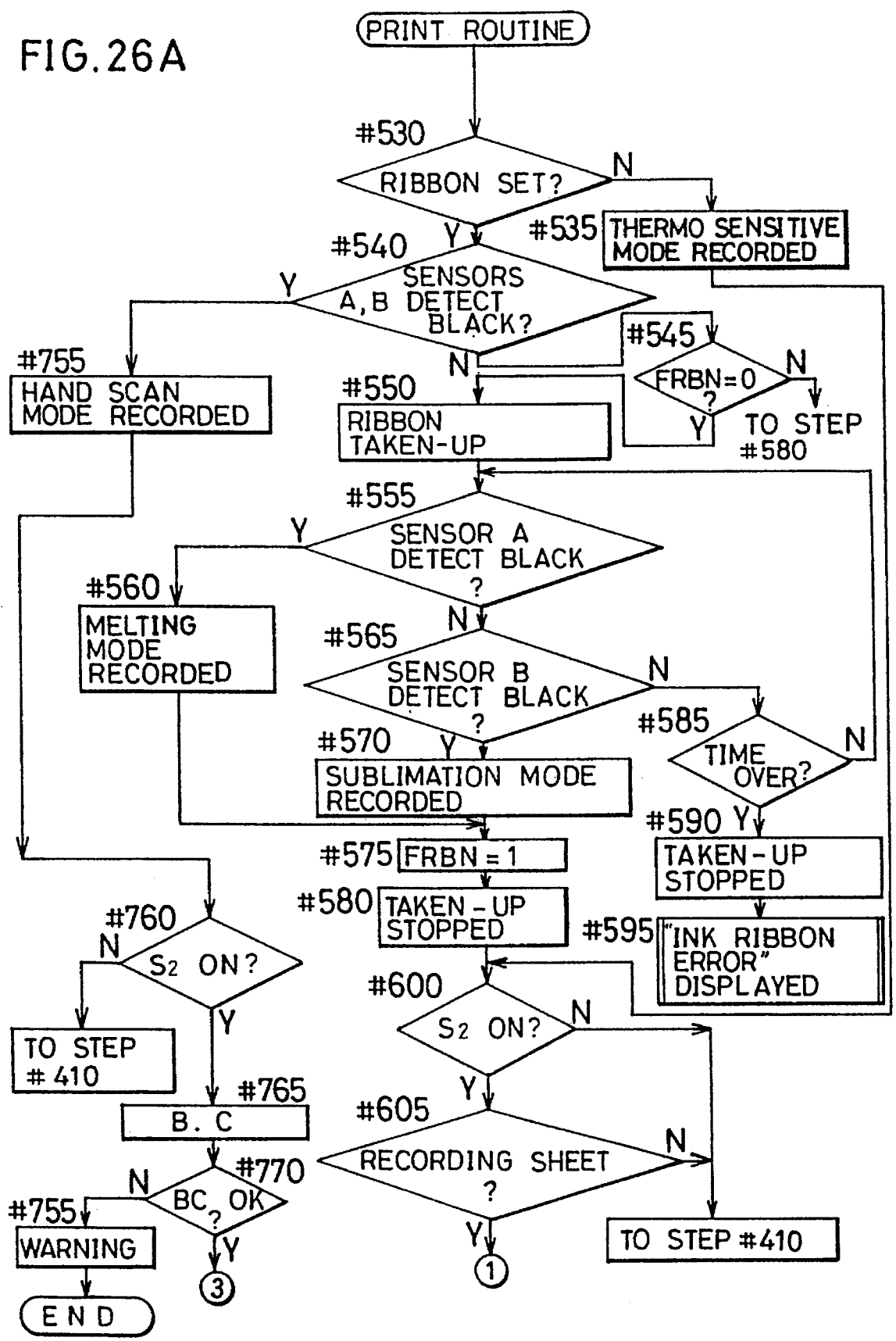
FIGS. 26A to 26E are flow charts combinedly showing a "PRINT ROUTINE"
Figure 26B:
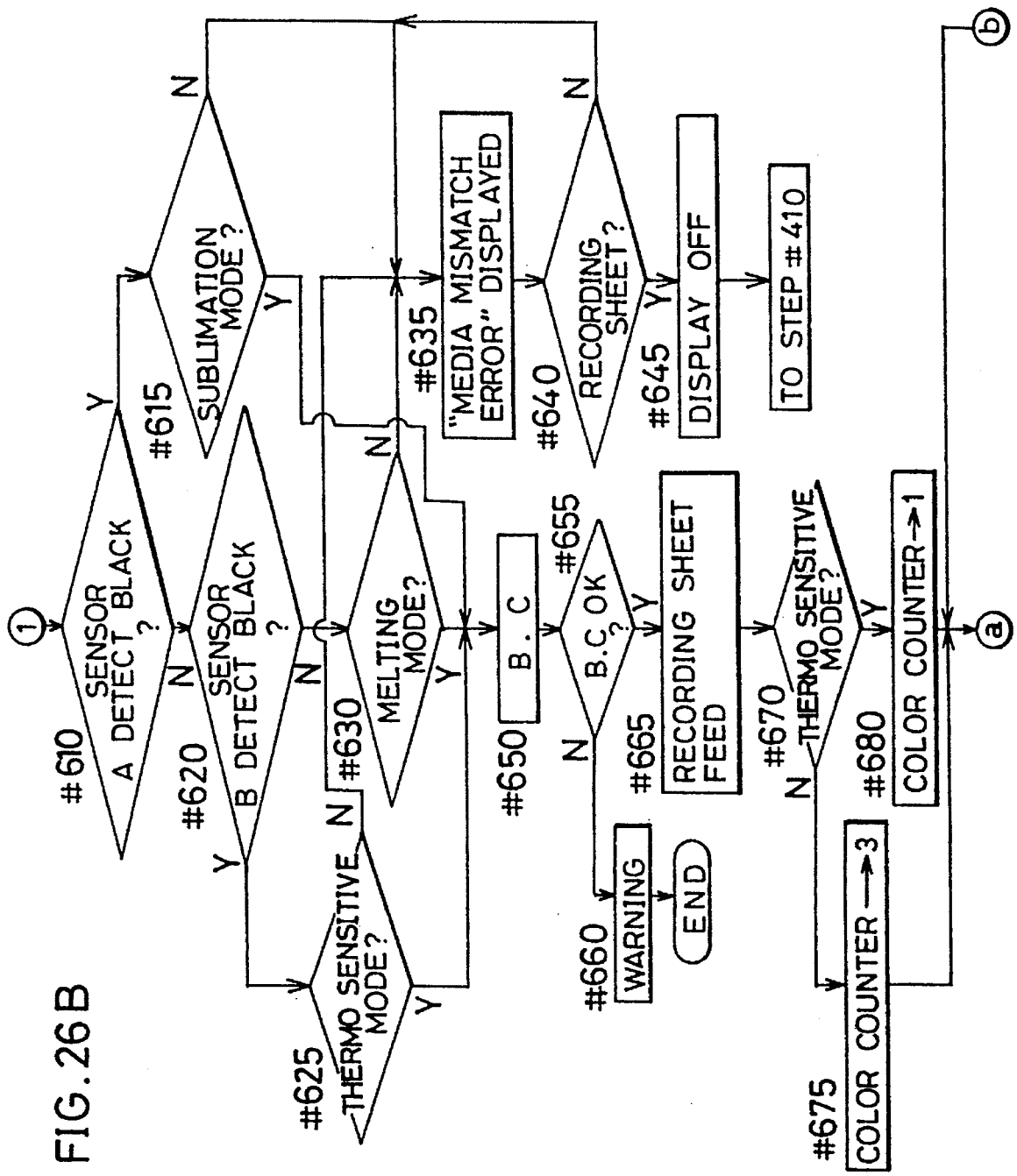
Figure 26C:
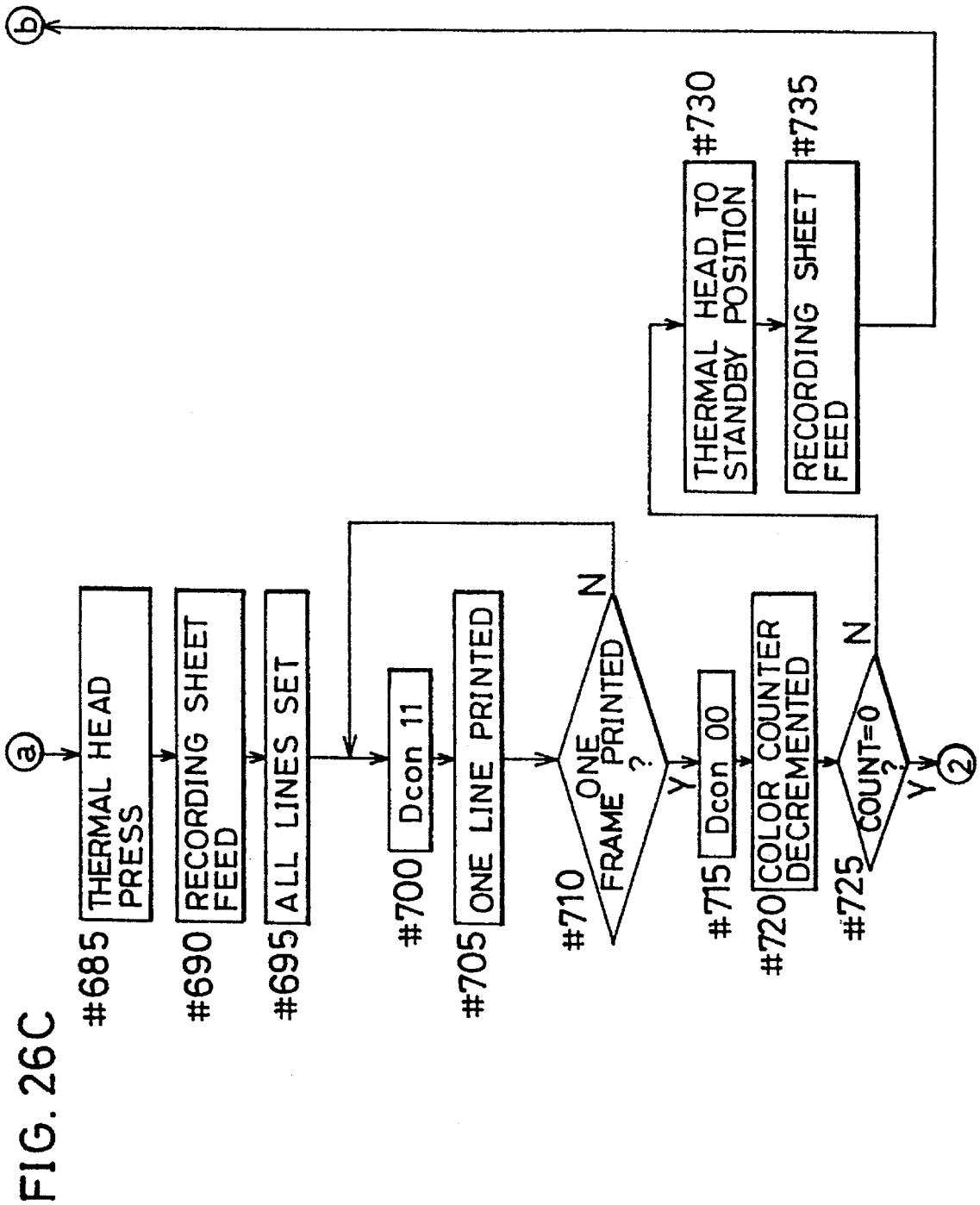
Figure 26D:
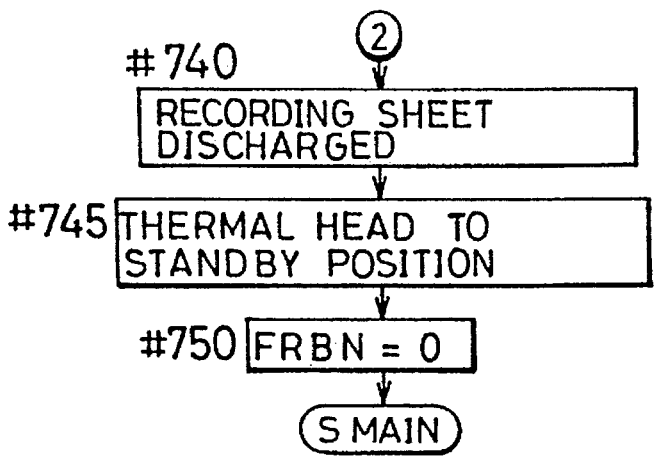
Figure 26E:
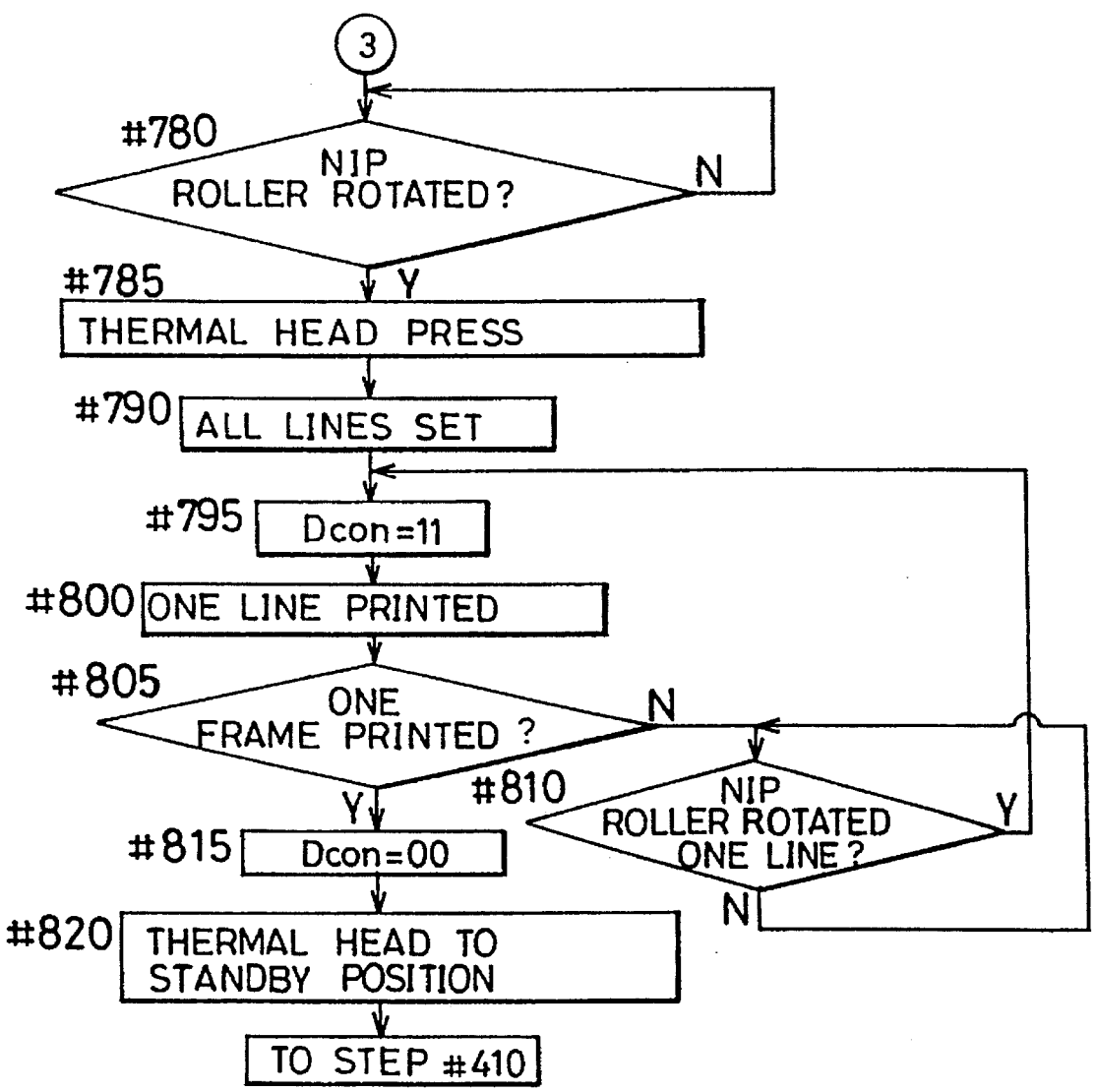

Next, there will be described "PRINT ROUTINE" with reference to FIGS. 26A, 26B. 26C, 26D, and 26E.

Upon setting operation mode to the "PRINT" mode, it is first discriminated whether the ink ribbon 416 is set in Step #530. If the ink ribbon 416 is not set (NO in Step #530), it is determined that the thermo-sensitive mode is to be set, and the same mode is recorded in Step #535. Then, the routine proceeds to Step #600.

If the ink ribbon is set (YES in Step #530), it is discriminated whether both leading end sensors A 417 and 418 have detected black portions of the ink ribbon 416 in Step #540. If both the leading end sensors A 417, B 418 have detected the black portions of the ink ribbon 416 (YES in Step #540), it is determined that the hand scanning mode is recorded as a print mode, whereby the printing operation is executed by means of hand scanning as will be described hereinafter. If, on the other hand, not both the leading end sensors A 417, B 418 have detected the black portions of the ink ribbon 416 (NO in Step #540), it is discriminated in Step #545 whether the flag FRBN is reset to "0." If the flag FRBN is set to "1" (NO in Step #545), it is determined that the next ribbon segment is set in the specified position for the next printing operation, and the routine proceeds to Step #580. If the flag FRBN is reset to "0" (YES in Step #545), it is determined that the ink ribbon 416 should be fed until the next ribbon segment is set in the specified position for the next printing operation. Subsequently, the DC servo motor 420 is drivingly rotated in the j-direction (see FIG. 8), whereby the ink ribbon 416 starts being taken up in Step #550. In other words, the leading end of the next ribbon segment is fed to a predetermined position for the next printing operation. Subsequently, it is discriminated whether the sensor A 417 has detected the back marker m in Step #555. If the sensor A 417 has detected no back marker m (NO in Step #555), it is further discriminated whether the sensor B 418 has detected the black marker m in Step #565. If the sensor B 418 has detected no black marker m (NO in Step #565), i.e., neither the sensors A 417 nor B 418 has detected the black marker m, a detecting operation is executed to detect the black marker m for a predetermined period of time, which is set by an unillustrated timer (a loop of Steps #555, #565, and #585). When the predetermined period of time is up (YES in Step #585), the DC servo motor 420 is caused to stop its operation, whereby the ink ribbon 416 stops being taken up in Step #590. Consequently, an indication "INK RIBBON ERROR" is displayed on the indicator 17 in Step #595.

If, on the other hand, the sensor A 417 has detected the black marker m (YES in Step #555), it is determined that the melting transfer mode is to be set and the same mode is recorded in Step #560. Further, if the sensor B 418 has detected the black marker m (YES in Step #565), it is determined that the sublimation transfer mode is to be set and the same mode is recorded in Step #570, and the routine proceeds to Step #575 in which the flag FRBN is set to "1." Subsequently, the ink ribbon 416 is stopped being taken up in Step #580, and the routine proceeds to Step #600. In Step #600, it is discriminated whether the switch S2 is in the ON state. If the switch S2 is in the OFF state (NO in Step #600), the routine returns to Step #410. If the switch S2 is in the ON state (YES in Step #600), the type of the recording sheet Pa is detected by the recording sheet sensors A 414, B 415. More specifically, presence or absence of the recording sheet Pa is discriminated in Step #605. The presence or absence of the recording sheet Pa is detected by means of the recording sheet sensors A 414, B 415. If both the sensors A 414 and B 415 have detected the black, the absence of the recording sheet Pa is detected. In other cases, the presence of the recording sheet Pa is detected. If the absence of the recording sheet Pa is detected, the routine returns to Step #410. On the other hand, if the presence of the recording sheet Pa is detected, the routine proceeds to Step #610 in which it is discriminated whether the sensor A 414 has detected the black marker M. If the sensor A 414 has detected the black marker M (YES in Step #610), it is further discriminated in Step #615 whether the sublimation transfer mode is currently set as a print mode, If the sublimation transfer mode is currently set as a print mode (YES in Step #615), the routine proceeds to Step #650. If the sublimation transfer mode is not currently set as a print mode (NO in Step #615), an indication "MEDIA MISMATCH ERROR" is displayed on the indicator 17 in Step #635 since the recording sheet pa is not in agreement with the set ink ribbon 410. The indication "MEDIA MISMATCH ERROR" is kept displaying on the indicator 17 until both the sensors A 414, B 415 detect the black, i.e., the absence of the recording sheet pa is detected in Step #640 (a loop of Steps #635, 640). At the point when the absence of the recording sheet pa is detected (YES in Step #640), the indication "MEDIA MISMATCH ERROR" is lighted off in Step #645. Consequently, the routine returns to Step #410.

If the sensor A 414 has detected no black marker M (NO in Step #610), it is further discriminated that the sensor B 415 has detected the black marker M in Step #620. If the sensor B 415 has detected the black marker M (YES in Step #620), it is further discriminated whether the thermo-sensitive mode is currently set as a print mode in Step #625. If the thermo-sensitive mode is currently set as a print mode (YES in Step #625), the routine proceeds to Step #650. If, on the other hand, the thermo-sensitive mode is not currently set as a print mode (NO in Step #625), the routine proceeds to the aforementioned loop of Steps #635, #640 in which the indication "MEDIA MISMATCH ERROR" is displayed on the indicator 17 until the absence of the recording paper Pa is detected, and then the routine returns to Step #410.

If the sensor B 415 has detected no black marker M (NO in Step #620), i.e., neither the sensor A 414 nor B 415 detects the black marker M, it is discriminated whether the melting transfer mode is currently set as a print mode in Step #630. If the melting transfer mode is currently set as a print mode (YES in Step #630), the routine proceeds to Step #650. If the melting transfer mode is not currently set as a print mode (NO in Step #630), the routine proceeds to the aforementioned loop of Steps #635, #640 in which the indication "MEDIA MISMATCH ERROR" is displayed on the indicator 17 until the absence of the recording paper Pa is detected, and then the routine returns to Step #410.

In Step #655, it is checked whether the main battery EB has sufficient energy source. If the main battery EB has insufficient energy source (NO in Step #655), a warning is displayed on the indicator 17, and consequently the printing operation is stopped in Step #660. If the main battery EB has sufficient energy source (YES in Step #655), the DC servo motor 420 is actuated to feed the recording Sheet Pa in a sheet insertion direction (the b-direction in FIG. 7) by a predetermined distance (run distance) in Step #665. Subsequently, it is checked whether the thermo-sensitive mode is currently set as a print mode in Step #670. If the thermo-sensitive mode is not currently set as a print mode (NO in Step #670), a value 3 is set in a color counter in Step #675. The value 3 indicates the number of the printing operation to be executed. If the thermo-sensitive mode is currently set as a print mode (YES in Step #670), a value 1 is set in the color counter in Step #680. Then, the thermal head 410 is pressed against the recording sheet Pa with the ink ribbon 416 therebetween in Step #685. Subsequently, the DC servo motor 420 is actuated in the j-direction so as to feed the recording sheet Pa toward the sheet inlet 21 by a predetermined distance (runback distance) in Step #690. In Step #695, all the lines (768 lines) constituting one frame of image are set, and the CPU 100 sends the control signal Dcon in the form of "11" to the DC/DC converter 200 in Step #700, whereby the power is supplied to the printer section 111 and the camera section 203. Subsequently, one line of the yellow image is printed. Each time one line of the yellow image is printed, the recording sheet Pa is fed toward the inlet 21 by one line. Printout of a complete yellow image is accomplished by alternately printing one line of the yellow image and feeding the recording sheet Pa by one line (a loop of Steps #700 to 710). Upon completion of printout of the complete yellow image (YES in Step #710), the CPU 100 sends the control signal Dcon in the form of "00" to the PC/PC converter 200 in Step #715, and thereby the DC/DC converter is caused to stop its operation. Then, the value set in the color counter (color counter value) is decremented by one in Step #720, and it is discriminated in Step #725 whether the color counter value is 0. If the color counter value is not 0 (NO in Step #725) the thermal head 410 is slid to the standby position in Step #730. Thereafter, the recording sheet Pa is fed in the sheet insertion direction (j-direction in FIG. 7) by a predetermined distance (run distance plus a distance equivalent to all the lines) in Step #735, and then an operation of Steps #685 to #725 is executed to print a complete image of a next color. When all the available color images are printed to reproduce a complete image, i.e., the color counter value becomes 0 (YES in Step #725), the recording sheet Pa is discharged through the inlet 21 in Step #740. After the thermal head 410 is slid to the standby position in Step #745, the flag FRBN is reset to "0" in Step #750, and the routine returns to Step #410.

If both the leading end sensors A 417, B 418 have detected the black portions of the ink ribbon 416 (YES in Step #540), it is determined that the hand scanning mode is to be set, and the same mode is recorded as a print mode in Step #755. Subsequently, it is discriminated whether the switch S2 is in the ON state in Step #760. If the switch S2 is in the OFF state (NO in Step #760), the routine returns to Step #410. On the other hand, if the switch S2 is in the ON state (YES in Step #760), it is checked whether the main battery EB has sufficient energy source in Step #770. If the main battery EB has insufficient energy source (NO in Step #770), a warning is displayed on the indicator 17, whereby the printing operation is stopped in Step #775. If the main battery EB has sufficient energy source (YES in Step #770), the DC servo motor 420 is actuated consequently to cause the nip rollers 412 to rotate (YES in Step #780). The rotation of the nip rollers 412 is detected by the rotation sensor 413, which in turn sends a corresponding sensor signal. In accordance with the sensor signal from the rotation sensor 413, the thermal head 410 is pressed against the recording sheet Pa in Step #785. After all the lines (e.g., 768 lines) constituting one frame of image are set in Step #790, the CPU 100 sends the control signal Dcon in the form of "11" to the DC/DC converter 200, whereby the power is supplied to the printer section 111 and the camera section 203 in Step #795. Thereafter, a complete image is printed by alternately printing of one line of the image and feeding the recording sheet Pa in synchronism with the rotating speed of the nip rollers 412. i.e., the speed at which the recording sheet Pa is fed toward the insertion opening of the inlet 21. More specifically, upon the printer section 111 and the camera section 203 being actuated in Step #795, one line of the image is printed in Step #800. Subsequently, it is discriminated whether one frame of image has been printed in Step #805. If there still remain the lines to be printed (NO in Step #805), it is discriminated whether the nip rollers 412 have rotated such an amount as to feed the recording sheet Pa by one line in Step #810. Not having been rotated this amount, the nip rollers 412 are rotated a deficient amount, so that a next line of the image can be printed in a precise position. Then, the routine returns to Step #795. The operation of Steps #795 to #810 is repeated until one frame of image is printed. When one frame of image is completely printed (YES in Step #805), the CPU 100 sends the control signal Dcon in the form of "00" to the PC/PC converter 200 in Step #815, whereby the DC/DC converter 200 stops its operation. Then, the thermal head 410 is slid to the standby position in Step #820, and the routine returns to Step #410.

Figure 27:
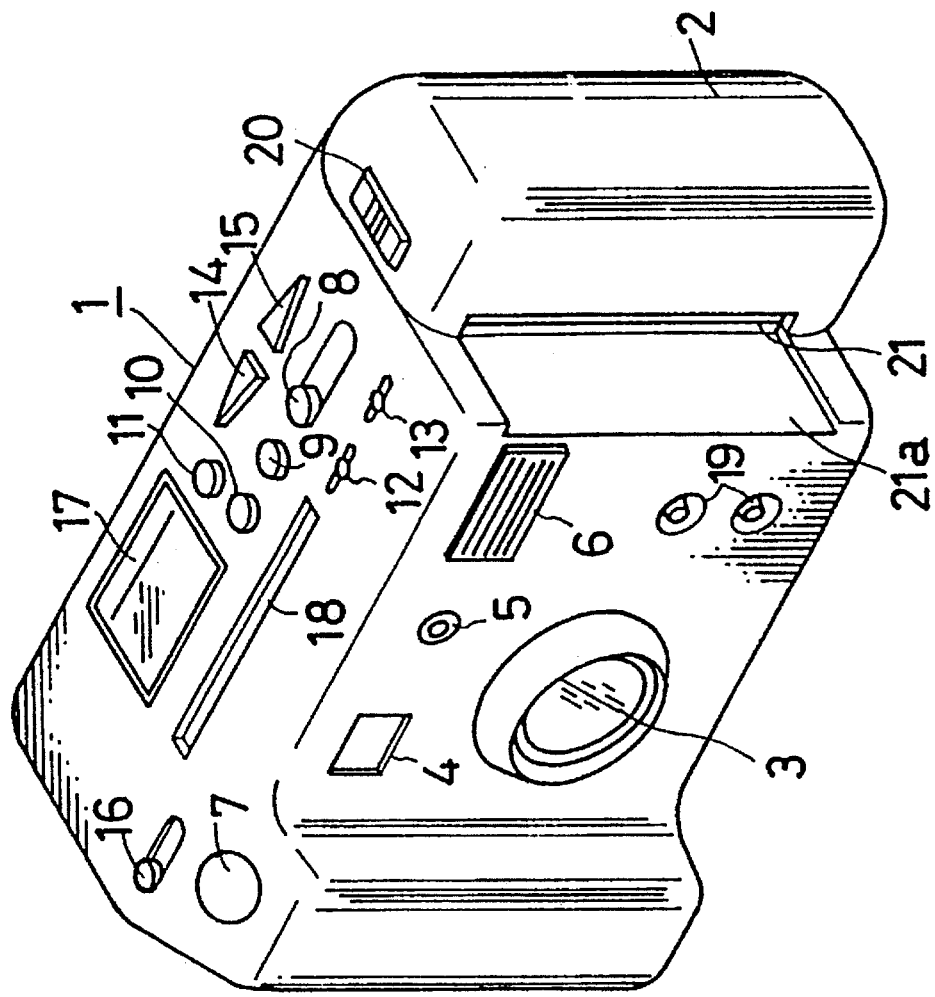
FIG. 27 is a perspective view of a camera provided with a built-in printer embodying the invention as a second embodiment.

FIG. 27 is a perspective view showing a camera provided with a built-in printer embodying the invention as a second embodiment. In FIG. 27, elements identical to those shown in FIG. 3A are indicated by the same reference numerals. In this embodiment, a front face of a printer case 2 is not in line with a front face of a camera main body 1. Specifically, the front face of the printer case 2 is retracted from the front face of the camera main body 1, providing a gap therebetween. This gap provides on the side face of the camera main body bearing in contact with the side face of the printer case 2 a free surface area, which serves as a recording sheet insertion guide 21a. The recording sheet insertion guide 21a enables a precut recording sheet Pa to be inserted easily and accurately, thereby improving operability of the camera in terms of a printing operation. The sheet inlet 21a is provided on a forward portion of the camera main body 1. However, it should be noted that the sheet insertion guide 21a may be provided on a rearward portion of the camera main body 1.

Figure 28:
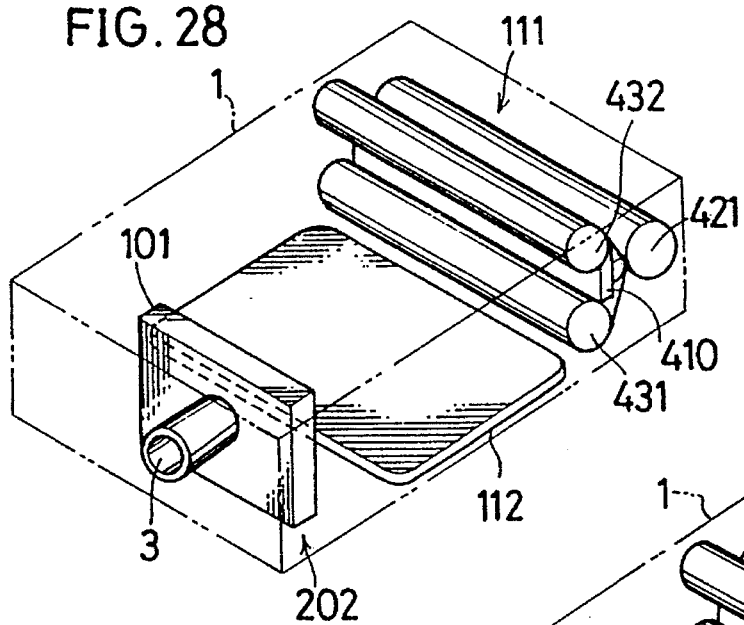
FIGS. 28 to 30 are diagrams respectively showing arrangements of a memory card mounting portion, an image forming section, and a printer section.
Figure 29:
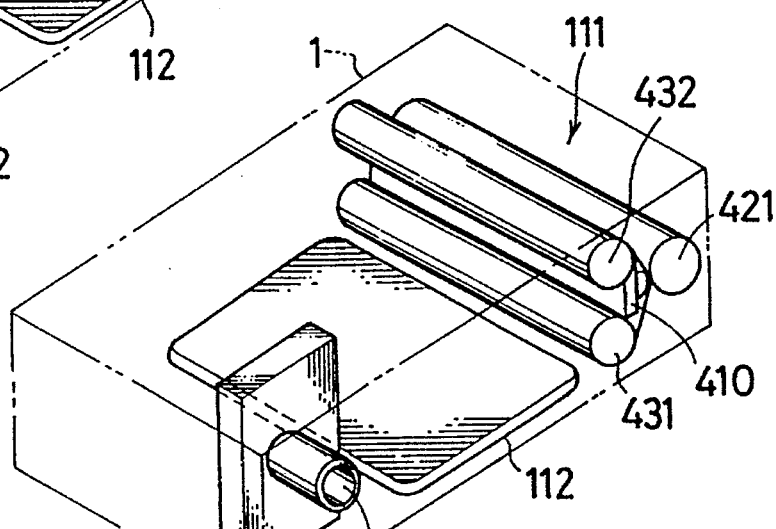
Figure 30:
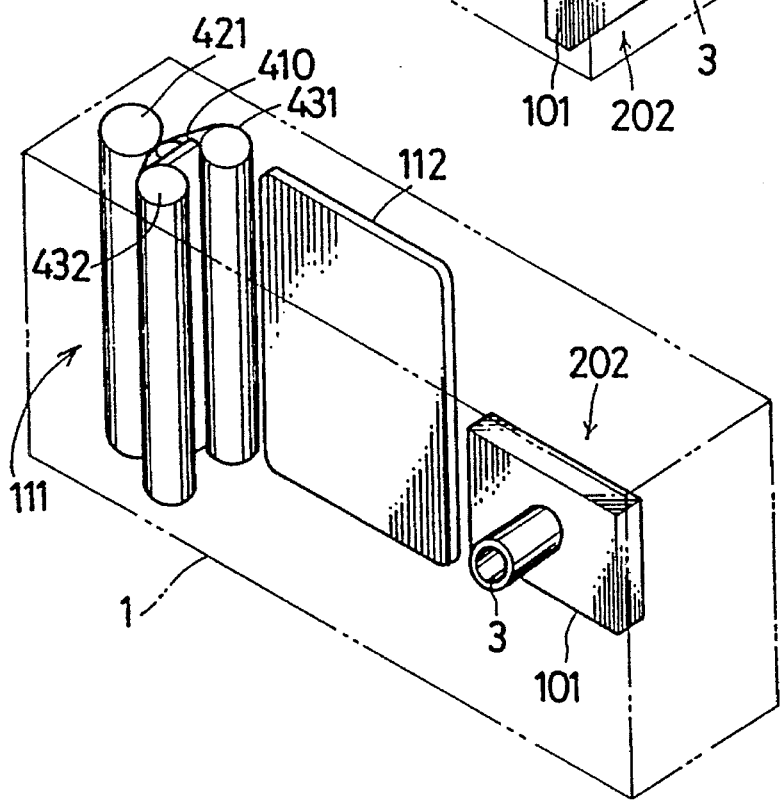

Incidentally, in a camera provided with a built-in printer, the heat is generated as a result of a printing operation in a printer section 111. This heat adversely affects a CCD 101 or other elements provided in an image forming section 202. Accordingly, it is preferable to provide the printer section 111 and the image forming section 202 away from each other in the camera main body 1, so that the heat generated in the printer section 111 has no influence on the image forming section 202. FIGS. 28 to 30 are diagrams respectively showing arrangements of the printer section 111, a portion of the camera main body 1 into which the memory card 112 is mounted, and the image forming section 202.

In each of the three types of arrangements shown in FIGS. 28 to 30, the printer section 111 is provided in one lateral end portion of the camera main body 1 with respect to a lateral direction thereof, and the image forming section 202 is provided in the other lateral end portion of the camera main body 1. The memory card mounting portion is provided between the printer section 111 and the image forming section 202. The above three arrangements differ from one another only in the positions where a taking lens is provided in the other lateral end portion of the camera main body 1. By arranging the printer section 111, the memory card mounting portion, and the image forming section 202 as described above, the space within the camera main body can be effectively utilized. In addition, it can be prevented that the heat generated by the printer section 111 adversely affects the image forming section 202.

In the foregoing embodiments, the printer section 111 is incorporated into the camera main body 1. However, in consideration of the current trend toward a multi-functional camera, it may be appropriate that respective sections of the camera be formed into collectible units, and some or all of these units be combinedly used to form a camera suitable for applications.

FIGS. 31 to 34 show an embodiment in which respective sections are formed into collectible units. In those figures, elements identical to those shown in FIG. 3A are indicated by the same reference numerals. FIG. 31 shows a camera unit 22 comprising an image forming system including a taking lens 3, a viewfinder 4, a flash device 6, a main battery EB, and a memory card 112. On each of lateral end surfaces of the camera unit 22 is provided a connecting portion 22a for connecting the camera unit 22 with other units electrically and mechanically. FIG. 32 shows a TV reproduction unit 23 for processing image signals stored in a storage medium so as to be reproduced on TV. Also, the TV reproduction unit 23 has terminal 23b for connection with TV. FIG. 33 shows a display unit 24 for processing image signals stored in the storage medium so as to be reproduced on a monitor, and displaying the processed signals on a monitor 24b comprising liquid crystal display or the like. FIG. 34 shows a printer unit 25 having a printer provided integrally therein, and adapted for printing the stored image on a recording sheet. Also, the printer unit 25 has recording sheet storage portion 25b. Similarly to the camera unit 23, the TV reproduction unit 23, the display unit 24, and the printer 25 respectively have connecting portions 23a, 24a, 25a provided at opposite lateral end surfaces thereof for connecting one unit with other units electrically and mechanically. The above four units are connectable to one another.

Figure 35:
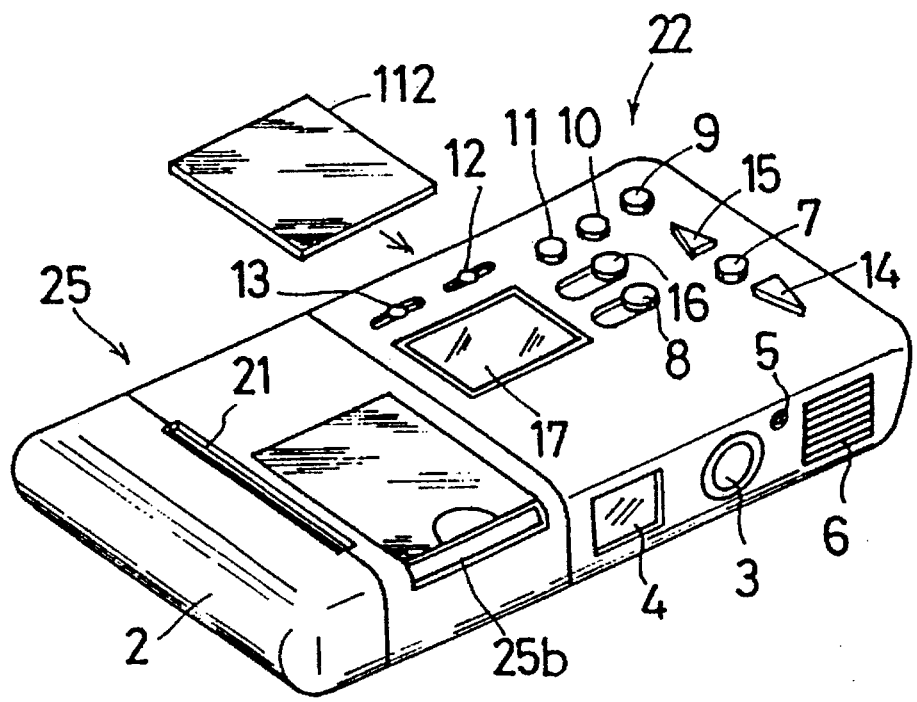
FIG. 35 is a perspective view showing a state in which the printer unit is connected to the camera unit.
Figure 36:
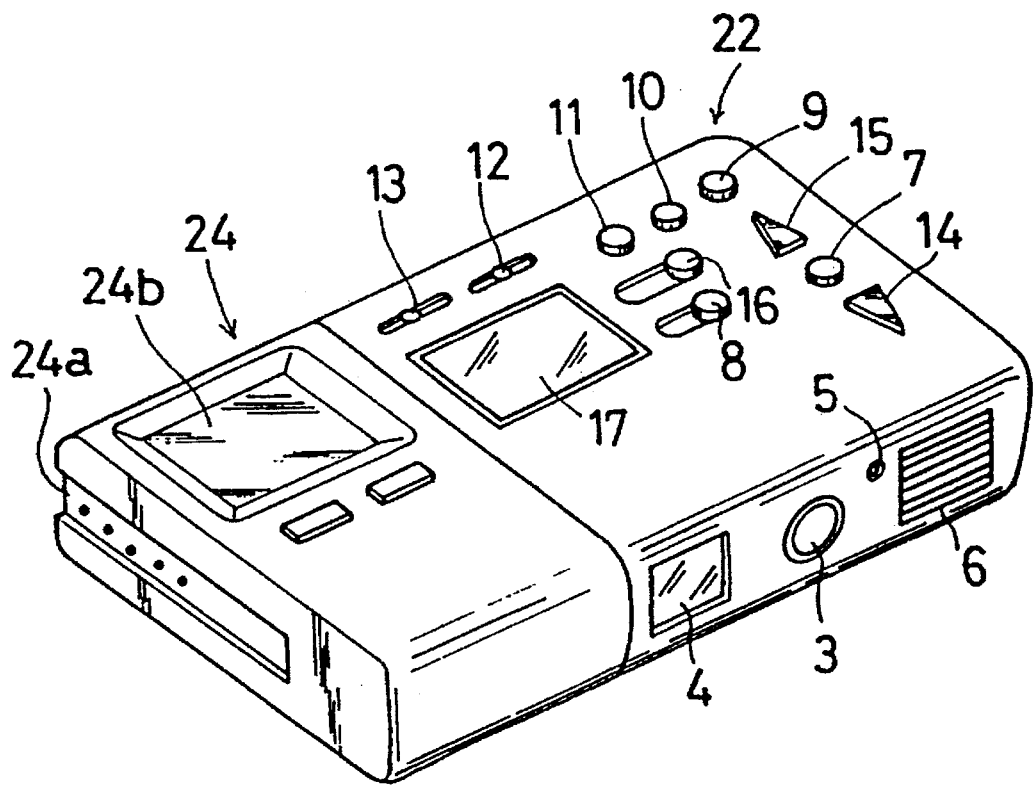
FIG. 36 is a perspective view showing a state in which the display unit is connected to the camera unit.
Figure 37:
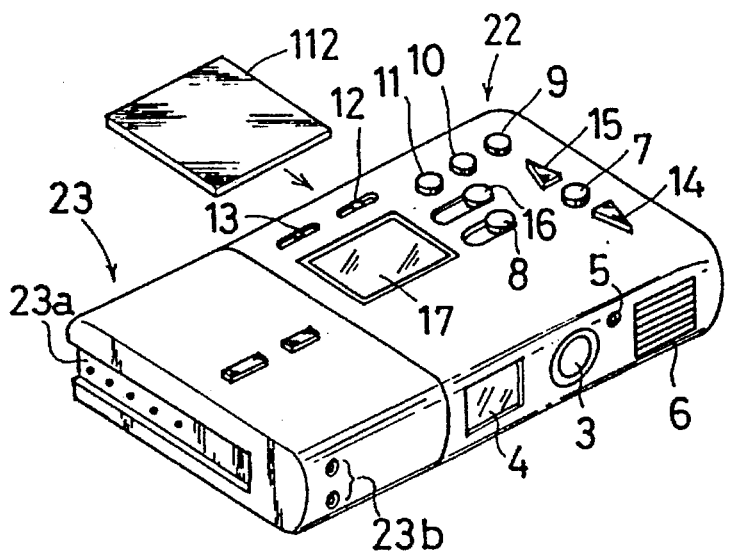
FIG. 37 is a perspective view showing a state in which the TV reproduction unit is connected to the camera unit.
Figure 38:
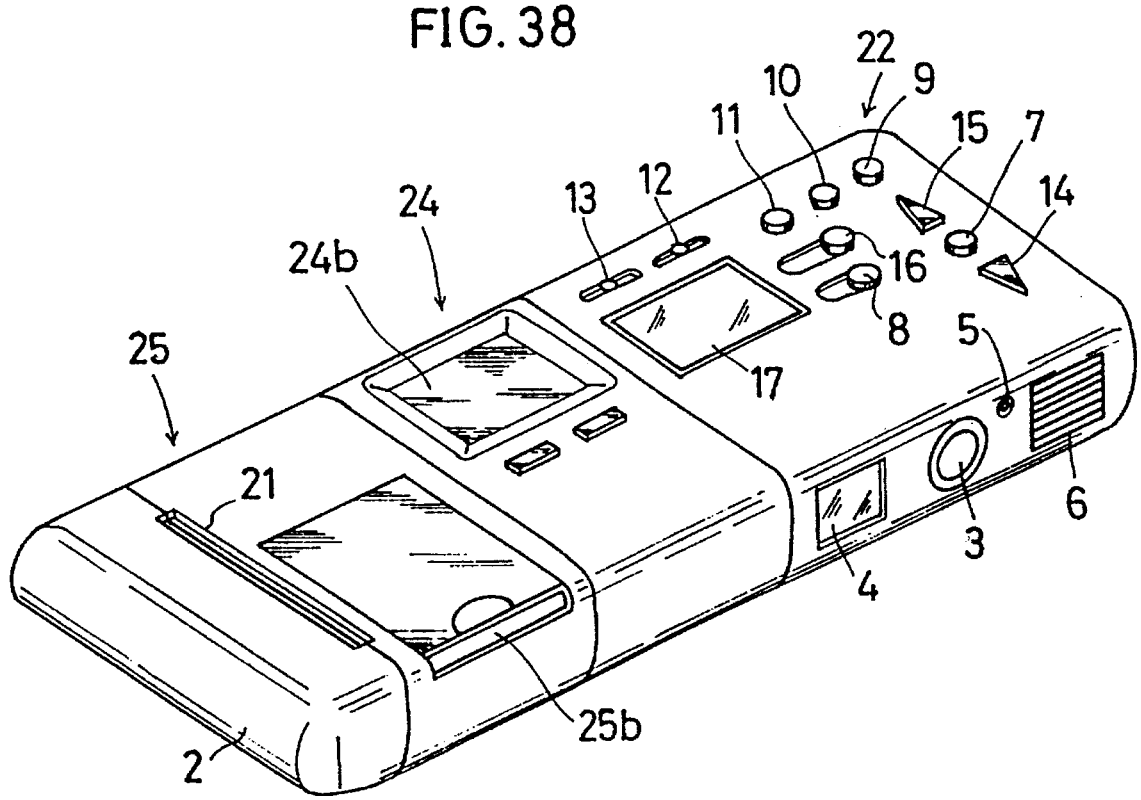
FIG. 38 is a perspective view showing a state in which the camera unit, display unit, and printer unit are connected.

FIGS. 35 to 37 show states in which the camera unit 22 is connected with the printer unit 25, the display unit 24, and the TV reproduction unit 23 respectively. FIG. 38 shows a state in which the camera unit 22 is connected with the display unit 24 and the printer unit 25. In FIG. 38, it may be appropriate that the printer unit 25 be first connected with the camera section, and the display unit 24 be connected to the printer unit 25. Alternatively, the display unit 24 and the printer unit 25 may be connected to the camera unit 22 at the opposite lateral end surfaces of the camera unit 22 respectively. Further, it is also possible to connect the TV reproduction unit 23 and the printer unit 25 with the camera unit 22 in a similar way.

In the construction shown in FIG. 38, when printing the stored images is the only operation to be executed, it is preferable to introduce the image signals from the camera unit 22 directly to the printer unit 25. In view of this, it may be advantageous to provide in the display unit 24 a signal line for introducing the image signals from the camera unit 22 into the display unit 24 and a junction line for introducing them directly into the printer unit 25. The signal line and the junction line may be controllably switched from one line to the other in accordance with a control signal from the CPU 100 in the camera unit 22. Alternatively, these lines may be so controlled as to switch from the signal line to the junction line each time the operation switch of the printer unit 25 is turned on.

Further, in the foregoing embodiments, a memory card for storing digital data is used as an external storage medium. However, a floppy disc for storing analog data, an optical disc, or an optical card may also be used as an external storage medium.

As described above, according to the present invention, in a camera provided with a built-in printer in which an ink ribbon can be removably mounted, a print mode by which image data transferred to the printer is printed is controllably set in accordance with presence or absence of the ink ribbon. Accordingly, the following two types of print modes can be automatically set: a thermal type print mode in which the ink ribbon is required and a heat transfer type print mode in which the ink ribbon is not required. Therefore, the stored images can be printed in both modes easily and readily.

Further, a print mode by which image data transferred to the printer is printed is controllably set in accordance with the type of the ink ribbon in use. Accordingly, the following two types of print modes can be automatically set: a sublimation print mode and a melting transfer print mode. Therefore, the stored images can be printed easily and readily according to an application in a desired print mode.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. A camera system comprising:

a camera section which includes photoelectric conversion elements and picks up an image of an object to produce image data;

a reproduction section which processes the image data so as to reproduce the picked-up image on a display screen; and a printer section which prints the picked-up image on printing paper based on the image data, the printer section being separably attachable to either of the camera section and the reproduction section to form an integral body.

2. A camera system according to claim 1, further comprising a recording portion which is electrically connected with the camera section and records the image data.

3. A camera system according to claim 2, wherein the recording portion includes:

a first recorder which records the image data in an internal memory built in one or each of the camera section, the reproduction section, and the printer section; and a second recorder which records the image data in an external memory removably mountable on one or each of the camera section, the reproduction section, and the printer section.

4. A camera system according to claim 2, wherein the reproduction section processes the image data recorded by the recording portion.

5. A camera system according to claim 2, wherein the printer section prints the picked-up image based on the image data recorded by the recording portion.

6. A camera system according to claim 2, wherein the recording portion is integrally provided in the camera section.

7. A camera system according to claim 1, wherein the reproduction section includes an output device which transmits the processed image data to a television set having a display screen.

8. A camera system according to claim 1, wherein the reproduction section is integrally provided with a monitor having a display screen.

9. A camera system according to claim 1, wherein the camera section includes a viewfinder.

10. A camera system comprising:

a camera section including:

an image pick-up portion which has photoelectric conversion elements and picks up an image of an object to produce image data; and a recording portion which is electrically connected with the image pick-up portion and records the image data; and a reproduction section including:
 a first reproducer which processes image data recorded by the recording portion so as to reproduce the picked-up image in the form of a video image; and
 a second reproducer which reproduces the picked-up image on printing paper based on the image data recorded by the recording portion;
the reproduction section being separably attachable to the camera section.

11. A camera system according to claim 10, wherein the first reproducer and the second reproducer are separably attachable to each other to form an integral body.

12. A camera system according to claim 10, wherein the first reproducer includes an output device which transmits the processed image data to a television set.

13. A camera system according to claim 10, wherein the first reproducer is integrally provided with a monitor.

14. A camera system according to claim 10, wherein the camera section further includes a reception portion which removably receives a storage device.

15. A camera system comprising:
 a camera section which includes an image pick-up portion having photoelectric conversion elements and picks up an image of an object to produce image data; and
 a reproduction section including:
  a first reproducer which processes the image data so as to reproduce the picked-up image in the form of video image; and
  a second reproducer which reproduces the picked-up image on printing paper based on the image data;
 the reproduction section being separably attachable to the camera section.

16. A camera system according to claim 15, wherein the first reproducer and the second reproducer are separably attachable to each other to form an integral body.

17. A camera system according to claim 15, wherein the first reproducer includes an output device which transmits the processed image data to a television set.

18. A camera system according to claim 15, wherein the first reproducer is integrally provided with a monitor.

19. A camera system according to claim 15, wherein the camera section further includes a reception portion which removably receives a storage device.

* * * * *

UNITED STATES PATENT AND TRADEMARK OFFICE
CERTIFICATE OF CORRECTION

PATENT NO.  : 5,606,420
DATED       : February 25, 1997
INVENTOR(S) : Maeda et al It is certified that error appears in the above-indentified patent and that said Letters Patent is hereby corrected as shown below:

On the title page, item [30] "Foreign Application Priority Data" line 8, delete "2-338688" and insert --2-334688--.

Signed and Sealed this

Thirty-first Day of March, 1998

*Attest:*

BRUCE LEHMAN

*Attesting Officer*   *Commissioner of Patents and Trademarks*